（12）United States Patent
Puzio

(10) Patent No.: US 11,090,786 B2
(45) Date of Patent: Aug. 17, 2021

(54) LIGHTED POWER TOOL

(71) Applicant: BLACK & DECKER INC., New Britain, CT (US)

(72) Inventor: Daniel Puzio, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/710,016

(22) Filed: Dec. 11, 2019

(65) Prior Publication Data

US 2020/0114499 A1 Apr. 16, 2020

Related U.S. Application Data

(63) Continuation of application No. 15/479,321, filed on Apr. 5, 2017, now Pat. No. 10,543,588, which is a
(Continued)

(51) Int. Cl.
*B25B 23/00* (2006.01)
*B25B 23/18* (2006.01)
(Continued)

(52) U.S. Cl.
CPC .............. *B25B 23/18* (2013.01); *B25B 21/00* (2013.01); *B25F 5/00* (2013.01); *F21V 33/0084* (2013.01);
(Continued)

(58) Field of Classification Search
CPC . B25B 23/18; B25B 21/00; B25F 5/00; B25F 5/021; F21V 33/0084; F21Y 2105/18; F21Y 2101/00; H02J 7/0044
See application file for complete search history.

(56) References Cited

U.S. PATENT DOCUMENTS 1,565,566 A 12/1925 Hartley
2,038,911 A 4/1936 Stutz et al.
(Continued)

FOREIGN PATENT DOCUMENTS

DE 1410234 U 5/1937
DE 689848 C 4/1940
(Continued)

OTHER PUBLICATIONS

"DB10DL 10.8 Volt Lithium Ion Micro Driver Drill," Hitachi Power Tools, Hitachi Koki USA, Ltd.; internet: http://www.hitachipowertools.com/store_item.php?iID=611&arrPath=1,2,22,p611, p. 1-3.
(Continued)

*Primary Examiner* — Y M. Quach Lee
(74) *Attorney, Agent, or Firm* — Scott B. Markow

(57) ABSTRACT

A power tool includes a tool body including a motor having an output member that drives an accessory. A chuck is coupled for rotation with the output member relative to the tool body and configured to retain the accessory. The chuck has a chuck body that defines at least one light pipe formed therethrough. A light source disposed on a light ring coupled to the tool body and includes at least one light. Each at least one light source aligns with each of the at least one light pipe intermittently during rotation of the chuck.

20 Claims, 61 Drawing Sheets

Related U.S. Application Data continuation of application No. 14/681,167, filed on Apr. 8, 2015, now Pat. No. 9,644,837, which is a continuation of application No. 13/553,197, filed on Jul. 19, 2012, now Pat. No. 9,028,088, which is a continuation-in-part of application No. 12/895,051, filed on Sep. 30, 2010, now Pat. No. 8,317,350.

(60) Provisional application No. 61/551,684, filed on Oct. 26, 2011, provisional application No. 61/511,317, filed on Jul. 25, 2011, provisional application No. 61/559,338, filed on Nov. 14, 2011.

(51) Int. Cl.
| | | |
|---|---|---|
| *B25B 21/00* | (2006.01) | |
| *F21V 33/00* | (2006.01) | |
| *B25F 5/00* | (2006.01) | |
| *F21Y 115/10* | (2016.01) | |
| *F21Y 101/00* | (2016.01) | |
| *H02J 7/00* | (2006.01) | |
| *B25F 5/02* | (2006.01) | |
| *F21V 8/00* | (2006.01) | |
| *F21Y 105/18* | (2016.01) | |
| *F21V 7/00* | (2006.01) | |

(52) U.S. Cl.
CPC .............. *B25F 5/021* (2013.01); *F21V 7/0091* (2013.01); *F21Y 2101/00* (2013.01); *F21Y 2105/18* (2016.08); *F21Y 2115/10* (2016.08); *G02B 6/0008* (2013.01); *G02B 6/0096* (2013.01); *H02J 7/0044* (2013.01)

(56) References Cited

U.S. PATENT DOCUMENTS

| | | |
|---|---|---|
| 2,242,536 A | 5/1941 | Montgomery |
| 2,310,166 A | 2/1943 | Way |
| 2,517,882 A | 8/1950 | Johnson |
| 2,525,414 A | 10/1950 | Kleinschmidt |
| 2,525,588 A | 10/1950 | Cameron et al. |
| 2,702,649 A | 2/1955 | Neilson |
| 2,730,263 A | 1/1956 | Neilson |
| 2,736,792 A | 2/1956 | Freeland |
| 2,773,974 A | 12/1956 | Markett |
| 2,806,492 A | 9/1957 | Becker |
| 2,852,051 A | 9/1958 | Bickner |
| 2,855,675 A | 10/1958 | Kolthoff et al. |
| 2,855,679 A | 10/1958 | Gibble |
| 3,109,238 A | 11/1963 | Marks |
| 3,144,584 A | 8/1964 | La Fiandra |
| 3,393,309 A | 7/1968 | Leach et al. |
| 3,499,226 A | 3/1970 | Hopkins |
| 3,561,462 A | 2/1971 | Jugler |
| 3,595,132 A | 7/1971 | Thacker |
| 3,603,782 A | 9/1971 | Wortmann |
| 3,656,727 A | 4/1972 | Greenlee |
| 3,681,627 A | 8/1972 | Murry et al. |
| 3,729,658 A | 4/1973 | Voitov |
| 3,919,541 A | 11/1975 | Chao |
| 3,977,278 A | 8/1976 | Jackson |
| 3,983,976 A | 10/1976 | Taylor |
| 4,078,869 A | 3/1978 | Honeycutt |
| 4,089,031 A | 5/1978 | Stevens |
| 4,131,203 A | 12/1978 | Bridges |
| 4,133,507 A | 1/1979 | Chervenak |
| 4,160,570 A | 7/1979 | Bridges |
| 4,246,506 A | 1/1981 | Vartanian et al. |
| 4,330,274 A | 5/1982 | Friedman et al. |
| 4,399,226 A | 8/1983 | Danielson et al. |
| 4,429,463 A | 2/1984 | Angell |
| 4,480,295 A | 10/1984 | Shuster |
| 4,480,301 A | 10/1984 | Pfaff et al. |
| 4,498,868 A | 2/1985 | Schuss |
| 4,536,000 A | 8/1985 | Rohm |
| 4,540,318 A | 9/1985 | Hornung et al. |
| 4,611,716 A | 9/1986 | Sorlien |
| 4,648,610 A | 3/1987 | Hegyi |
| 4,678,922 A | 7/1987 | Leininger |
| 4,703,850 A | 11/1987 | Walker |
| 4,809,426 A | 3/1989 | Takeuchi et al. |
| 4,833,782 A | 5/1989 | Smith |
| 4,839,777 A | 6/1989 | Janko et al. |
| 4,844,488 A | 7/1989 | Flynn |
| 4,899,971 A | 2/1990 | Elkin |
| 4,930,628 A | 6/1990 | Bridges |
| 5,003,434 A | 3/1991 | Gonser et al. |
| 5,061,885 A | 10/1991 | Fukuhara |
| 5,068,652 A | 11/1991 | Kobayashi |
| 5,133,455 A | 7/1992 | Chow |
| 5,158,354 A | 10/1992 | Simonin |
| 5,166,225 A | 11/1992 | Asanuma et al. |
| 5,169,225 A | 12/1992 | Palm |
| 5,267,129 A | 11/1993 | Anderson |
| 5,276,595 A | 1/1994 | Patrie |
| 5,313,527 A | 5/1994 | Guberman et al. |
| 5,319,527 A | 6/1994 | Murphy et al. |
| 5,406,300 A | 4/1995 | Tokimoto et al. |
| 5,412,476 A | 5/1995 | Marantette |
| 5,412,546 A | 5/1995 | Huang |
| 5,427,002 A | 6/1995 | Edman |
| 5,473,519 A | 12/1995 | McCallops et al. |
| 5,477,434 A | 12/1995 | Reed |
| 5,525,842 A | 6/1996 | Leininger |
| 5,538,423 A | 7/1996 | Coss et al. |
| 5,543,679 A | 8/1996 | Morino et al. |
| 5,628,556 A | 5/1997 | Hrabar et al. |
| 5,637,973 A | 6/1997 | Hirai et al. |
| D380,952 S | 7/1997 | Kim |
| 5,713,656 A | 2/1998 | Lin |
| 5,720,542 A | 2/1998 | Birge, Jr. et al. |
| 5,770,936 A | 6/1998 | Hirai et al. |
| 5,793,130 A | 8/1998 | Anderson |
| 5,797,670 A | 8/1998 | Snoke et al. |
| 5,798,622 A | 8/1998 | Hirai et al. |
| 5,801,454 A | 9/1998 | Leininger |
| 5,818,188 A | 10/1998 | Hirai et al. |
| 5,845,986 A | 12/1998 | Breen |
| 5,873,647 A | 2/1999 | Kurtz et al. |
| 5,913,596 A | 6/1999 | Lin |
| 5,924,615 A | 7/1999 | McGarrah |
| 5,970,616 A | 10/1999 | Wahl et al. |
| 5,980,077 A | 11/1999 | Shiao |
| 5,982,059 A | 11/1999 | Anderson |
| 6,022,121 A | 2/2000 | Lin |
| 6,028,694 A | 2/2000 | Schmidt |
| 6,033,082 A | 3/2000 | Lin |
| 6,033,087 A | 3/2000 | Shozo et al. |
| 6,036,332 A | 3/2000 | Antal |
| 6,050,698 A | 4/2000 | Lee |
| 6,050,759 A | 4/2000 | Bone |
| 6,067,714 A | 5/2000 | Taylor et al. |
| 6,079,846 A | 6/2000 | Huang |
| 6,086,217 A | 7/2000 | Jau |
| 6,095,659 A | 8/2000 | Hsu |
| RE36,917 E | 10/2000 | Leininger |
| 6,126,295 A | 10/2000 | Hillinger |
| 6,135,608 A | 10/2000 | Lin |
| 6,145,995 A | 11/2000 | Hung |
| 6,161,256 A | 12/2000 | Quiring et al. |
| 6,168,287 B1 | 1/2001 | Liu |
| 6,168,301 B1 | 1/2001 | Martinez et al. |
| 6,178,081 B1 | 1/2001 | Armond et al. |
| 6,179,433 B1 | 1/2001 | Shiao |
| 6,183,103 B1 | 2/2001 | Hillinger |
| 6,206,538 B1 | 3/2001 | Lemoine |
| 6,213,620 B1 | 4/2001 | Huang et al. |
| 6,224,229 B1 | 5/2001 | Lin |
| 6,237,767 B1 | 5/2001 | Lee |
| 6,238,058 B1 | 5/2001 | Lin |
| 6,243,240 B1 | 6/2001 | Ozue et al. |
| 6,257,077 B1 | 7/2001 | Patterson |

(56) References Cited

U.S. PATENT DOCUMENTS

| | | |
|---|---|---|
| 6,260,979 B1 | 7/2001 | Lin |
| 6,260,980 B1 | 7/2001 | Ping |
| 6,280,047 B1 | 8/2001 | Chen |
| 6,283,607 B1 | 9/2001 | Lin |
| D449,506 S | 10/2001 | Haung |
| 6,318,874 B1 | 11/2001 | Matsunaga |
| 6,318,875 B1 | 11/2001 | Hrabar et al. |
| 6,322,177 B1 | 11/2001 | Vasudeva |
| 6,364,033 B1 | 4/2002 | Hung et al. |
| 6,401,996 B1 | 6/2002 | Thom et al. |
| 6,443,675 B1 | 9/2002 | Kopras et al. |
| 6,454,429 B1 | 9/2002 | Liao |
| 6,467,577 B1 | 10/2002 | Charlebois, Jr. |
| 6,478,442 B2 | 11/2002 | Chen |
| 6,494,590 B1 | 12/2002 | Paganini et al. |
| 6,497,494 B1 | 12/2002 | Lin |
| 6,501,199 B2 | 12/2002 | Hung |
| 6,502,947 B2 | 1/2003 | Matsumoto et al. |
| 6,502,949 B1 | 1/2003 | Horiyama et al. |
| 6,511,200 B2 | 1/2003 | Matsunaga |
| 6,511,201 B1 | 1/2003 | Elrod |
| 6,565,227 B1 | 5/2003 | Davis |
| 6,575,590 B1 | 6/2003 | Wadsworth |
| 6,616,295 B2 | 9/2003 | Sako et al. |
| 6,617,737 B1 | 9/2003 | Minalga et al. |
| 6,622,537 B2 | 9/2003 | Rodriguez |
| 6,644,825 B2 | 11/2003 | Lin |
| 6,663,260 B1 | 12/2003 | Tieszen |
| 6,694,631 B2 | 2/2004 | Bone et al. |
| 6,713,905 B2 | 3/2004 | Hirschburger et al. |
| 6,725,945 B2 | 4/2004 | Sugimoto et al. |
| 6,729,743 B2 | 5/2004 | Gillette |
| D493,345 S | 7/2004 | Allison |
| 6,803,683 B2 | 10/2004 | Bone et al. |
| 6,810,596 B2 | 11/2004 | Fung et al. |
| 6,814,461 B2 | 11/2004 | Minalga |
| 6,814,480 B2 | 11/2004 | Amano |
| 6,822,357 B2 | 11/2004 | Hung |
| 6,857,756 B2 | 2/2005 | Reiff et al. |
| 6,863,544 B2 | 3/2005 | Haehn et al. |
| 6,868,967 B2 | 3/2005 | Lam |
| RE38,729 E | 4/2005 | Liu |
| 6,886,961 B2 | 5/2005 | Hara et al. |
| 6,890,135 B2 | 5/2005 | Kopras et al. |
| 6,899,451 B2 | 5/2005 | Kittelmann et al. |
| 6,905,015 B2 | 6/2005 | Hernandez, Jr. et al. |
| 6,905,221 B2 | 6/2005 | Hsu |
| 6,916,106 B2 | 7/2005 | Xingguo |
| 6,918,331 B2 | 7/2005 | Okouchi |
| 6,921,235 B2 | 7/2005 | Chen |
| 6,939,022 B2 | 9/2005 | Brooks |
| 6,960,867 B2 | 11/2005 | Dupont et al. |
| 6,961,190 B1 | 11/2005 | Tamaoki et al. |
| 6,964,545 B1 | 11/2005 | Languasco |
| 6,979,100 B2 | 12/2005 | Reiff et al. |
| 6,979,104 B2 | 12/2005 | Brass et al. |
| 6,991,105 B2 | 1/2006 | Winnard |
| 7,006,306 B2 | 2/2006 | Falicoff et al. |
| 7,007,762 B2 | 3/2006 | Yamamoto |
| 7,025,485 B2 | 4/2006 | Henry |
| 7,029,142 B2 | 4/2006 | Chen et al. |
| 7,053,325 B2 | 5/2006 | Yuasa et al. |
| 7,054,411 B2 | 5/2006 | Katcha et al. |
| 7,069,662 B2 | 7/2006 | Fung et al. |
| 7,080,964 B2 | 7/2006 | Riley et al. |
| 7,090,372 B2 | 8/2006 | Liao et al. |
| 7,093,951 B2 | 8/2006 | Tsuruta et al. |
| 7,094,011 B2 | 8/2006 | Kopras et al. |
| 7,095,142 B2 | 8/2006 | Leininger |
| 7,101,058 B2 | 9/2006 | Prell et al. |
| 7,137,761 B2 | 11/2006 | Hara et al. |
| 7,147,411 B2 | 12/2006 | Astakhov et al. |
| 7,152,329 B2 | 12/2006 | Kondo et al. |
| 7,185,998 B2 | 3/2007 | Oomori et al. |
| 7,188,966 B1 | 3/2007 | Lin |
| 7,195,428 B2 | 3/2007 | Astakhov et al. |
| 7,197,113 B1 | 3/2007 | Katcha et al. |
| 7,200,516 B1 | 4/2007 | Cowley |
| 7,204,606 B2 | 4/2007 | Brass et al. |
| 7,228,983 B2 | 6/2007 | Pangerc et al. |
| 7,249,862 B2 | 7/2007 | Shirane |
| 7,253,541 B2 | 8/2007 | Kovarik et al. |
| 7,258,230 B2 | 8/2007 | Hernandez, Jr. et al. |
| 7,278,751 B2 | 10/2007 | Chang et al. |
| 7,282,818 B2 | 10/2007 | Kovarik |
| 7,296,905 B2 | 11/2007 | Etter et al. |
| D557,099 S | 12/2007 | Lin |
| 7,303,007 B2 | 12/2007 | Konschuh et al. |
| 7,307,230 B2 | 12/2007 | Chen |
| 7,318,485 B2 | 1/2008 | Greese et al. |
| 7,331,113 B1 | 2/2008 | Patrick et al. |
| 7,331,685 B2 | 2/2008 | Shen et al. |
| 7,339,323 B2 | 3/2008 | Bucur |
| 7,357,526 B2 | 4/2008 | Zeiler |
| 7,395,876 B1 | 7/2008 | Walker |
| 7,404,696 B2 | 7/2008 | Campbell |
| 7,483,220 B2 | 1/2009 | Kittelmann et al. |
| 7,498,526 B2 | 3/2009 | Lohr et al. |
| 7,510,296 B2 | 3/2009 | Nevin |
| 7,552,781 B2 | 6/2009 | Zhang et al. |
| 7,559,427 B2 | 7/2009 | Hu |
| 7,568,288 B2 | 8/2009 | Baker |
| 7,568,816 B2 | 8/2009 | Brass et al. |
| 7,600,885 B2 | 10/2009 | Canino et al. |
| 7,654,178 B2 | 2/2010 | Hall et al. |
| 7,677,752 B2 | 3/2010 | Tadokoro et al. |
| 7,681,659 B2 | 3/2010 | Zhang et al. |
| 7,682,035 B2 | 3/2010 | Wuensch et al. |
| 7,682,036 B2 | 3/2010 | Reiff et al. |
| 7,703,950 B2 | 4/2010 | Ewert et al. |
| 7,705,482 B2 | 4/2010 | Leininger |
| 7,717,619 B2 | 5/2010 | Katcha et al. |
| 7,726,863 B2 | 6/2010 | Brandstaetter et al. |
| 7,728,464 B2 | 6/2010 | Leininger |
| 7,736,009 B2 | 6/2010 | Quattrini |
| 7,740,369 B2 | 6/2010 | Gabriel et al. |
| 7,815,356 B2 | 10/2010 | Lutz et al. |
| 7,824,136 B2 | 11/2010 | Campbell |
| 7,850,325 B2 | 12/2010 | Wall et al. |
| 7,866,839 B2 | 1/2011 | Chien |
| 7,926,187 B2 | 4/2011 | Uehlein-Proctor et al. |
| 7,934,847 B2 | 5/2011 | Oomori et al. |
| 8,016,048 B2 | 9/2011 | Ueda et al. |
| 8,042,966 B2 | 10/2011 | Lutz et al. |
| 8,075,155 B2 | 12/2011 | Watanabe et al. |
| 8,091,650 B2 | 1/2012 | Van der Linde et al. |
| 8,317,350 B2 | 11/2012 | Friedman et al. |
| 8,328,381 B2 | 12/2012 | Dixon et al. |
| 8,360,593 B2 | 1/2013 | Kim et al. |
| 8,382,308 B2 | 2/2013 | Hecht et al. |
| 8,529,084 B2 | 9/2013 | Roehm |
| 9,028,088 B2 | 5/2015 | Vanko et al. |
| 2002/0054491 A1 | 5/2002 | Casas |
| 2002/0131267 A1 | 9/2002 | Van Osenbruggen |
| 2002/0136021 A1 | 9/2002 | Hung |
| 2002/0154499 A1 | 10/2002 | Hsieh |
| 2002/0172035 A1 | 11/2002 | Hara et al. |
| 2002/0179437 A1 | 12/2002 | Ko |
| 2002/0197123 A1 | 12/2002 | Kopras et al. |
| 2003/0058637 A1 | 3/2003 | Hsien |
| 2003/0194283 A1 | 10/2003 | Kovarik et al. |
| 2003/0202851 A1 | 10/2003 | Kovarik |
| 2004/0084342 A1 | 5/2004 | Chang |
| 2004/0156190 A1 | 8/2004 | Tsuruta et al. |
| 2005/0044728 A1 | 3/2005 | Baker |
| 2005/0047878 A1 | 3/2005 | Riley et al. |
| 2005/0085124 A1 | 4/2005 | Kristen et al. |
| 2005/0111214 A1 | 5/2005 | Zeiler |
| 2005/0135800 A1 | 6/2005 | Nguyen et al. |
| 2005/0152131 A1 | 7/2005 | Shirane |
| 2005/0157260 A1 | 7/2005 | Graham et al. |
| 2005/0157489 A1 | 7/2005 | Oomori et al. |
| 2005/0157849 A1 | 7/2005 | Radley et al. |
| 2005/0185300 A1 | 8/2005 | Kittelmann et al. |

(56) References Cited

U.S. PATENT DOCUMENTS

| | | |
|---|---|---|
| 2005/0188550 A1 | 9/2005 | Uehlein-Proctor et al. |
| 2005/0199522 A1 | 9/2005 | Hu |
| 2005/0218023 A1 | 10/2005 | Winnard |
| 2005/0221664 A1 | 10/2005 | Winnard |
| 2005/0247585 A1 | 11/2005 | Breckwoldt et al. |
| 2005/0248933 A1 | 11/2005 | Chen et al. |
| 2005/0261870 A1 | 11/2005 | Cramer et al. |
| 2006/0104085 A1 | 5/2006 | Walker et al. |
| 2006/0104732 A1 | 5/2006 | Huang |
| 2006/0113930 A1 | 6/2006 | Andriolo |
| 2006/0157260 A1 | 7/2006 | Greese et al. |
| 2006/0176682 A1 | 8/2006 | Wu et al. |
| 2006/0180327 A1 | 8/2006 | Nagasaka et al. |
| 2006/0234846 A1 | 10/2006 | Tucker |
| 2006/0243105 A1 | 11/2006 | Delfini et al. |
| 2006/0250057 A1 | 11/2006 | Vasudeva |
| 2006/0262519 A1 | 11/2006 | Hirschburger et al. |
| 2006/0289595 A1 | 12/2006 | Shen et al. |
| 2007/0046110 A1 | 3/2007 | Liu |
| 2007/0138971 A1 | 6/2007 | Chen |
| 2007/0159812 A1 | 7/2007 | Oomori et al. |
| 2007/0193039 A1 | 8/2007 | Onose et al. |
| 2007/0239233 A1 | 10/2007 | Klein |
| 2008/0025017 A1 | 1/2008 | Tadokoro et al. |
| 2008/0041746 A1 | 2/2008 | Hsiao |
| 2008/0060847 A1 | 3/2008 | Konschuh et al. |
| 2008/0068827 A1 | 3/2008 | Chang |
| 2008/0074865 A1 | 3/2008 | Lutz et al. |
| 2008/0144309 A1 | 6/2008 | Nagata et al. |
| 2008/0149678 A1 | 6/2008 | Huang |
| 2008/0150439 A1 | 6/2008 | Bucur |
| 2008/0158861 A1 | 7/2008 | Chiang |
| 2008/0215056 A1 | 9/2008 | Miller et al. |
| 2008/0244910 A1 | 10/2008 | Patel |
| 2008/0264212 A1 | 10/2008 | Leupert |
| 2008/0266841 A1 | 10/2008 | Gabriel et al. |
| 2008/0271906 A1 | 11/2008 | Walker |
| 2008/0278931 A1 | 11/2008 | Wu et al. |
| 2008/0314795 A1 | 12/2008 | Lin |
| 2009/0013477 A1 | 1/2009 | Agronin et al. |
| 2009/0077814 A1 | 3/2009 | Gibbons et al. |
| 2009/0077816 A1 | 3/2009 | Gibbons et al. |
| 2009/0077817 A1 | 3/2009 | Gibbons et al. |
| 2009/0077819 A1 | 3/2009 | Kuehne et al. |
| 2009/0080987 A1 | 3/2009 | Canino et al. |
| 2009/0123817 A1 | 5/2009 | Stickel et al. |
| 2009/0128062 A1 | 5/2009 | Watanabe et al. |
| 2009/0134710 A1 | 5/2009 | Tyndall et al. |
| 2009/0141482 A1 | 6/2009 | Wall et al. |
| 2009/0145259 A1 | 6/2009 | Wall et al. |
| 2009/0159677 A1 | 6/2009 | Yakimov et al. |
| 2009/0200961 A1 | 8/2009 | Straub |
| 2009/0207035 A1 | 8/2009 | Watanabe et al. |
| 2009/0212737 A1* | 8/2009 | Johnson ............... H02J 7/0044 320/108 |
| 2009/0256319 A1* | 10/2009 | Seymour ............... B25B 23/18 362/253 |
| 2009/0309519 A1 | 12/2009 | Suzuki et al. |
| 2009/0313831 A1 | 12/2009 | Patel |
| 2010/0000094 A1 | 1/2010 | Lombardo |
| 2010/0002415 A1 | 1/2010 | Munn et al. |
| 2010/0008079 A1 | 1/2010 | Brass et al. |
| 2010/0038103 A1 | 2/2010 | Ueda et al. |
| 2010/0043603 A1 | 2/2010 | McRoberts et al. |
| 2010/0053940 A1 | 3/2010 | Yaksich |
| 2010/0071921 A1 | 3/2010 | Canino et al. |
| 2010/0072833 A1 | 3/2010 | Canino et al. |
| 2010/0074700 A1 | 3/2010 | Canino et al. |
| 2010/0089601 A1 | 4/2010 | Fukinuki et al. |
| 2010/0148505 A1 | 6/2010 | Dunlap et al. |
| 2010/0149790 A1 | 6/2010 | Leong |
| 2010/0181964 A1 | 7/2010 | Huggins et al. |
| 2010/0208497 A1 | 8/2010 | Song et al. |
| 2010/0214768 A1 | 8/2010 | Dixon et al. |
| 2010/0242695 A1 | 9/2010 | Xu et al. |
| 2010/0277897 A1 | 11/2010 | Hecht et al. |
| 2010/0315804 A1 | 12/2010 | Nishikimi et al. |
| 2010/0328929 A1 | 12/2010 | Lutz et al. |
| 2010/0328969 A1 | 12/2010 | Meyer |
| 2011/0017473 A1 | 1/2011 | Clarkson et al. |
| 2011/0040235 A1 | 2/2011 | Castel |
| 2011/0058356 A1 | 3/2011 | Friedman et al. |
| 2011/0170312 A1 | 7/2011 | Parrinello |
| 2011/0188232 A1 | 8/2011 | Friedman et al. |
| 2011/0197458 A1 | 8/2011 | Karrar et al. |
| 2011/0248650 A1 | 10/2011 | Sterling et al. |
| 2011/0260681 A1* | 10/2011 | Guccione ............... H02J 7/0044 320/108 |
| 2012/0236545 A1 | 9/2012 | Van der Linde et al. |
| 2012/0243225 A1 | 9/2012 | Lee et al. |
| 2013/0021783 A1 | 1/2013 | Vanko et al. |

FOREIGN PATENT DOCUMENTS

| | | |
|---|---|---|
| DE | 6806826 U | 3/1969 |
| DE | 1808818 A1 | 6/1970 |
| DE | 2529668 A1 | 1/1977 |
| DE | 7704943 U1 | 6/1977 |
| DE | 2819691 A1 | 11/1979 |
| DE | 3003703 A1 | 8/1980 |
| DE | 8529779 U1 | 12/1985 |
| DE | 3525352 A1 | 1/1987 |
| DE | 3831344 A1 | 3/1990 |
| DE | 8912224 U1 | 12/1990 |
| DE | 4202223 A1 | 9/1992 |
| DE | 4229282 A1 | 5/1993 |
| DE | 4336730 A1 | 5/1995 |
| DE | 4420999 A1 | 12/1995 |
| DE | 29709437 U1 | 9/1997 |
| DE | 29719020 U1 | 12/1997 |
| DE | 29807070 U1 | 6/1998 |
| DE | 29818802 U1 | 1/1999 |
| DE | 29907922 U1 | 8/1999 |
| DE | 10119010 A1 | 10/2002 |
| DE | 20215382 U1 | 3/2003 |
| DE | 20201300 U1 | 7/2003 |
| DE | 20310541 U1 | 9/2003 |
| DE | 10315980 A1 | 11/2003 |
| DE | 10246772 A1 | 4/2004 |
| DE | 202004019853 U1 | 2/2005 |
| DE | 10340178 B3 | 4/2005 |
| DE | 10356384 A1 | 6/2005 |
| DE | 102004011575 A1 | 9/2005 |
| DE | 202007010340 U1 | 10/2007 |
| DE | 102006045157 A1 | 4/2008 |
| DE | 102006049925 A1 | 4/2008 |
| DE | 202008003787 U1 | 6/2008 |
| DE | 202008016901 U1 | 3/2009 |
| DE | 102011075663 A1 | 11/2012 |
| DE | 102011077440 A1 | 12/2012 |
| DE | 102011077441 A1 | 12/2012 |
| DE | 102011077442 A1 | 12/2012 |
| DE | 102011077443 A1 | 12/2012 |
| DE | 102011077444 A1 | 12/2012 |
| DE | 102011077451 A1 | 12/2012 |
| EP | 0280527 A2 | 8/1988 |
| EP | 1068934 A1 | 1/2001 |
| EP | 1072842 A2 | 1/2001 |
| EP | 1125698 A2 | 8/2001 |
| EP | 1287948 A2 | 3/2003 |
| EP | 1477282 A1 | 11/2004 |
| EP | 1690649 A1 | 8/2006 |
| EP | 1693162 A2 | 8/2006 |
| EP | 2199024 A1 | 6/2010 |
| EP | 2223783 A1 | 9/2010 |
| FR | 667849 A | 10/1929 |
| GB | 2041189 A | 9/1980 |
| GB | 2041798 A | 9/1980 |
| GB | 2305128 A | 4/1997 |
| GB | 2375497 A | 11/2002 |
| GB | 2407058 A | 4/2005 |
| JP | S6460447 A | 3/1989 |
| JP | 3138168 A | 6/1991 |
| JP | 5309508 A | 11/1993 |

(56) References Cited

FOREIGN PATENT DOCUMENTS

| | | | |
|---|---|---|---|
| JP | 06246645 | A | 9/1994 |
| JP | 8252778 | A | 10/1996 |
| JP | 9239672 | A | 9/1997 |
| JP | 10034564 | A | 2/1998 |
| JP | 10034565 | A | 2/1998 |
| JP | 10034566 | A | 2/1998 |
| JP | 11111002 | A | 4/1999 |
| JP | 3079279 | B2 | 8/2000 |
| JP | 2002166374 | A | 6/2002 |
| JP | 2002307325 | A | 10/2002 |
| JP | 2002307330 | A | 10/2002 |
| JP | 2003033901 | A | 2/2003 |
| JP | 2003211374 | A | 7/2003 |
| JP | 2004174667 | A | 6/2004 |
| JP | 2006218583 | A | 8/2006 |
| JP | 2009214239 | A | 9/2009 |
| JP | 2010207972 | A | 9/2010 |
| WO | WO-9902310 | A2 | 1/1999 |
| WO | WO-03061915 | A1 | 7/2003 |
| WO | WO-2005018855 | A1 | 3/2005 |
| WO | WO-2006015909 | A1 | 2/2006 |
| WO | WO-2008133339 | A1 | 11/2008 |
| WO | WO-2009080404 | A1 | 7/2009 |
| WO | WO-2009138269 | A1 | 11/2009 |
| WO | WO-2010034566 | A1 | 4/2010 |

OTHER PUBLICATIONS

"Eluminate Series," Makita, internet: http://www.makita.com/tools_item_view.asp?Id=638.
Print-off from unknown website.
Photographs of disassembled tools currently being sold.
Hitachi brochure. Date unknown.
Photographs of a partly disassembled currently sold Bosch tool.
Printouts of tools from websites. Website and date unknown.
Photocopies of brochures. Dated as marked.
David, Radu—European Search Report re EP 12 17 7787—dated Oct. 22, 2013—4 pp—The Hague.
David, Radu—European Search Report re EP 13 17 6802—dated Oct. 22, 2013—6 pp—The Hague.
David, Radu—European Examination Report re EP 1 317 6802—dated Apr. 21, 2017—4 pp—Netherlands.

\* cited by examiner

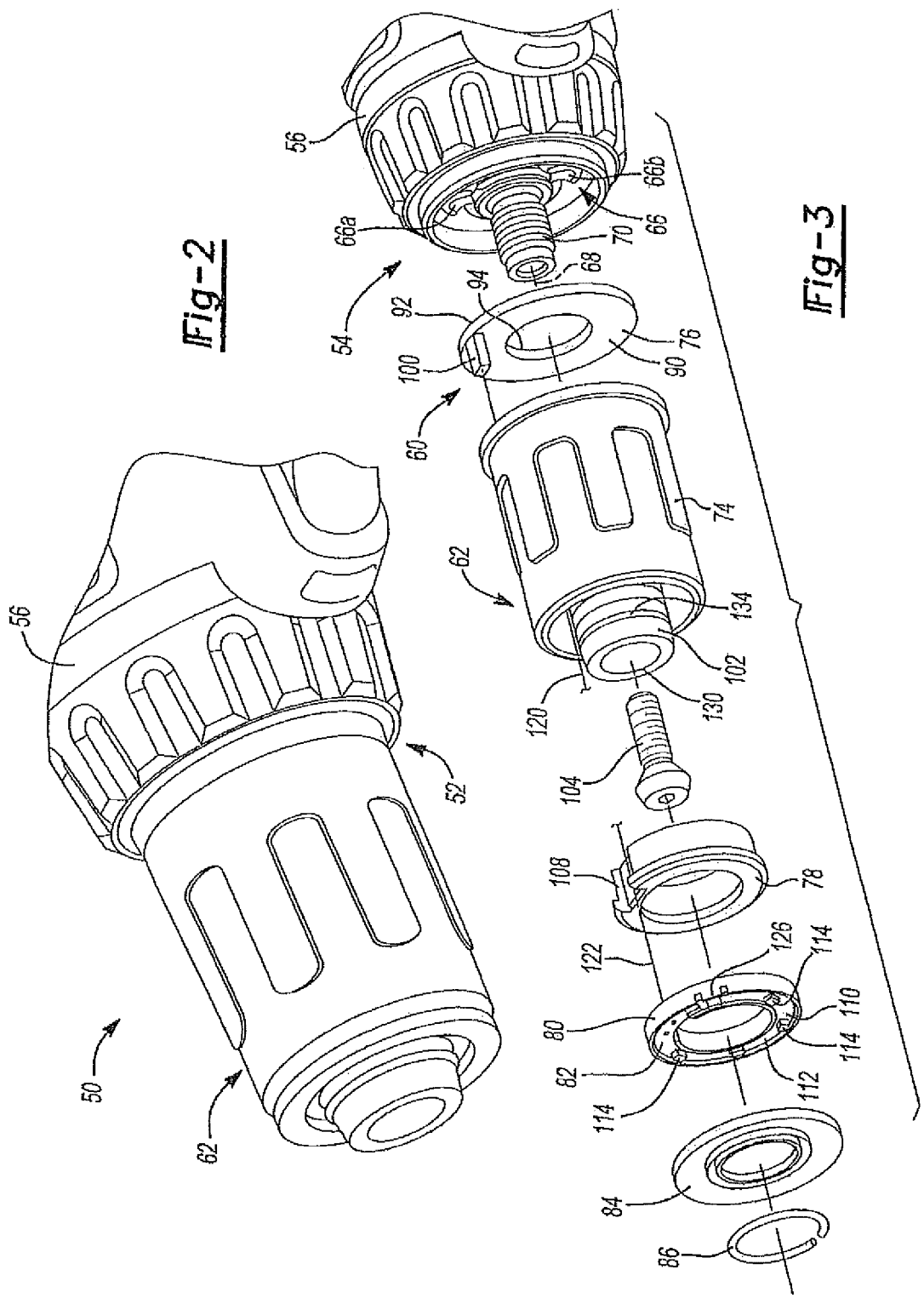

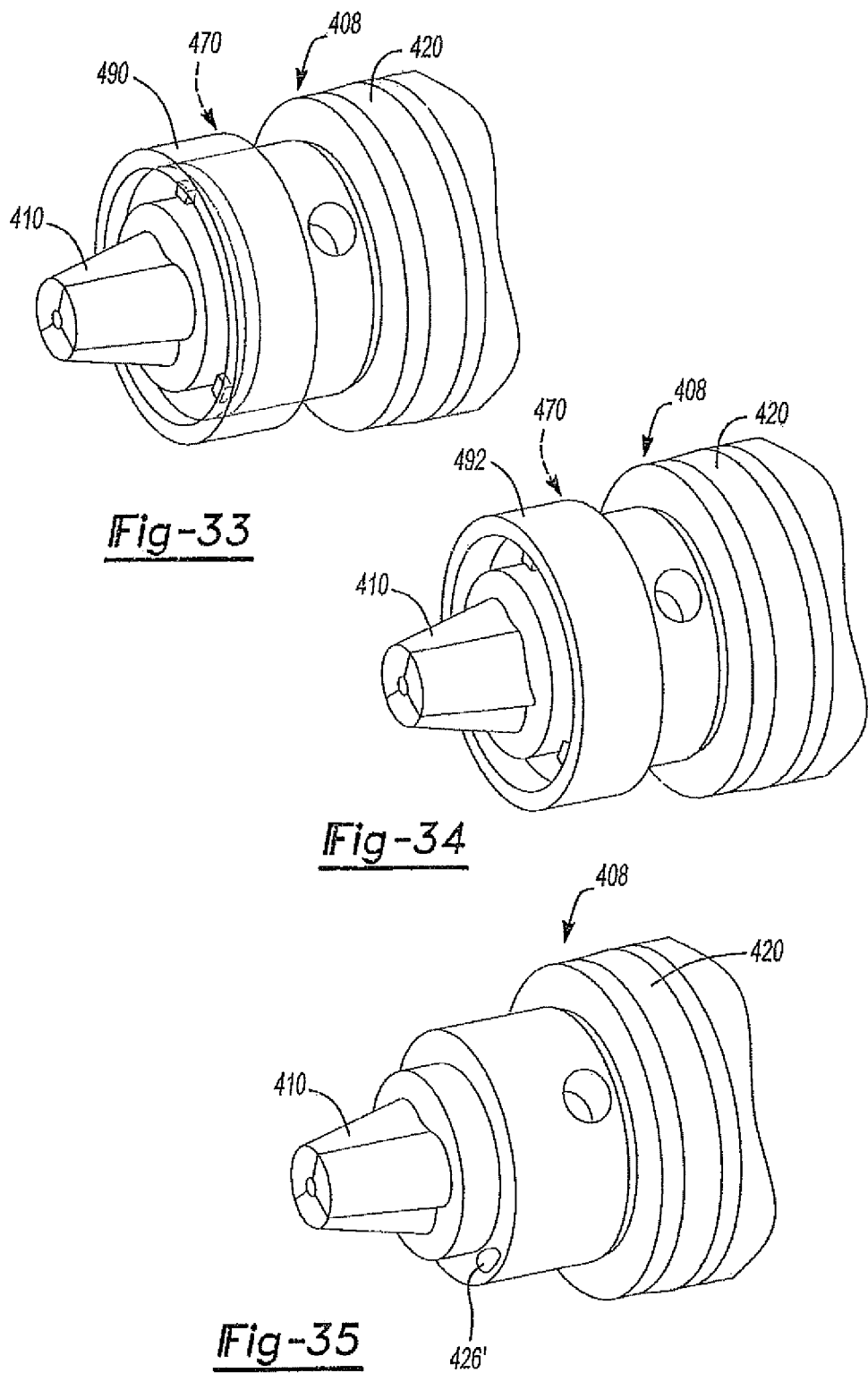

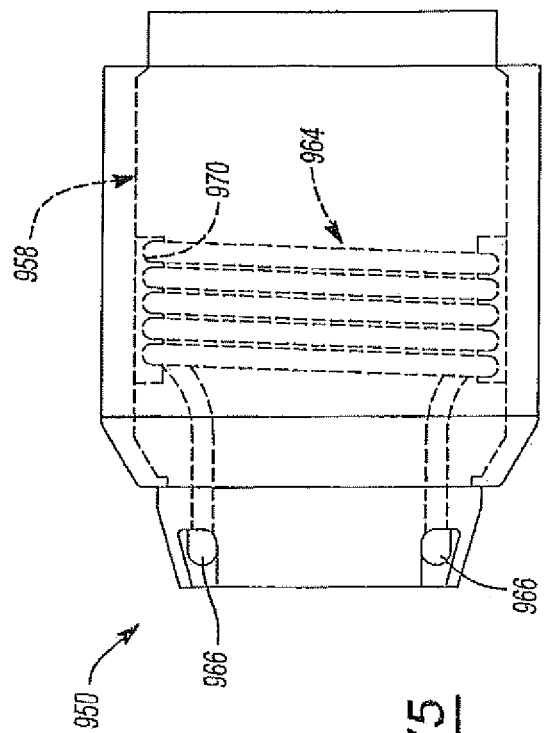
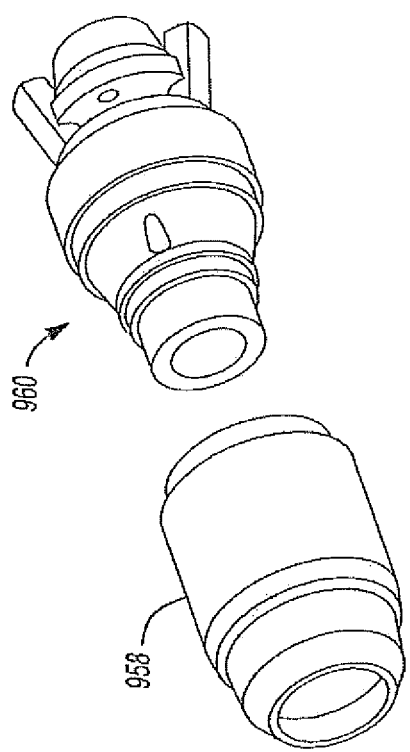
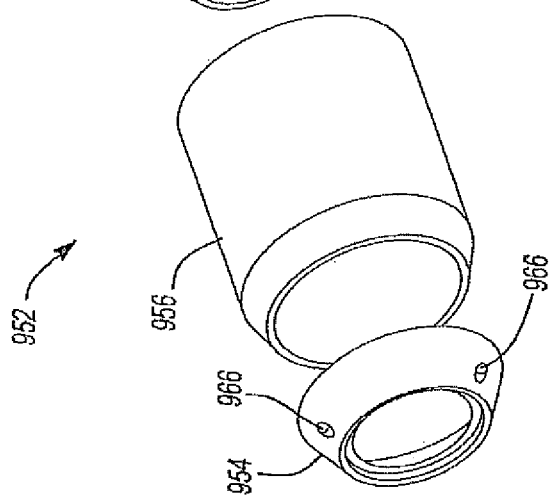

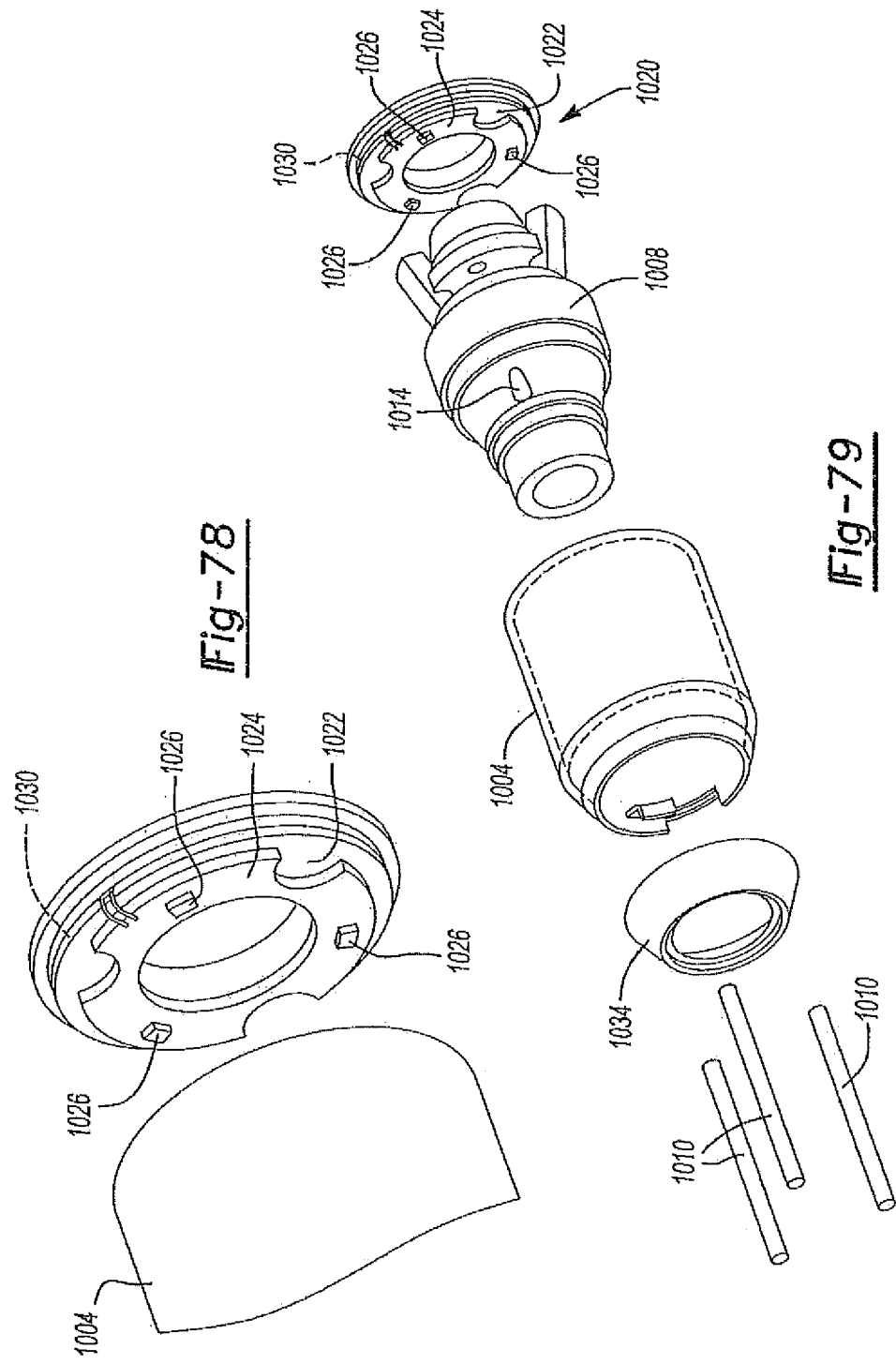

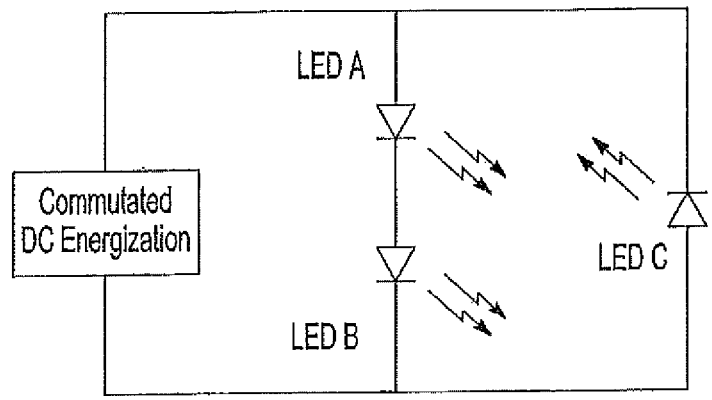
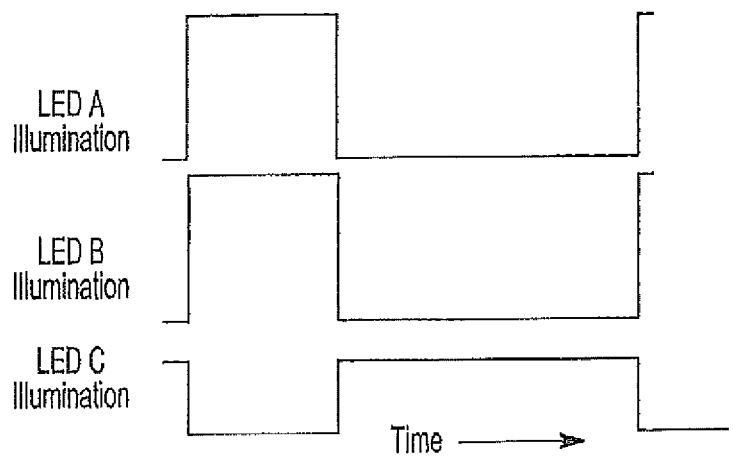
*Fig-91*
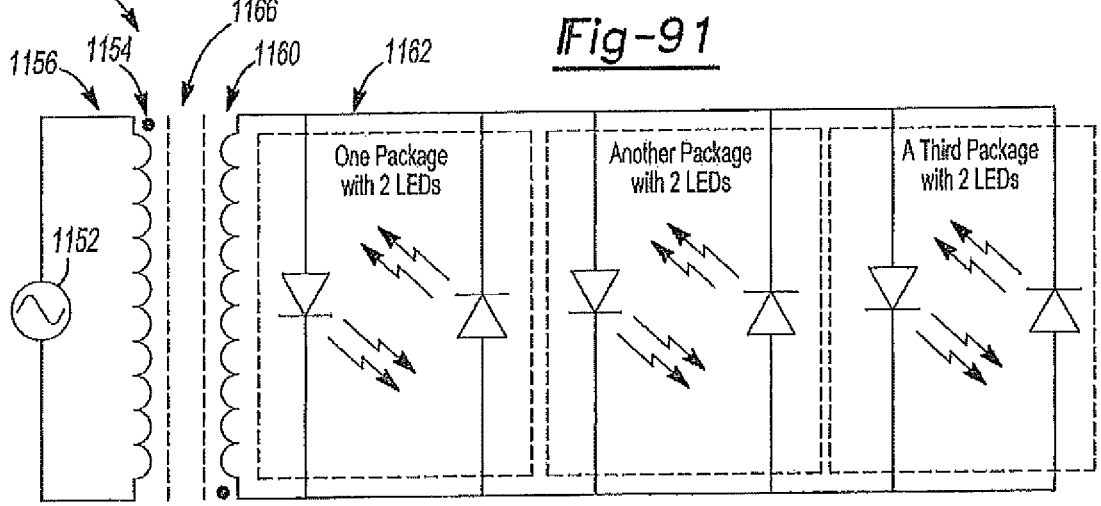
*Fig-92*

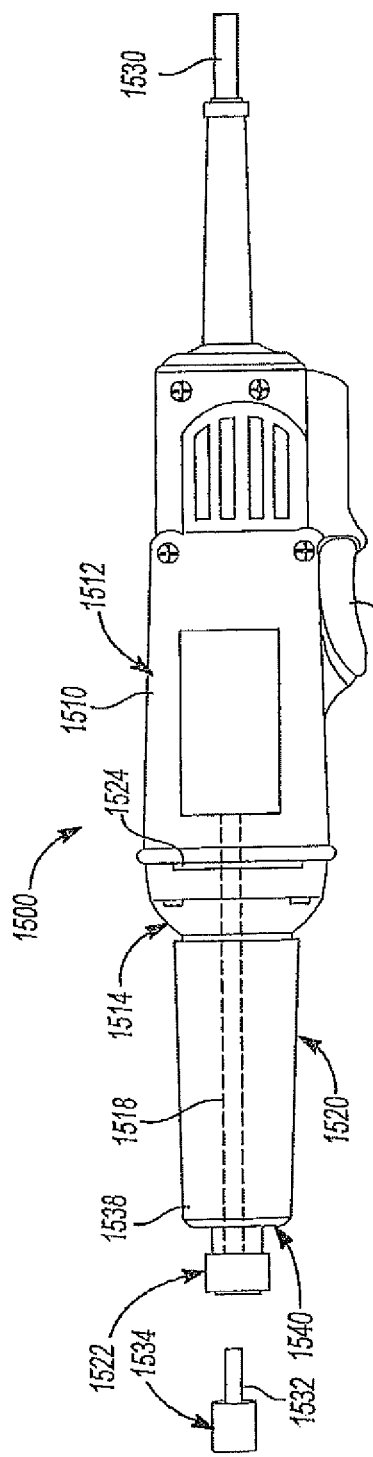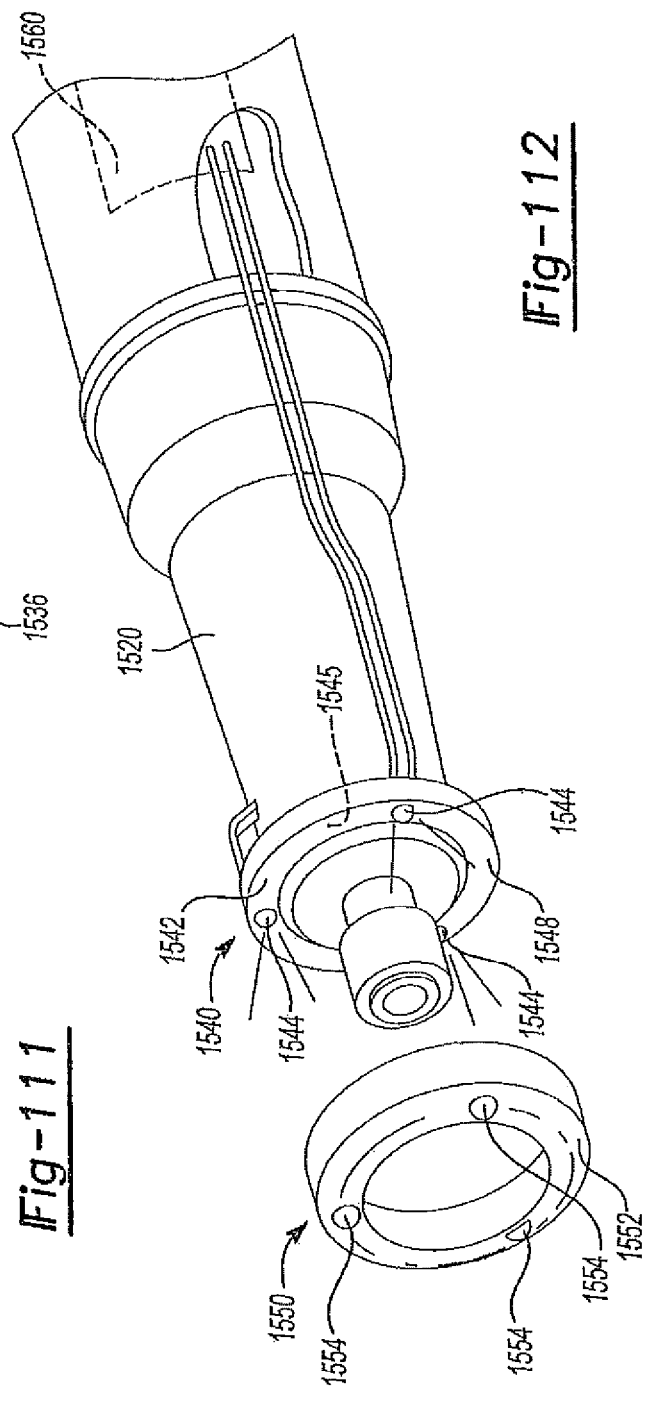

LIGHTED POWER TOOL

CROSS-REFERENCE TO RELATED APPLICATIONS

This application claims priority to and is a continuation of U.S. patent application Ser. No. 15/479,321, filed Apr. 5, 2017, now U.S. Pat. No. 10,543,588, which is a continuation of U.S. patent application Ser. No. 14/681,167, filed on Apr. 8, 2015, now U.S. Pat. No. 9,644,837, which is a continuation of U.S. patent application Ser. No. 13/553,197, filed on Jul. 19, 2012, now U.S. Pat. No. 9,028,088, which is a continuation-in-part of U.S. patent application Ser. No. 12/895,051, filed on Sep. 30, 2010, now U.S. Pat. No. 8,317,350. This application also claims the benefit of U.S. Provisional Application No. 61/551,684, filed on Oct. 26, 2011; 61/511,317, filed on Jul. 25, 2011; and 61/559,338, filed on Nov. 14, 2011. The entire disclosures of each of the above applications are incorporated herein by reference

FIELD

The present disclosure relates generally to power tools, and more particularly, to power tools having a light for illuminating a workpiece.

BACKGROUND

This section provides background information related to the present disclosure which is not necessarily prior art.

Power tools are often used in a variety of conditions, from well-lit indoor work spaces to outside construction sites or other areas that are not always well-lit. Accordingly, it is desirable to provide a method or apparatus that permits a power tool to have a lighting feature that will illuminate the workpiece that is being machined or worked on by the power tool. Such a lighting feature will assist a user to be able to adequately see the workpiece or work area that is being worked on or machined by the power tool even in substandard light conditions.

SUMMARY

This section provides a general summary of the disclosure, and is not a comprehensive disclosure of its full scope or all of its features.

A power tool according to the present teachings includes a tool body having a motor including an output member that drives an accessory, the output member defining an output member axis. An end effector is coupled for rotation with the output member relative to the tool body. The end effector is configured to retain the accessory. A light source is disposed on the end effector. A primary coil assembly is configured on the tool body and mounted concentric to the output member axis. The primary coil assembly includes a primary coil that is electrically connected to a power source of the power tool. A secondary coil assembly is configured on the end effector and mounted concentric to the output member axis. The secondary coil assembly includes a secondary coil that is electrically connected to the light source. Current flowing through the primary coil creates a magnetic field that causes current to flow through the secondary winding and power the light source.

According to additional features, the light source comprises at least one light emitting diode (LED). The end effector can include a chuck such as a keyless chuck. The primary coil assembly can comprise a primary coil bobbin, wherein the primary coil is wound around the primary coil bobbin. A primary coil housing can receive the primary coil bobbin. The secondary coil assembly can include a secondary coil bobbin, wherein the secondary coil is wound around the secondary coil bobbin. A secondary coil housing can receive the secondary coil bobbin. In one example, the secondary coil housing can be integrally formed with the chuck.

According to still other features, the LED is formed as part of a light ring assembly comprising a printed circuit board and a plurality of LEDs arranged on the printed circuit board. The printed circuit board electrically connects the secondary coil to each of the plurality of LEDs. A protective cover can be mounted around the light ring assembly and be configured to protect the plurality of LEDs. The protective cover can be transparent. In some examples, the end effector can comprise a clamp washer assembly having an inner clamp washer and an outer clamp washer. The primary coil may be incorporated on the tool body and the secondary coil may be disposed on one of the inner or outer clamp washers.

In other features, a modulation circuit is electrically connected with the secondary coil and the LEDs. The modulation circuit can be configured to flash at least one of the LEDs and control the intensity of the LEDs over time. The modulation circuit can be configured to flash the LEDs at a rate to create a stroboscopic effect on the driven accessory.

The power tool can further comprise an encoder or decoder fixed to the tool body. The other of the encoder and decoder can be fixed to the end effector. The encoder and decoder cooperate to communicate a signal. The encoder can be coupled to the end effector and the decoder can be coupled to the tool body in one configuration that further includes a controller that communicates with the motor and a sensor that is fixed to the end effector. The sensor can communicate data that is encoded by the encoder and transferred through the respective secondary and primary coils to the decoder. The decoder decodes the data and communicates the data to the controller. In another example, the encoder is coupled to the tool body and the decoder is coupled to the end effector. The controller communicates with the motor and sends data that is encoded by the encoder and transferred through the respective primary and secondary coils to the decoder. The decoder decodes the data and communicates a signal to the light source. The power source can include an on-board battery that provides a direct current (DC). The power tool can further comprise a DC to alternating current (AC) converter.

In another aspect of this application, a power tool comprises a die grinder having a motor housing, a tool holder, and a handgrip. The handgrip can be coupled to a front portion of the motor housing. The motor housing can have a motor coupled to an output shaft that extends through the handgrip and the motor housing. A light unit can be incorporated on the power tool. The light unit can include a ring-shaped printed circuit board having at least one LED mounted thereon. The printed circuit board can be received in a support ring that is in turn received in an internal groove of the handgrip. A cover assembly can include a cover ring having a corresponding opening for a corresponding LED. The printed circuit board, support ring, handgrip and cover ring may be connected to one another by a snap-fit connection, threaded connectors, a bayonet connection or by heat staking the components together.

A power tool constructed in accordance to additional features can include a tool body having a motor and an output member. A rotary transformer can be connected to a power source. A primary winding can be incorporated around a core. A secondary winding can be wrapped around the core. An LED can be electrically connected to the secondary winding. A modulation circuit may be electrically connected with the secondary winding and to the LED. The modulation circuit can be configured to encourage the LED to flash on and off. The modulation circuit can additionally or alternatively be configured to control the intensity of the LED over time. In one example, the modulation circuit can modulate the LED at exactly the rate of rotation of the chuck. In another example, the modulation circuit can modulate at a frequency that is one of higher or lower than the rate of rotation of the chuck to make the rotating accessory appear that it is rotating slowly.

A power tool constructed in accordance to additional features can include a tool body having a motor and an output member. A rotary transformer may be configured to smooth out a ripple in a luminous intensity of an LED. The rotary transformer may be connected to a power source. A primary winding can be incorporated around a core. A secondary winding can be wrapped around the core. The LED can be electrically connected to the secondary winding. A resistor and a capacitor may be electrically connected with the secondary winding and to the LED. The resistor and the capacitor can cooperate to reduce the amount of ripple to yield a luminous intensity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of a portion of another power tool constructed in accordance to other features of the present teachings;

FIG. 3 is an exploded perspective view of the portion of the power tool as shown in FIG. 2;

FIG. 33 is a front perspective view of the chuck of FIG. 31 that incorporates another protective cover;

FIG. 34 is a front perspective view of the chuck of FIG. 31 that incorporates a protective cover constructed in accordance to still other features;

FIG. 35 is a front perspective view of an exemplary chuck that incorporates a single LED thereon;

FIG. 74 is a front exploded perspective view of an exemplary keyless chuck that incorporates a lighting system according to the present teachings;

FIG. 75 is a cross-sectional view of an inner sleeve of the keyless chuck shown in FIG. 74;

FIG. 78 is a partial exploded view of the keyless chuck of FIG. 76 and illustrating an end cap assembly;

FIG. 79 is a front perspective view of the keyless chuck of FIG. 76;

FIGS. 88-91 are various plots of illumination versus time for various LED configurations according to the present disclosure;

FIG. 92 is a schematic illustration of another exemplary rotary transformer constructed in accordance to the present teachings;

FIG. 111 is a side view of a grinding tool with a light unit;

FIGS. 112 and 113 are close-up perspective views of the light unit of FIG. 111;

Corresponding reference numerals indicate corresponding parts throughout the several views of the drawings.

DETAILED DESCRIPTION

Figure 1:
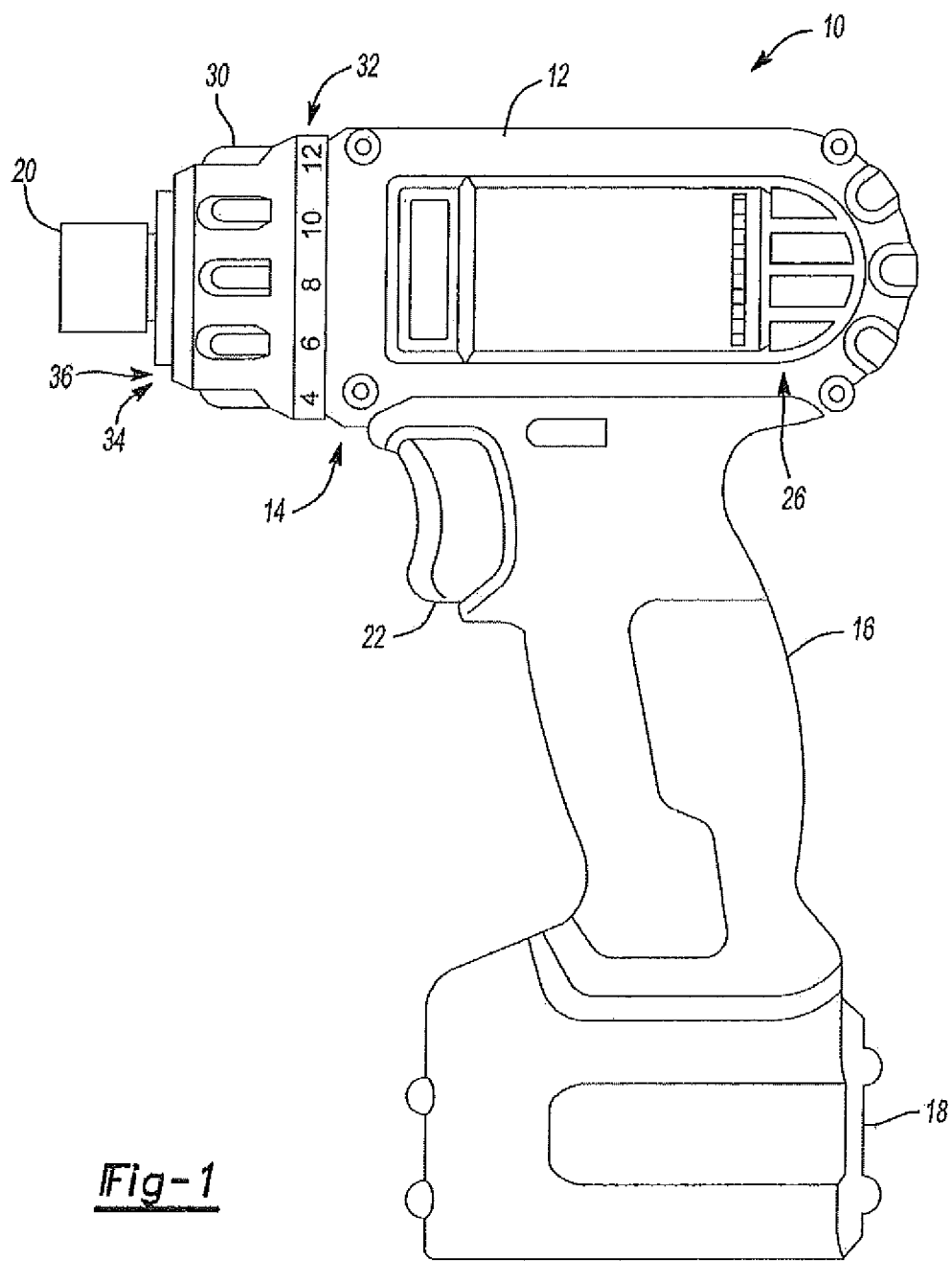
FIG. 1 is a side view of an exemplary power tool incorporating a lighting configuration according to one example of the present teachings.

The present disclosure will now be described with reference to the drawings, in which like reference numerals refer to like parts throughout. Various configurations will be described in accordance to the present disclosure that provide a power tool having a lighting arrangement that is configured to shine light onto a workpiece being operated upon by the power tool. The present disclosure will also describe various configurations and methods for controlling and powering the lighting arrangement. It will be appreciated that while the various configurations may be disclosed herein in sequence, that various aspects may be interchanged between other layouts and configurations disclosed throughout.

In some examples of the present disclosure, light emitting elements, such as light emitting diodes (LEDs), are placed in an annular or ring-shape around part of an end effector and are configured to shine forward to illuminate the tool or accessory held by the end effector and the workpiece being machined by the tool. The end effector may be a tool or accessory holder mounted to an output spindle of the tool. Examples of end effectors that may be used in accordance with the present disclosure may be 7000 Series chuck manufactured and marketed by the Jacobs Chuck Manufacturing Company of Clemson, S.C. and quick change chucks and bit holders similar to those which are found on products such as a DC825KA Impact Driver and the driver that is disclosed in U.S. application Ser. No. 12/394,426 (the disclosure of which is incorporated by reference as if fully set forth in detail herein) and a DC815KA Impact Driver that are manufactured and marketed by the DeWalt Industrial Tool Company of Baltimore, Md. An end effector may also include a blade holder similar to those found on DW3040 reciprocating saw.

It will be appreciated that different types of lighting elements can be used in accordance with the present disclosure, such as light bulbs (for example, Xenon bulbs) or other lighting elements. LED lights are discussed here as an example and do not limit embodiments in accordance with the present disclosure to tools using LEDs. In some embodiments disclosed herein, the LED lights, or other lighting elements, and associated parts can be locked to the housing of the tool and do not rotate when the power tool is operated. In other embodiments, the LED lights may be configured on the moving (rotating) part of the tool such as on a chuck. The lights may be powered by the same power source that provides power to the power tool's motor. In the case of most cordless power tools, it is a battery that powers the power tool and in the case of corded tools, it is AC current provided from a source voltage through an electrical line cord. This AC current may be modified according to the needs of the lighting device being employed as will be discussed in greater detail herein. In the case of LED lights, a rectifier or other means may be employed to convert AC current to DC.

With initial reference to FIG. 1, a power tool constructed in accordance to one example of the present disclosure is shown and generally identified at reference numeral 10. The power tool 10 has a housing 12 that may be of a clam shell type or any other suitable type housing. The power tool 10 can also have a nose cone 14 located at a front portion of the power tool 10. A handle 16 projects downwardly from the housing 12 and is terminated with a battery 18. The battery 18 provides the power to turn an end effector 20. The end effector 20 may be configured to hold an accessory or tool such as a drill bit or a driving type accessory including a Philips or standard screwdriver. Other types of tools or accessories may be held and used in the end effector 20 as can be appreciated by one skilled in the art. The movement of the end effector 20 may be controlled by a trigger 22. The trigger 22 may selectively provide power from the battery 18 to a motor 26 located within the housing 12. In some embodiments of the present disclosure, the more the trigger 22 is depressed, the more power may be applied to the motor 26, which may cause the end effector 20 to rotate faster.

The power tool 10 may be equipped with a clutch collar 30. Other embodiments in accordance with the present disclosure may not have a rotating clutch collar, but rather a different rotating collar mechanism. The rotating collar mechanism may be a drill/hammer mode selector, a gear shifter, an on/off switch, a tool variable speed control or other rotating collar control mechanism. However, this specification will refer to a clutch collar as an example but does not limit embodiments in accordance with the present disclosure to tools having clutch collars.

The clutch collar 30 can provide protection for interior portions of the power tool 10, particularly the transmission and other internal components of the power tool 10 that may be mounted on the nose cone 14. The clutch collar 30 may be rotated to adjust the transmission. An example of a clutch and transmission that may work in accordance with the present disclosure is shown in U.S. Pat. No. 7,066,691, which is incorporated by reference in its entirety. It will be appreciated that most any type of clutch and transmission may be used in accordance with the present disclosure. Different angular positions of the clutch collar 30 may provide different amounts of torque and/or speed to the end effector 20 for a given position of the trigger 22. A numbered scale 32 may be included on the clutch collar 30 in order to provide a user an indication of the setting of the clutch collar 30. In some embodiments, the user may turn the clutch collar 30 to a desired position by hand. A light ring 34 can be located on a front portion of the power tool 10 just behind the end effector 20 in a recess 36 in the clutch collar 30. The light ring 34 can include one or a series of LEDs that illuminate to shine light in a direction toward the end effector 20 and ultimately onto a workpiece. The configuration of the power tool 10 is merely an introductory example for the purposes of identifying one basic construction for incorporating LEDs on a power tool 10. As will become appreciated from the following discussion, various configurations for arranging the LEDs will be discussed as well as various configurations, and methods for controlling the LEDs will be described herein. Moreover, various configurations and methods for communicating power to the LEDs will be described herein.

Figure 4:
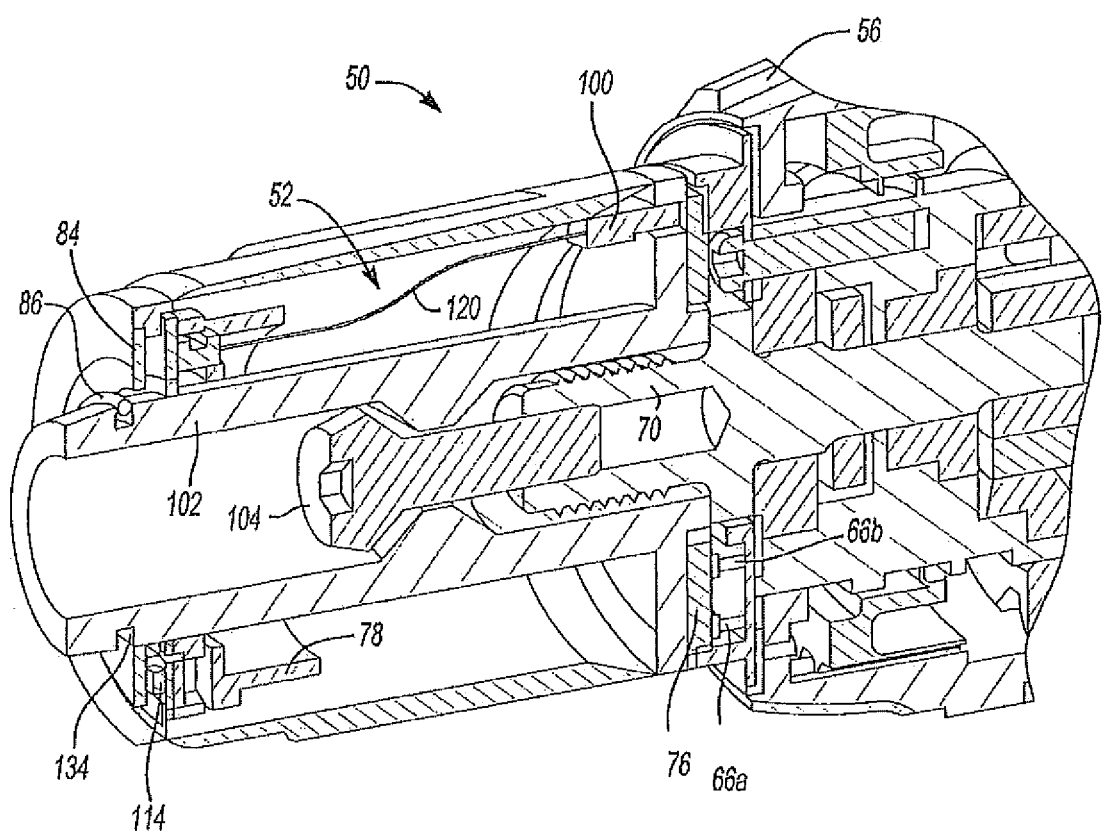
FIG. 4 is a longitudinal cross-sectional view of the portion of the power tool of FIG. 2.

With reference now to FIGS. 2-4, another drive constructed in accordance with the present teachings is generally indicated by reference numeral 50. The driver 50 can be a drill/driver of the type that is disclosed in U.S. patent application Ser. No. 12/610,762 (the disclosure of which is incorporated as if fully set forth in detail herein), except that a lighting system 52 is incorporated into the driver 50. In the example provided, the lighting system 52 includes a first portion 54, which can be mounted to an output spindle assembly 56, and a second portion 60 that can be coupled for rotation with a drill chuck 62.

The first portion 54 can comprise a series of spring contacts 66 that can be electrically coupled to a source of electrical power (e.g., to a battery pack via a trigger switch). The spring contacts 66 can comprise a first spring contact 66a and a second spring contact 66b that can be electrically isolated from one another. The first spring contact 66a can be offset in a radial direction by a first distance from a rotational axis 68 of an output spindle 70. The second spring contact 66b can be offset in a radial direction by a second distance that is different from the first distance.

The second portion 60 can comprise a sleeve 74, a coupler 76, a bushing 78, a holder 80, a circuit assembly 82, a cover 84, and a retaining ring 86. The sleeve can be received about the drill chuck 62 and can be configured to receive a rotary input from an operator to open or close the jaws (not shown) of the drill chuck 62. It will be appreciated that the drill chuck 62 can be any type of drill chuck, such as a keyless chuck.

The coupler 76 can include an annular plate 90, first and second conductor tracks 92 and 94, respectively, and a plug 100. The annular plate 90 can be formed of an electrically insulating material, such as a durable relatively non-conductive plastic (i.e., a plastic that is electrically insulating when an electrical potential that is less that 50 or 100 volts is applied to it). The annular plate 90 can be fixedly mounted on a spindle 102 of the drill chuck 62. The spindle 102 of the drill chuck 62 can be engaged to the output spindle 70 by any desired means. In the particular example provided, the spindle 102 of the drill chuck 62 can be threaded onto the output spindle 70 via left-handed threads and a spindle retaining fastener 104 may be fitted through the spindle 102 and threadably engaged to the output spindle 70. Accordingly, it will be appreciated that as the spindle 102 of the drill chuck 62 is coupled for rotation with the output spindle 70, the annular plate 90 will also rotate with the output spindle 70 by virtue of its connection to the spindle 102 of the drill chuck 62.

The first and second conductor tracks 92 and 94 can be mounted to a first side of the annular plate 90 and can be disposed concentrically such that they are electrically isolated from one another. The first and second conductor tracks 92 and 94 can be configured to electrically engage the first and second spring contacts 66a and 66b, respectively. The plug 100 can be fixedly coupled to a second side of the annular plate 90 and can comprise terminals (not specifically shown) that can be electrically coupled to the first and second conductor tracks 92 and 94.

In the particular example provided, the terminals extend through the annular plate 90 so as to intersect respective portions of the first and second conductor tracks 92 and 94 and solder is employed to electrically couple the terminals and the first and second conductor tracks 92 and 94. The bushing 78 can be received between the spindle 102 of the drill chuck 62 and the sleeve 74 on a side of the drill chuck 62 opposite the annular plate 90. A slot or groove 108 can be formed in the bushing 78. The holder 80 can be an annular structure that can define an annular trench 110. The circuit assembly 82 can include a circuit board 112, a plurality of LEDs 114, and a wire harness 120. The circuit board 112 can be formed of an insulating material and can include wires or conductors (not specifically shown) that can electrically couple the wire harness 120 and the LEDs 114. In the particular example provided, the circuit board 112 is a printed circuit board that is formed in an annular shape that is configured to be received in the correspondingly shaped trench 110 formed in the holder 80.

The LEDs 114 can be fixedly coupled to the circuit board 112 on a side opposite the holder 80. The wire harness 120 can comprise a plurality of wires 122 including first and second wires (not specifically shown) that can be coupled to the conductors of the circuit board 112 and to the conductors (not specifically shown) in the plug 100 to transmit electrical power between the plug 100 and the LEDs 114. The wires 122 can be received in the radial space between the spindle 102 of the drill chuck 62 and the sleeve 74 and can extend longitudinally through the groove 108 of the bushing 78.

The circuit assembly 82 can be coupled to the holder 80 in any desired manner, including adhesives, potting compounds, clips, and fasteners. In the particular example provided, the holder 80 comprises a plurality of retaining tabs 126 that can extend through tab apertures (not specifically shown) in the circuit assembly 82. The tabs 126 can be initially formed to extend in an axial direction that is generally parallel to a rotational axis 130 of the spindle 102 of the drill chuck 62, which can facilitate the axial translation of the circuit board 112 into the trench 110, and can be deformed in whole or in part to retain the circuit assembly 82 within the trench 110. The tabs 126 can be deformed by twisting or bending, but in the example provided, each of the tabs 126 is heated and bent over at a right angle so as to lie over a portion of the circuit assembly 82 adjacent a corresponding one of the tab apertures.

The cover 84 can be an annular structure that can be fitted to an axial end of the sleeve 74 opposite the coupler 76 and can aid in axially fixing the holder 80 in place in the sleeve 74 against a front face of the bushing 78. The cover 84 can be formed of a transparent material that can be clear or colored. The transparent material can be formed such that light received from the LEDs 114 will exit the cover 84 in a desired manner. For example, the light exiting the cover 84 can be spread or concentrated over a desired area to illuminate one or more relatively large areas and/or one or more relatively small points. The retaining ring 86 can be received in a ring groove 134 in the spindle 102 of the drill chuck 62 and can be configured to limit forward motion of the cover 84 relative to the sleeve 74 to thereby maintain the cover 84 on the spindle 102 of the drill chuck 62.

Figure 5:
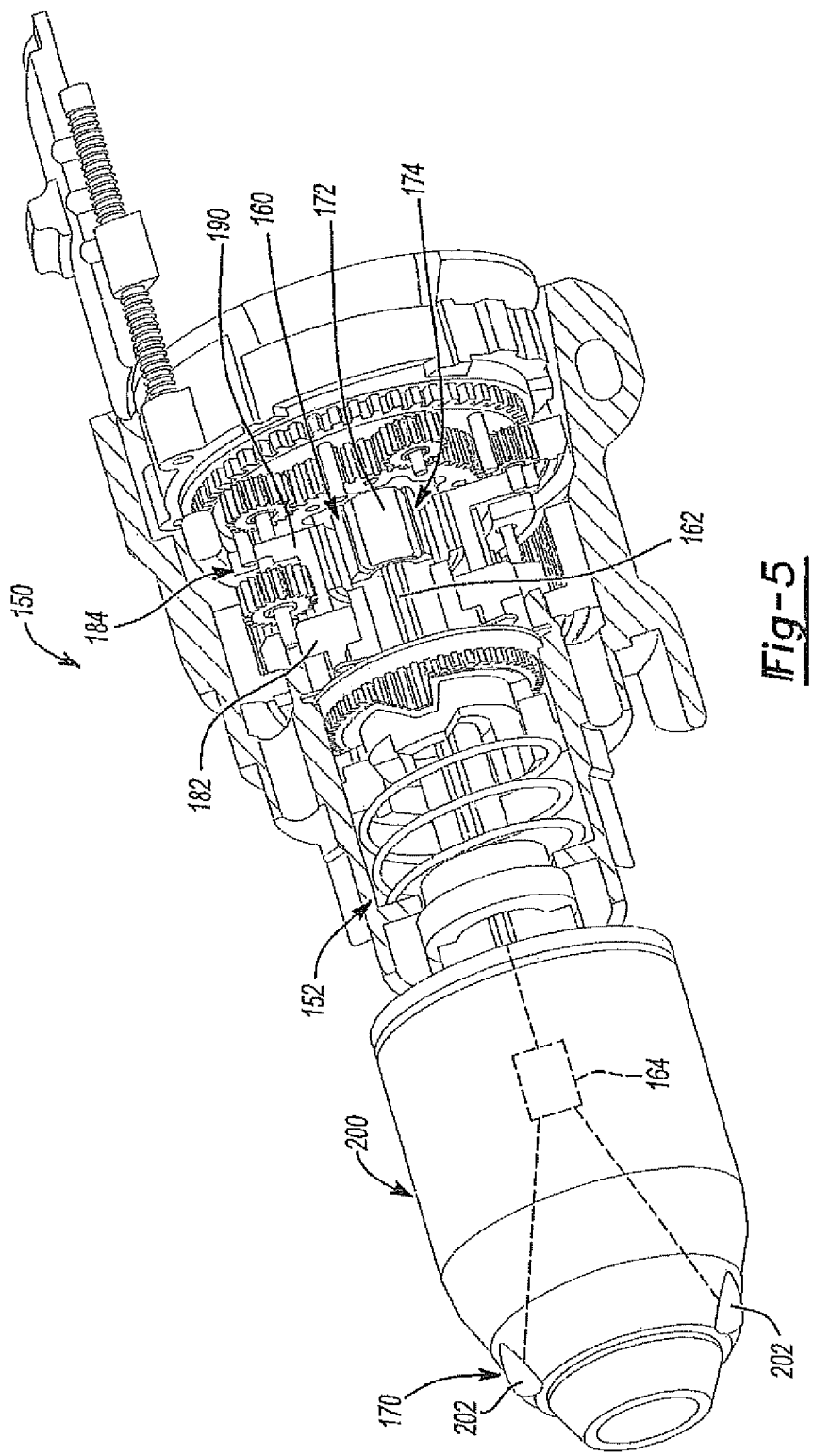
FIG. 5 is a perspective, partially sectioned view of a portion of another power tool constructed in accordance to the teachings of the present disclosure.
Figure 6:
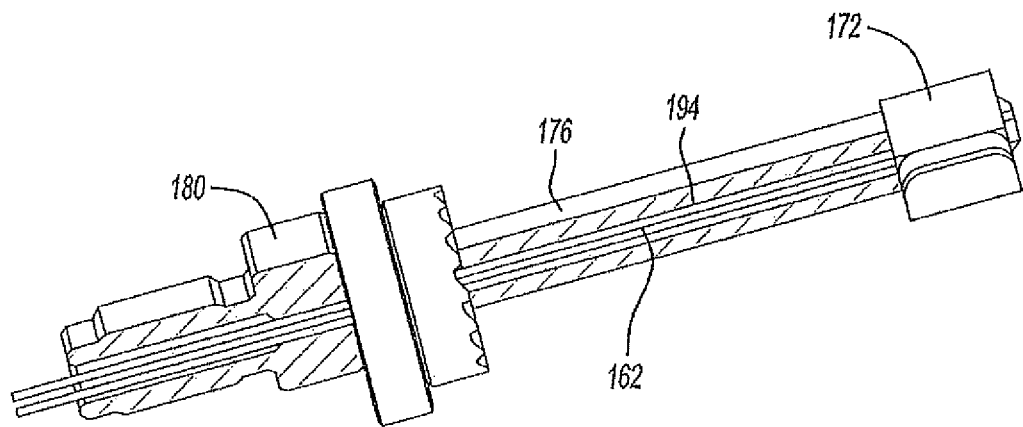
FIG. 6 is a perspective, partially sectioned view of a portion of the power tool of FIG. 5, illustrating an output spindle and a field winding in more detail.
Figure 7:
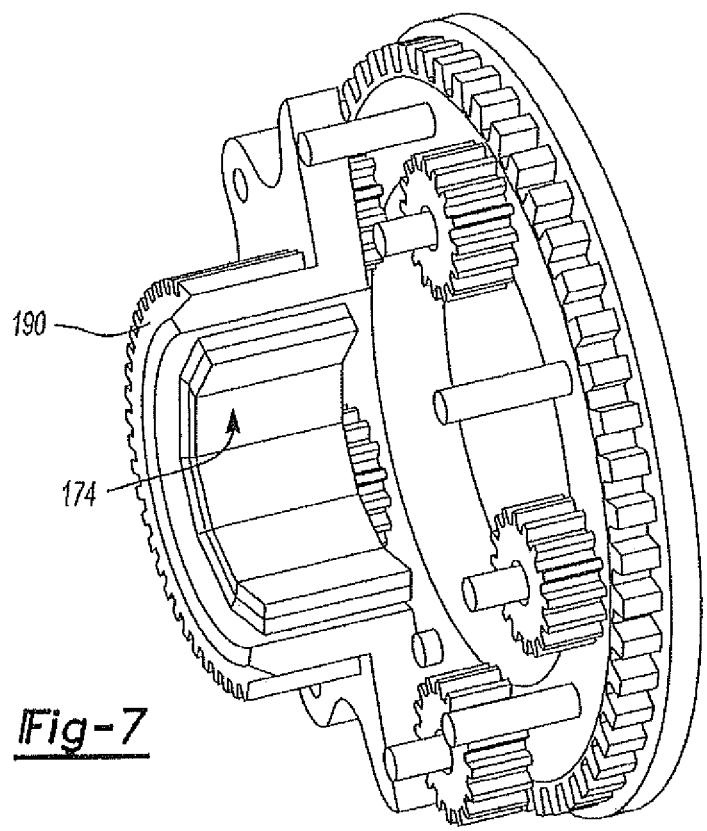
FIG. 7 is a perspective, partially sectioned view of a portion of the power tool of FIG. 5, illustrating a sun gear and a set of magnets in more detail.

With reference now to FIGS. 5-7, another driver constructed in accordance to the present teachings is shown and generally identified as reference numeral 150. The driver 150 can be a drill driver of a type that is disclosed in U.S. patent application Ser. No. 12/610,762, except that a lighting system is incorporated into the tool. In the example provided, the lighting system 152 includes a generator 160, a conductive connector 162, an energy storage device 164, and a circuit assembly 170. The generator 160 can comprise one or more field windings 172 and one or more sets of magnets 174. The field windings 172 can be mounted on a generator shaft portion 176 of the output spindle 180 of the driver 150. As will become appreciated from the aforementioned '762 patent application, the output spindle 180 can be coupled (e.g., via a spindle lock) to an output member of an output stage 182 of a multi-stage planetary transmission 184.

The generator shaft portion 176 of the output spindle 180 in the example shown can extend rearwardly of the output stage 182 to orient each field winding 172 with a component within the transmission 184 or driven by the transmission 184 that is configured to rotate at a speed that is higher than the rotational speed at which the output spindle 180 is driven. In the example shown, the generator shaft portion 176 extends rearwardly into a sun gear 190 that provides a rotary input to the output stage 182 of the transmission 184.

Each set of magnets 174 can be mounted to a rotating element of the transmission 184 (or an element rotated by the transmission 184) and can be arranged concentrically about an associated field winding 172. In the particular example provided, the set of magnets 174 is fixedly coupled to the sun gear 190 of the output stage 182 of the transmission 184. It will be appreciated that during operation of the driver 150, each set of magnets 174 will rotate at a speed that is higher than the rotational speed of its associated field winding 172 and that as a result of the speed differential, an electric current will be induced in the field windings 172. Explained differently, each set of magnets 174 and its associated field winding 172 comprise a generator that generates an electric current when rotary power is input to the transmission 184 during operation of the driver 150. The conductive connector 162 can be configured to electrically couple the generator 160 to the energy storage device 164 and/or to the circuit assembly 170. In the example shown, the output spindle 180 has a hollow longitudinally-extending cavity 194 into which the conductive connector 162 is received. The conductive connector 162 can comprise a pair of wires that can be received through the cavity 194 such that the conductive connector 162 is mounted coaxially within the output spindle 180.

The energy storage device 164 can be electrically coupled to the generator 160 and the circuit assembly 170 in any desired manner and can be any type of energy storage device, including a rechargeable battery. In the particular example shown, the energy storage device 164 is a capacitor that is mounted in a chuck 200 that is coupled to the output spindle 180 for rotation therewith. It will be appreciated, however, that the energy storage device 164 could alternatively be mounted within the output spindle 180.

Figure 8:
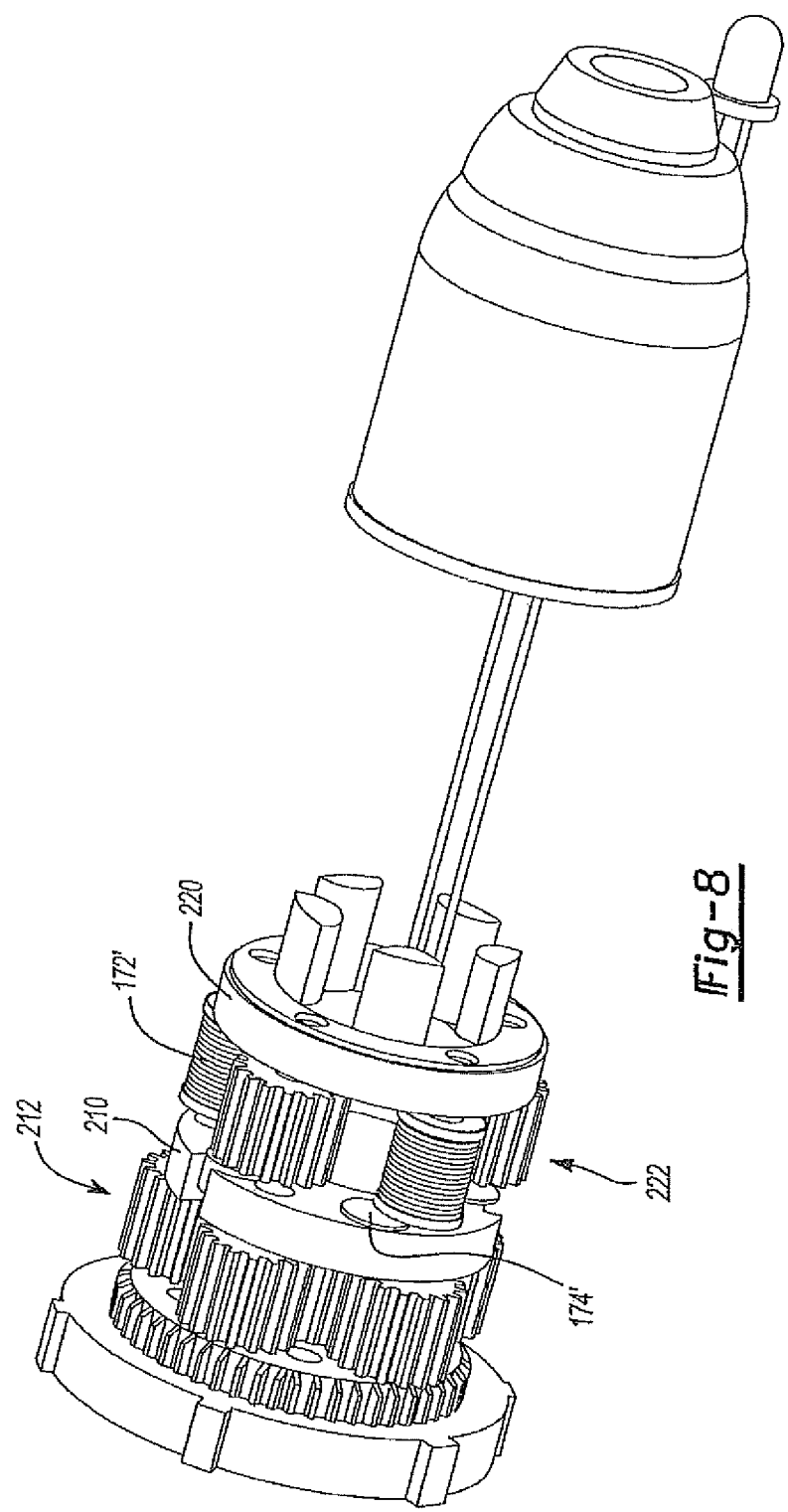
FIG. 8 is a perspective view of a portion of another power tool constructed in accordance with the teachings of the present disclosure.

The circuit assembly 170 can be electrically coupled to the generator 160 and/or to the energy storage device 164 (e.g., via the conductive connector 162) and can be mounted within the chuck 200. The circuit assembly 170 can comprise one or more LEDs 202 that can be driven by the electrical energy generated by the generator 160. While the generator 160 has been illustrated and described as including one or more field windings that are mounted on an output spindle of a tool, it will be appreciated that the generator 160 could be constructed differently. For example, a set of magnets 174' can be mounted to a planet carrier 210 of a first planetary stage 212 while field windings 172' can be mounted to a planet carrier 220 of a second planetary stage 222 as shown in FIG. 8 such that the set of magnets 174' rotate at a rotational speed that is higher than a rotational speed at which the field windings 172' rotate.

Figure 9:
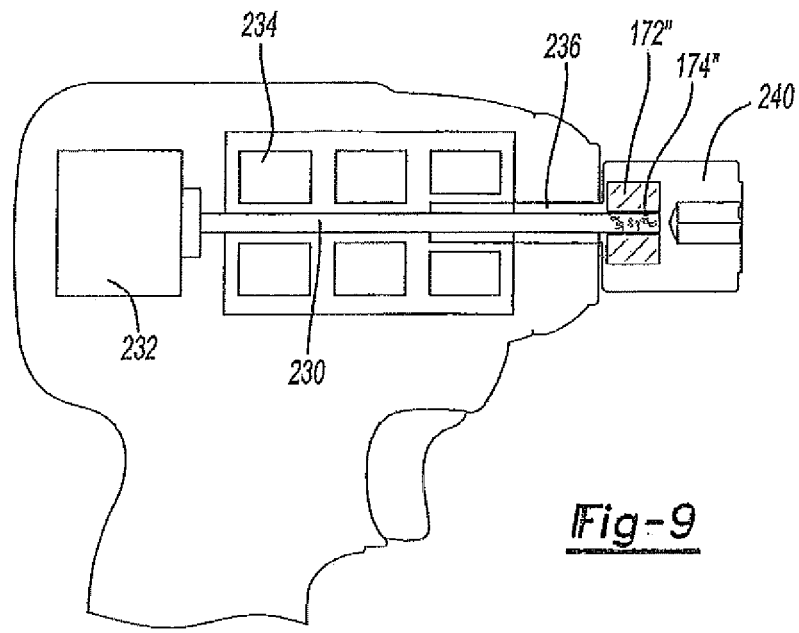
FIG. 9 is a schematic illustration of another power tool constructed in accordance with the teachings of the present disclosure.
Figure 10:
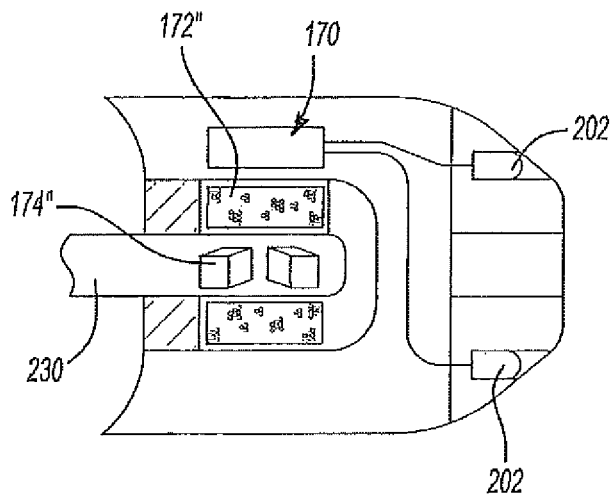
FIG. 10 is an enlarged portion of FIG. 9, illustrating a set of magnets and field windings positioned within the chuck.

With particular reference now to FIGS. 9-12, an additional configuration will be described. In FIGS. 9 and 10, a set of magnets 174" is mounted on a drive shaft 230 that receives rotary power directly from a motor 232 that drives a transmission 234. The drive shaft 230 can extend through the transmission and into a chuck 240 such that a distal end of the drive shaft 230 is mounted coaxially within the field windings 172" that are also housed in the chuck 240.

Figure 11:
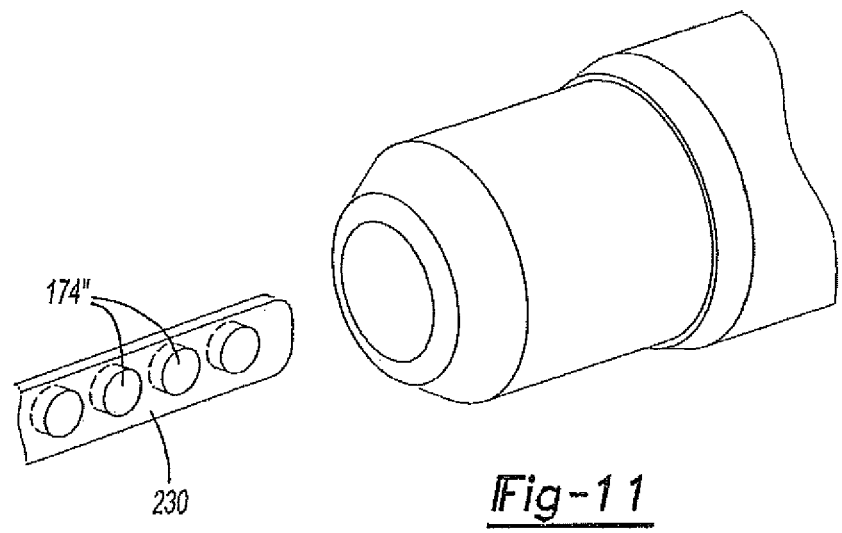
FIG. 11 is a schematic illustration of another manner of mounting the set of magnets to the drive shaft.
Figure 12:
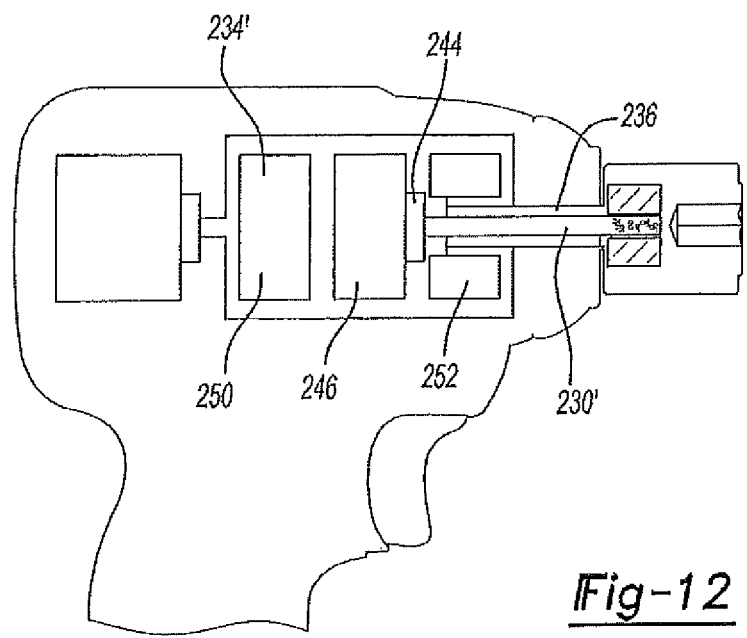
FIG. 12 is a schematic illustration of another power tool constructed in accordance with the teachings of the present disclosure.

The set of magnets 174" can be mounted to the distal end of the drive shaft 230. As shown in FIGS. 10 and 11, the set of magnets 174" can comprise two or more magnets that can be spaced apart axially along a portion of the distal end of the drive shaft 230. In FIG. 12, the drive shaft 230' is mounted to a component within a transmission 234' so as to permit the drive shaft 230' to rotate at a speed that is higher than the rotational speed of the output spindle 236. In the example illustrated, the drive shaft 230' is coupled for rotation with a planet carrier 244 associated with a second stage 246 of the transmission 234' that is in intermediate input and output stages 250 and 252 of the transmission 234'.

Figure 13:
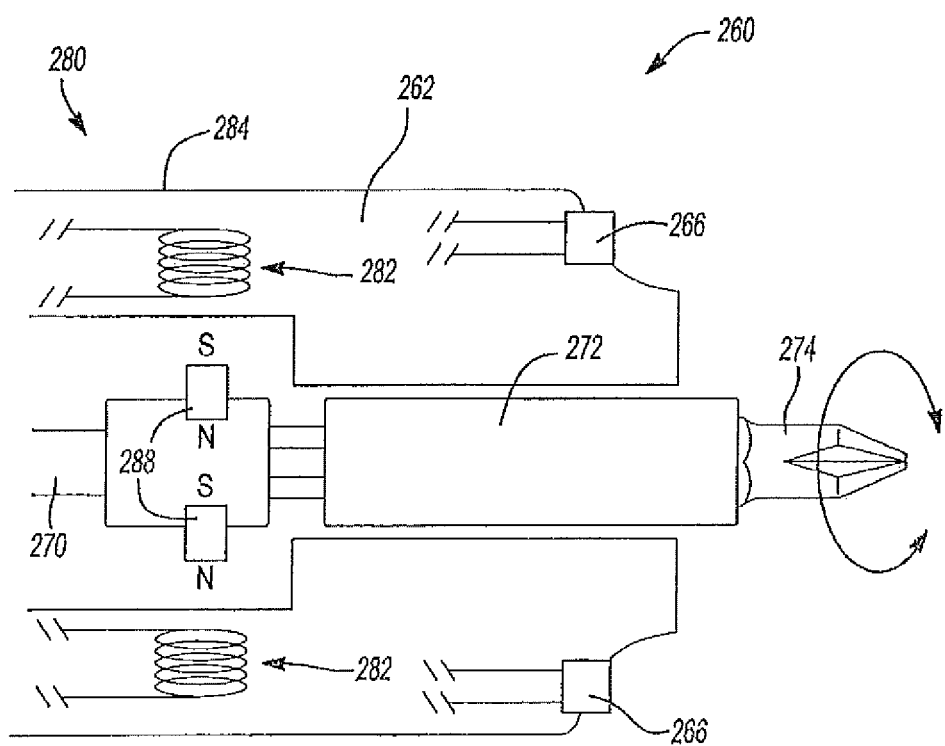
FIG. 13 is a schematic illustration of a lighting system constructed in accordance to additional features of the present teachings.

Turning now to FIG. 13, a lighting system constructed in accordance to additional features of the present teachings is shown and generally identified at reference numeral 260. The lighting system 260 is generally configured as part of a removable chuck nose 262. The removable chuck nose 262 can incorporate a series of LEDs 266 on a forward end. The removable chuck nose 262 can be selectively attached to the remainder of the tool and can be used for various aspects such as depth limiting purposes. The removable chuck nose 262 can cooperate with an output spindle 270 that is driven by an output member of the power tool. An accessory receiver 272 can be coupled to the output spindle 270 for receiving an accessory 274. The lighting system 260 can provide a self-contained power source 280 that includes coils 282 arranged in a body 284 of the removable chuck nose 262 and magnets 288 mounted to the output spindle 270. As can be appreciated, as the output spindle 270 rotates, the magnets 288 induce a magnetic field. The magnetic field can be rotated relative to the coils 282. The coils 282 would act as an inductor. When the magnetic field passed by the coils 282, a change in flux would be created through the coils 282, which would induce an electrical current in the wires 282. This current can be used to power the LEDs 266.

Figure 14:
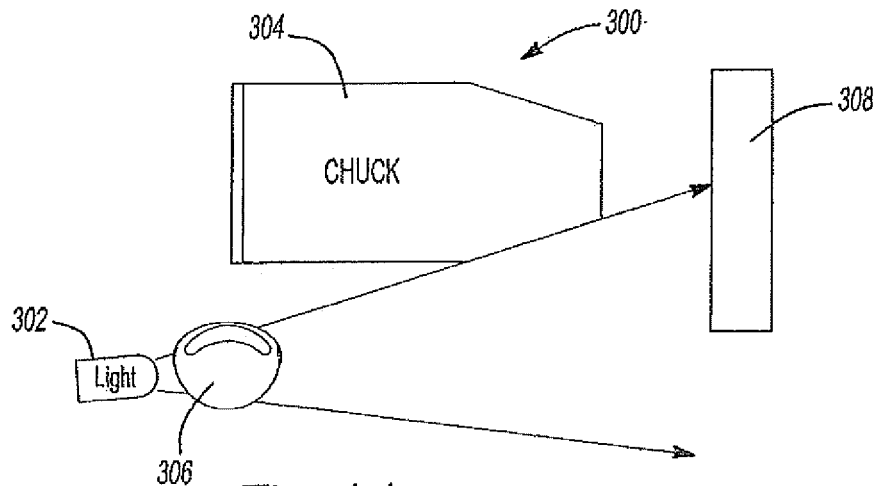
FIG. 14 is a side view of an exemplary lighting system according to prior art.

With reference now to FIGS. 14-22, various lighting configurations for a drill chuck will be described. FIG. 14 illustrates a conventional prior art lighting system 300 that includes a light 302 (such as an LED, etc.) that can be mounted to a body of the tool. In such a configuration, the light emitted from the light 302 can be blocked by the chuck and/or accessories extending in the chuck 304 and/or an extremity 306 (such as a finger) of a user. In the configuration of the lighting system 300 shown in FIG. 14 according to prior art, the light may not fully illuminate a workpiece 308 as desired by the operator.

Figure 15:
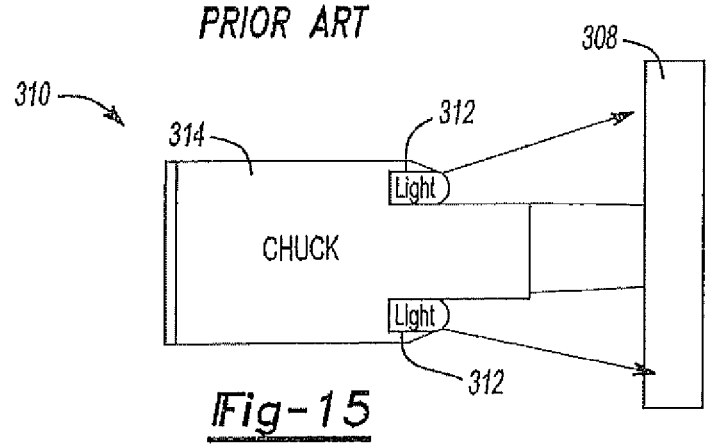
FIG. 15 is a side view of a lighting system constructed in accordance to other features of the present teachings.
Figure 16:
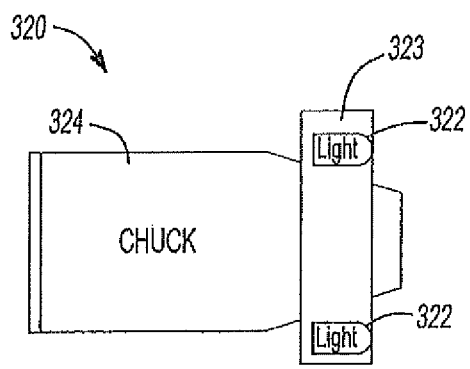
FIG. 16 is a side view of another exemplary lighting configuration according to the present teachings.
Figure 17:
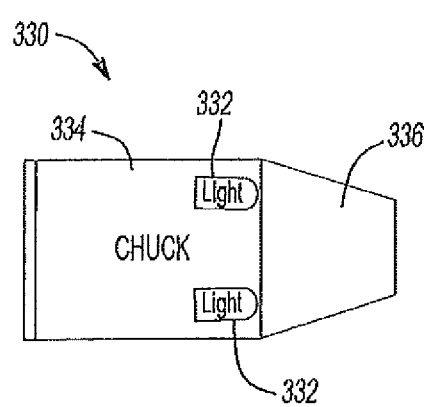
FIG. 17 is a side view of still another lighting configuration constructed in accordance to the present teachings.

Turning now to FIG. 15, a lighting system 310 according to the present teachings includes lights 312 that are mounted in the body of the chuck 314. By adding one or more lights 312 to the chuck 314, the coverage of the light emitted by the lights 312 onto the workpiece 308 is improved. A lighting system 320 illustrated in FIG. 16 includes lights 322 configured as part of a collar 323 that may be separately mounted onto a chuck 324. As shown in FIG. 17, a lighting system 330 includes lights 332 that may be mounted to a chuck 334. The lights 332 can be configured to emit light into a clear shield 336 arranged at a distal end of the chuck 334. The configurations of the lighting systems 310, 320, and 330 provide an improved lighting of the workpiece 308 over the configuration shown in the prior art FIG. 14.

Figure 18:
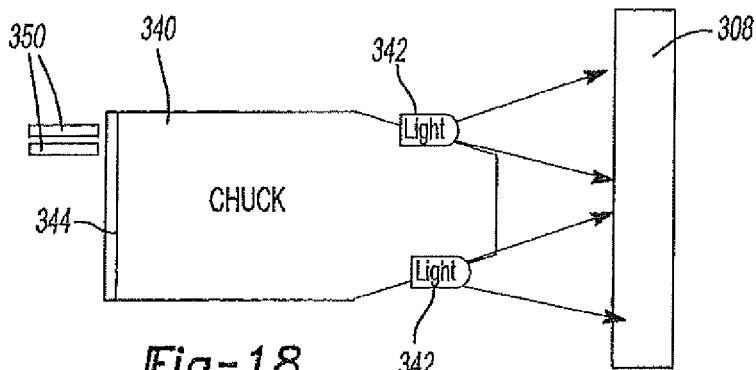
FIG. 18 illustrates a partial exploded view of a chuck assembly including spring loaded brushes that cooperate with a track configured on the chuck.
Figure 19:
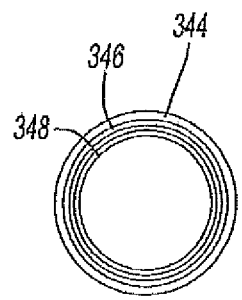
FIG. 19 is a plan view of the track of FIG. 18.
Figure 20:
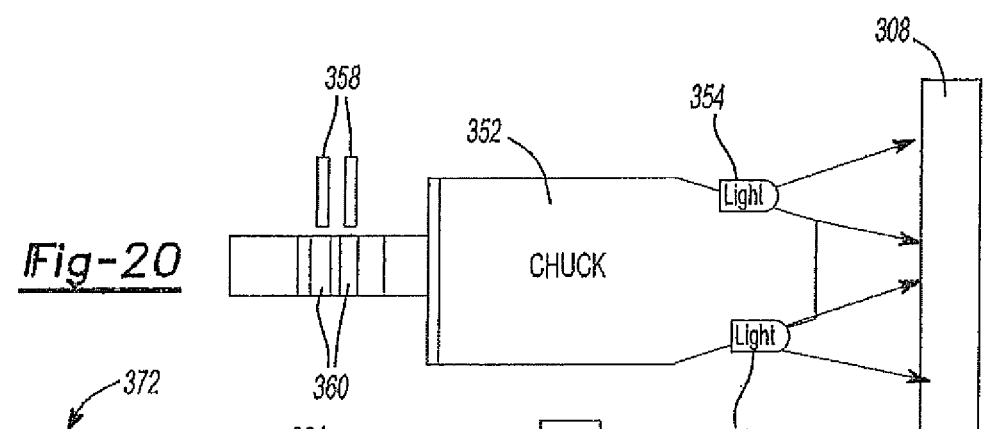
FIG. 20 is a side view of another exemplary lighting configuration having a track constructed in accordance to other features of the present teachings.
Figure 21:
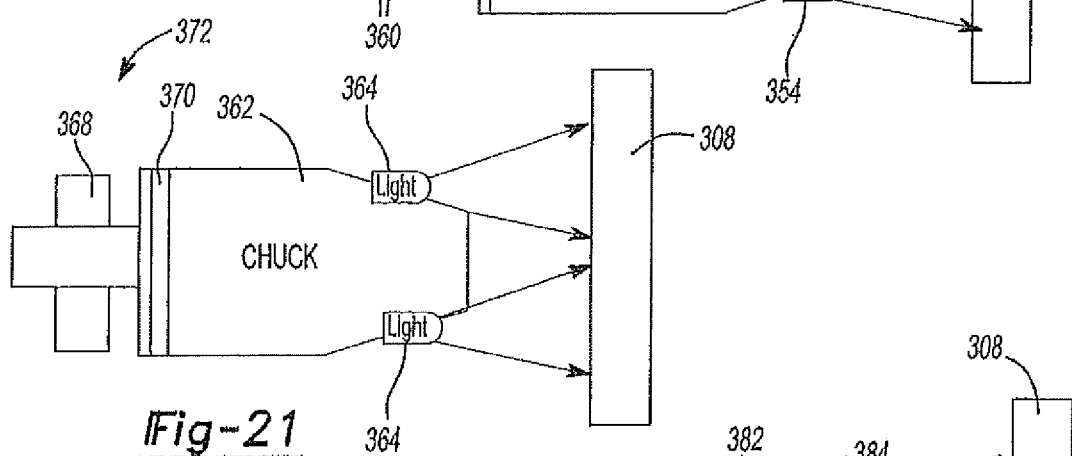
FIG. 21 is a side view of another exemplary lighting system that incorporates a frequency generator and piezoelectric receiver according to other features of the present disclosure.
Figure 22:
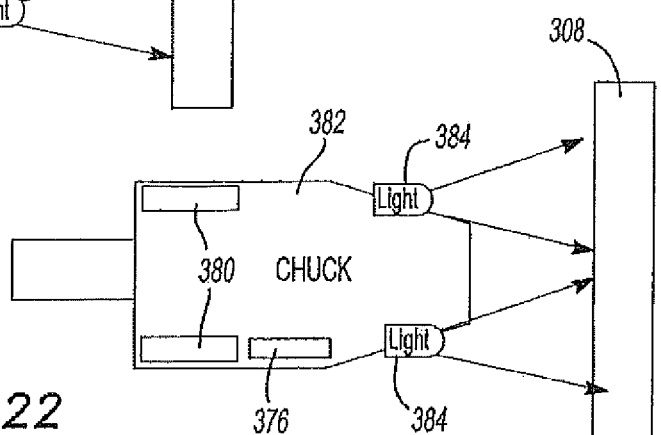
FIG. 22 is a side view of another exemplary lighting configuration that incorporates a capacitor and piezoelectric module according to other features.
Figure 23:
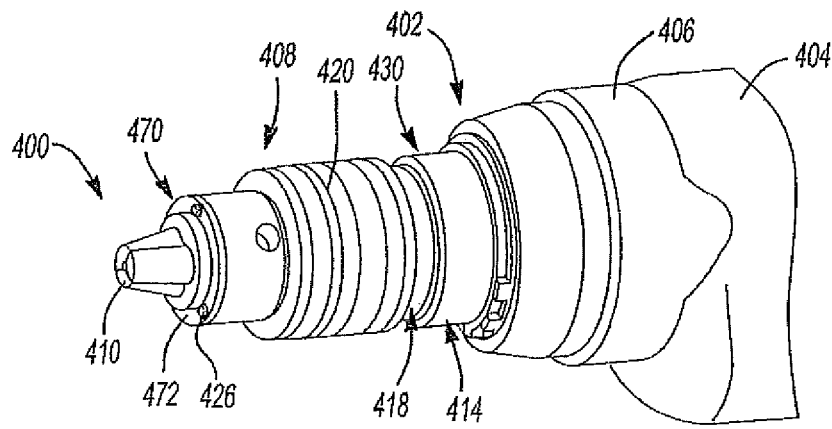
FIG. 23 is a side perspective view of an exemplary lighting configuration constructed on a chuck according to other features of the present disclosure.
Figure 24:
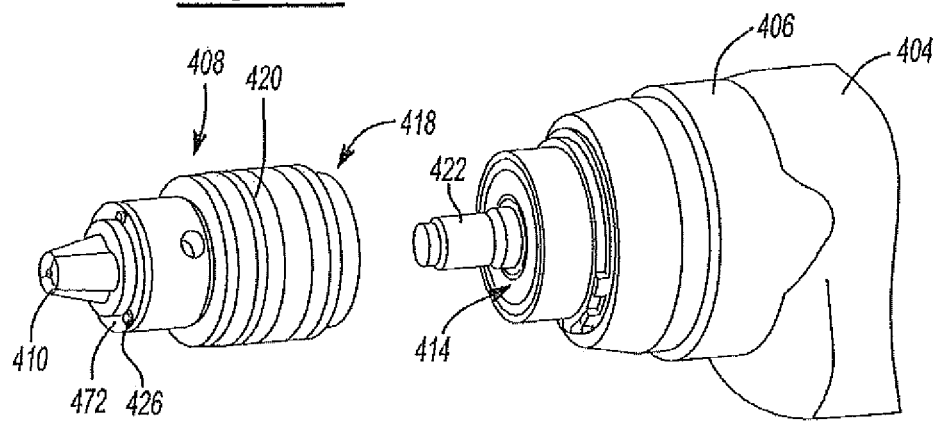
FIG. 24 is an exploded perspective view of the power tool and chuck shown in FIG. 23.

With reference now to FIGS. 18-22, various configurations and methods for transferring power to a spinning chuck will be described. As illustrated in FIG. 18, a chuck 340 incorporates lights 342 thereon. The chuck 340 incorporates a conductive track 344 on a proximal end. The track 344 can comprise a first track 346 and a second track 348. In one configuration, one of the tracks 346 or 348 can be configured for transmission of electrical power while the other track can be configured for a return path. In other examples, a single path may be used for a transmission and return path. Spring loaded brushes 350 can be mounted to the tool. In this regard, as the chuck rotates, the brushes 350 can make contact with the track 344 and provide power to the tool. The power can be used to power the lights 342 and/or can be used to provide power elsewhere in the tool. In other examples, a slip ring system could be installed inside the tool, with the brushes 350 providing power. In the example shown in FIG. 20, a chuck 352 incorporates lights 354 for illuminating the workpiece 308. Spring loaded brushes 358 can be mounted to the tool while a track 360 can be cooperatively provided for transferring power. In FIG. 21, a chuck 362 is provided that incorporates lights 364 for illuminating a workpiece 308. The chuck 362 incorporates a frequency generator 368 and a piezoelectric receiver 370. The piezoelectric receiver 370 and frequency generator 368 can cooperate to form a piezoelectric generator 372 that generates electricity from the movement of the chuck 362. In such a configuration, the lights 364 would be turned on whenever the chuck 362 is rotated. A capacitor 376 (FIG. 22) could be installed to provide a delay between the time after the chuck 362 stops rotating and when the lights 364 shut off. In the configuration shown in FIG. 22, a piezoelectric module 380 can be configured on a chuck 382 having lights 384 that can be configured to shine on the workpiece 308. The piezoelectric module 380 can enable power to be generated from the rotational motion of the chuck 382. Alternatively, a battery may be disposed inside the tool holder and in conjunction with a centrifugal switch or motion activated switch or sensor, power the LEDs on the chuck when the chuck is rotating. The design of the chuck would allow access for the user to change the battery.

Turning now to FIGS. 23-31, a lighting system 400 constructed in accordance to additional features of the present disclosure will now be described. The lighting system 400 generally comprises a transformer coil assembly 402 that is configured on a power tool 404. The power tool 404 generally includes a tool housing 406 that incorporates an end effector in the form of a chuck 408 having a plurality of jaws 410. The transformer coil assembly 402 generally includes a primary coil subassembly 414 and a secondary coil subassembly 418. As will be described herein, the primary coil subassembly 414 is fixed relative to the tool housing 406 while the secondary coil subassembly is fixed to a chuck body 420 of the chuck 408. The primary coil subassembly 414 and the secondary coil subassembly 418 are both mounted concentric with an output shaft 422. LEDs 426 are positioned on a front end of the chuck 408 and illuminated in a direction toward a workpiece with use of the transformer coil assembly 402.

Figure 25:
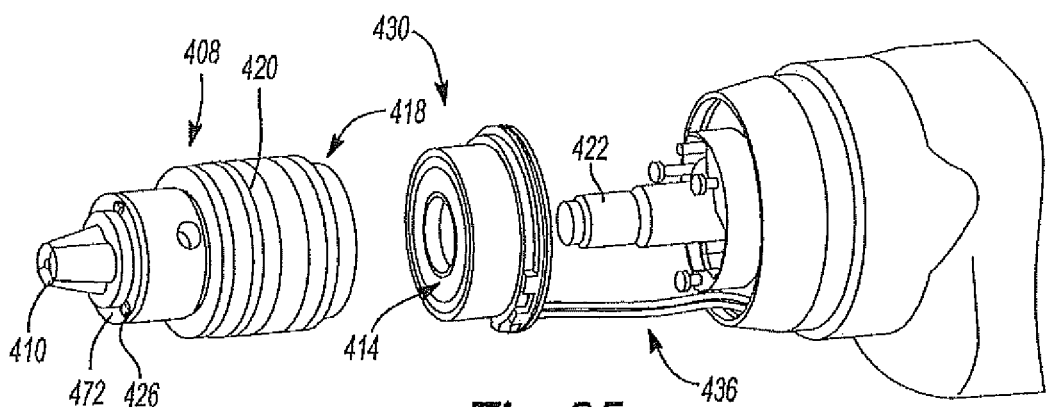
FIG. 25 is another exploded perspective view of the power tool of FIG. 23 showing a primary coil subassembly exploded from the tool body.

In the example shown, the primary coil subassembly 414 is attached to a mode collar retainer 430. The primary coil subassembly 414 is attached to a primary coil wiring harness 436 that connects to a power source of the power tool and may be routed inside the tool housing 406 as shown in FIG. 25. In other embodiments, the primary coil wiring harness 436 may be routed outside of the tool housing such as in a conduit or other retainer.

Figure 26:
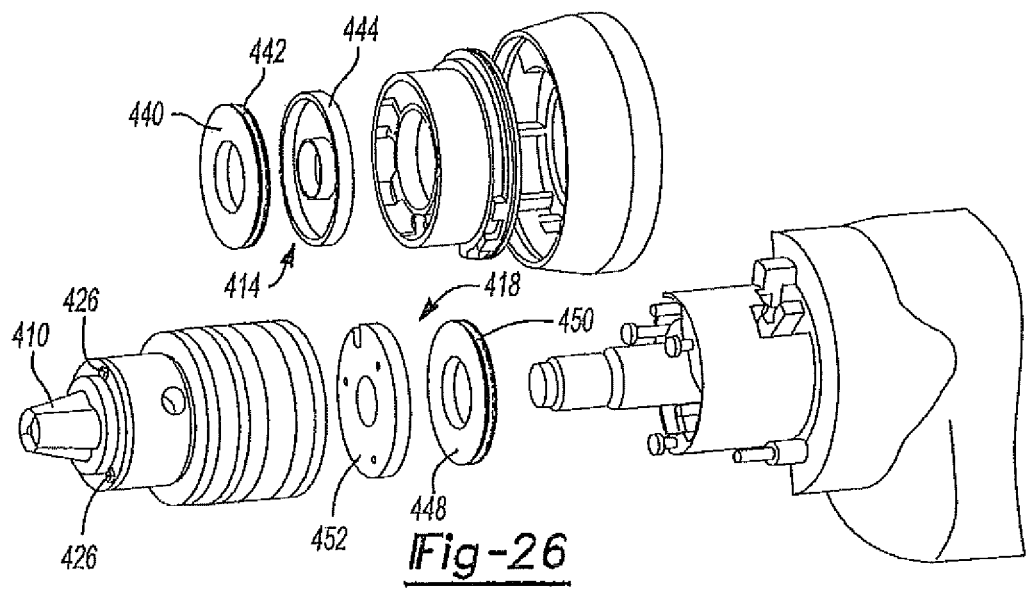
FIG. 26 is another exploded perspective view of the power tool of FIG. 23 that illustrates additional features including a primary coil subassembly and a secondary coil subassembly.
Figure 27:
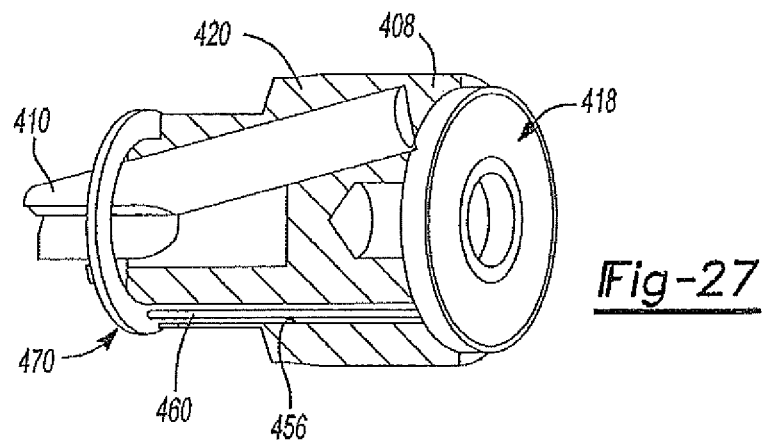
FIG. 27 is a sectional view of the chuck of the power tool shown in FIG. 23 illustrating the secondary coil subassembly attached to a rearward facing surface of the chuck body.
Figure 28:
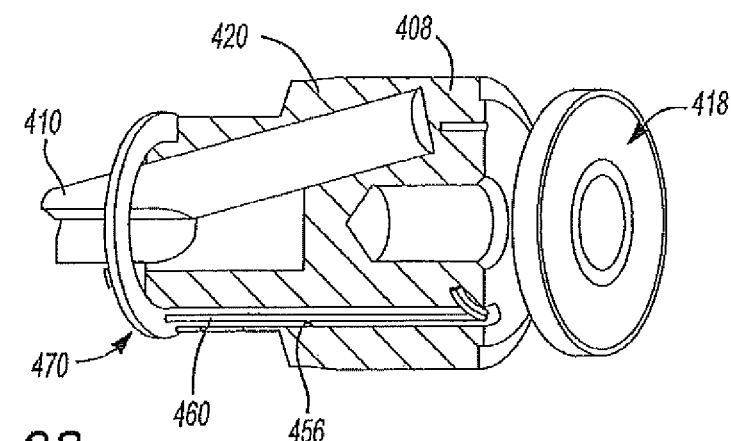
FIG. 28 is a partial sectional view of the chuck shown in FIG. 27 and illustrating the secondary coil subassembly exploded from the chuck body.

With reference now to FIG. 26, the primary coil subassembly 414 and the secondary coil subassembly 418 will be described in greater detail. The primary coil subassembly 414 generally includes a primary coil bobbin 440, a primary wire 442 that is wound around the primary coil bobbin 440, and a primary coil housing 444 that receives the primary coil bobbin 440. The primary coil housing 444 can be formed of metallic material. The secondary coil subassembly 418 can generally comprise a secondary coil bobbin 448 having a secondary wire 450 wound therearound and a secondary coil housing 452. The secondary coil housing 452 can receive the coil bobbin 448 therein. As shown in FIG. 27, the secondary coil subassembly 418 is attached to a rearward facing surface of the chuck body 420 of the chuck 408. A passageway 456 can be formed through the chuck body 420 of the chuck 408 for wiring 460 to pass from the secondary coil subassembly 418 to the LEDs 426 at the front end of the chuck 408. The passageway may be a hole drilled in the chuck body 420 between a pair of jaws of the chuck jaws 410. It will be appreciated that while the example shown herein is a keyed, three-jaw chuck, that any other configuration including keyless chuck (such as disclosed herein at FIGS. 74-86) or pusher style chucks may be used. It is also appreciated, as will be discussed in detail herein, that the configuration may be used in a clamping tool (see for example FIGS. 36-39) or other configurations where it is desired to place LED lighting, electronics and/or sensors on a component moving relative to the body of the tool that is wired to the main power of the tool and/or contains a battery. The LEDs 426 and secondary coil subassembly 418 may also be attached to the chuck sleeve and the wiring 460 may be routed in the chuck sleeve. In other configurations, the space between the chuck jaws 410 toward the rear area of the chuck 408 may be utilized to accommodate wires, support electronics, or integrate sensors. The output shaft 422 cooperates with the metallic primary coil housing 444 and metallic secondary coil housing 452 to provide flux paths. The utilization of these components can significantly increase the coupling between the primary and secondary coil subassemblies 414 and 418, and thus the power transferred therebetween. In use, magnetic flux is conveyed by the output shaft 422 to provide a mutual inductance that couples energy from the primary wire 442 (connected to the power source of the tool) to the secondary wire 450 (connected to the LEDs 426). In the example shown in FIG. 30, the secondary coil housing 452 may be integrally formed with the chuck body 420 of the chuck 408. In other examples, the primary coil housing 444 may be integrally formed with the tool housing 406 of the power tool 404.

Figure 29:
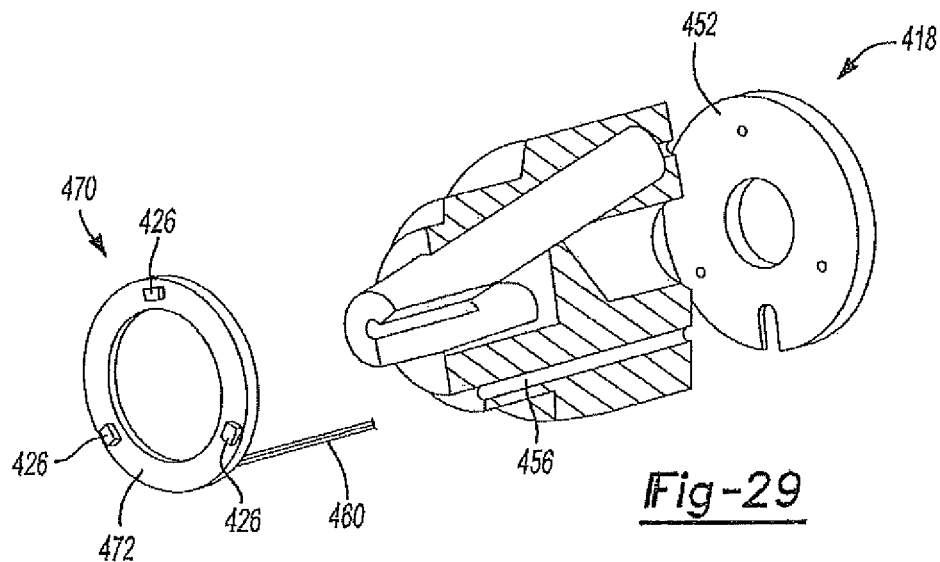
FIG. 29 is a front perspective exploded view of the chuck, secondary coil subassembly, and light ring of FIG. 28.
Figure 30:
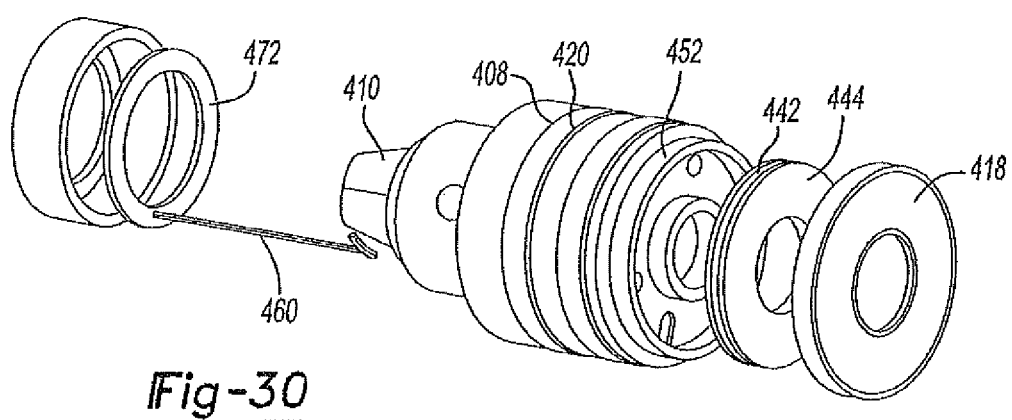
FIG. 30 is a rear perspective exploded view that illustrates the secondary coil housing as integrally formed with the chuck body according to additional features.
Figure 31:
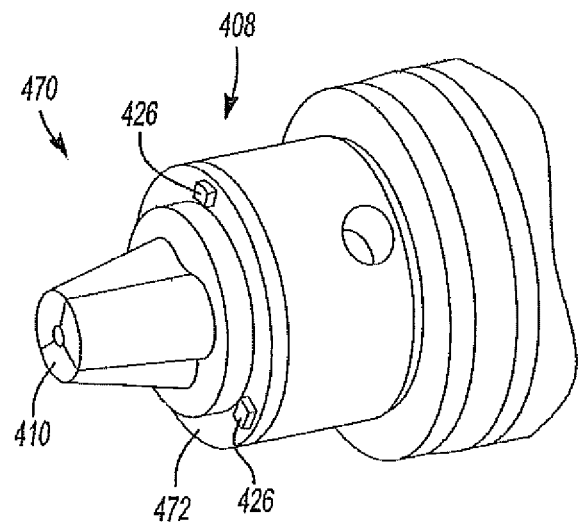
FIG. 31 is a detail front perspective view of the light ring shown mounted onto the chuck.
Figure 32:
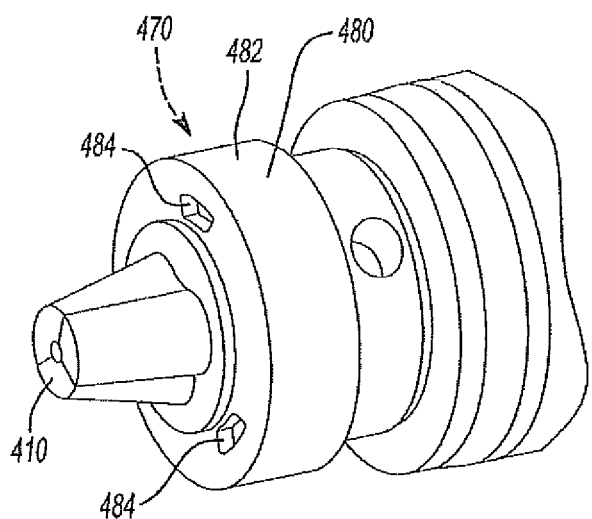
FIG. 32 is a front perspective view of the chuck of FIG. 31 that incorporates a protective cover according to additional features.
Figure 36:
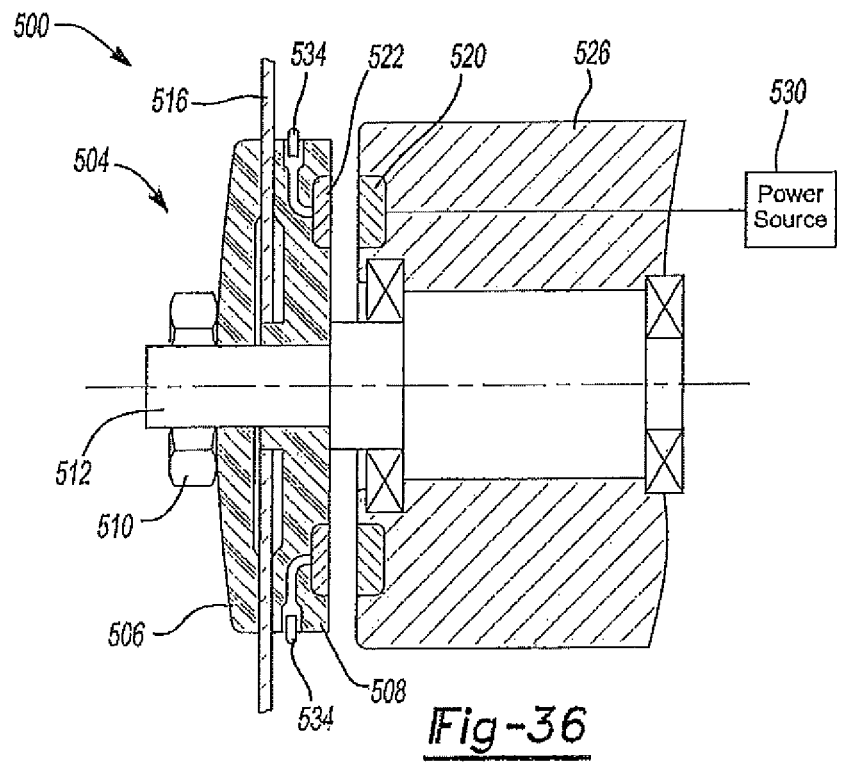
FIG. 36 is a cross-sectional view of a lighting system constructed in accordance to other features that includes a clamp washer assembly.

The LEDs 426 may be part of an LED light ring subassembly 470. The LED light ring subassembly 470 can include the LEDs 426 that are arranged around a printed circuit board (PCB) 472 (FIG. 29). The wiring 460 can electrically connect the LEDs 426 by way of the printed circuit board 472 to the secondary wire 450 of the secondary coil subassembly 418. FIG. 32 illustrates a protective cover 480 disposed around the LED light ring subassembly 470. The protective cover 480 generally includes a cover body 482 that incorporates a series of openings 484 therearound. The openings 484 are configured to align with the LEDs 426 to allow light emitted from the LEDs 426 to pass therethrough.

FIG. 33 illustrates the LED light ring subassembly 470 surrounded by a protective cover 490. The protective cover 490 can be clear or translucent. FIG. 34 incorporates another protective cover 492 that is mounted around the LED light ring subassembly 470. The protective cover 492 can surround the LED light ring subassembly 470 to protect the LEDs 426 and PCB 472. The protective cover 492 can be formed of plastic, metal, or other rigid material. The protective cover 492 can be completely or partially formed integral to a chuck component such as the chuck body 420 or a chuck sleeve. The configuration shown in FIG. 35 provides a single LED 426' that is embedded into the chuck body 420.

With reference now to FIGS. 36-39, a lighting system 500 constructed in accordance to additional features of the present teachings will be described herein. The lighting system 500 is generally configured on a power tool that incorporates an end effector in the form of a clamp washer assembly 504 having an outer clamp washer 506 and an inner clamp washer 508. As is known in the art, the outer clamp washer 506 can be urged toward the inner clamp washer 508 such as by threading a nut 510 along an output shaft 512 to clamp an accessory 516 therebetween. The accessory 516 can be a cutting disk, a sanding member, or other working tool. A pair of coils including a primary coil 520 and a secondary coil 522 are configured to transmit power from a tool housing 526 to the rotating clamp washer assembly 504. The primary coil 520 can be fixed to the tool housing 526 and excited in such a manner as to induce a power transfer to the secondary coil 522. The secondary coil 522 can be disposed or integrally formed with the inner clamp washer 508. The primary coil 520 can be wired to a power source 530 on the tool housing 526. The secondary coil 522 can be wired to LEDs 534. The LEDs 534 can be arranged to illuminate radially outward.

Figure 37:
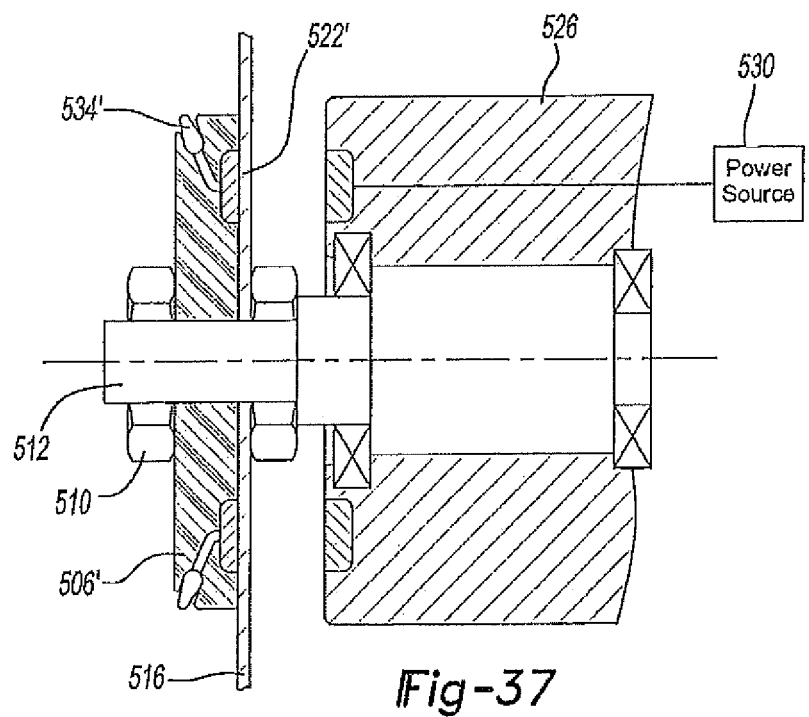
FIG. 37 is a cross-sectional view of a lighting system constructed in accordance to other features that includes a clamp assembly including an outer clamp that incorporates secondary windings according to other features.

The configuration shown in FIG. 37 provides a secondary coil 522' that is arranged for use with the outer clamp washer 506'. In the example shown in FIG. 37, power may not be able to be transferred through an accessory 516 that is formed of metal which is a hard magnetic material as opposed to a soft magnetic material. However, power may be communicated through the accessory 516 if the tool is made of an abrasive cut-off wheel or a grinder wheel. The LEDs 534' are also configured in the outer clamp washer 506'.

Figure 37A:
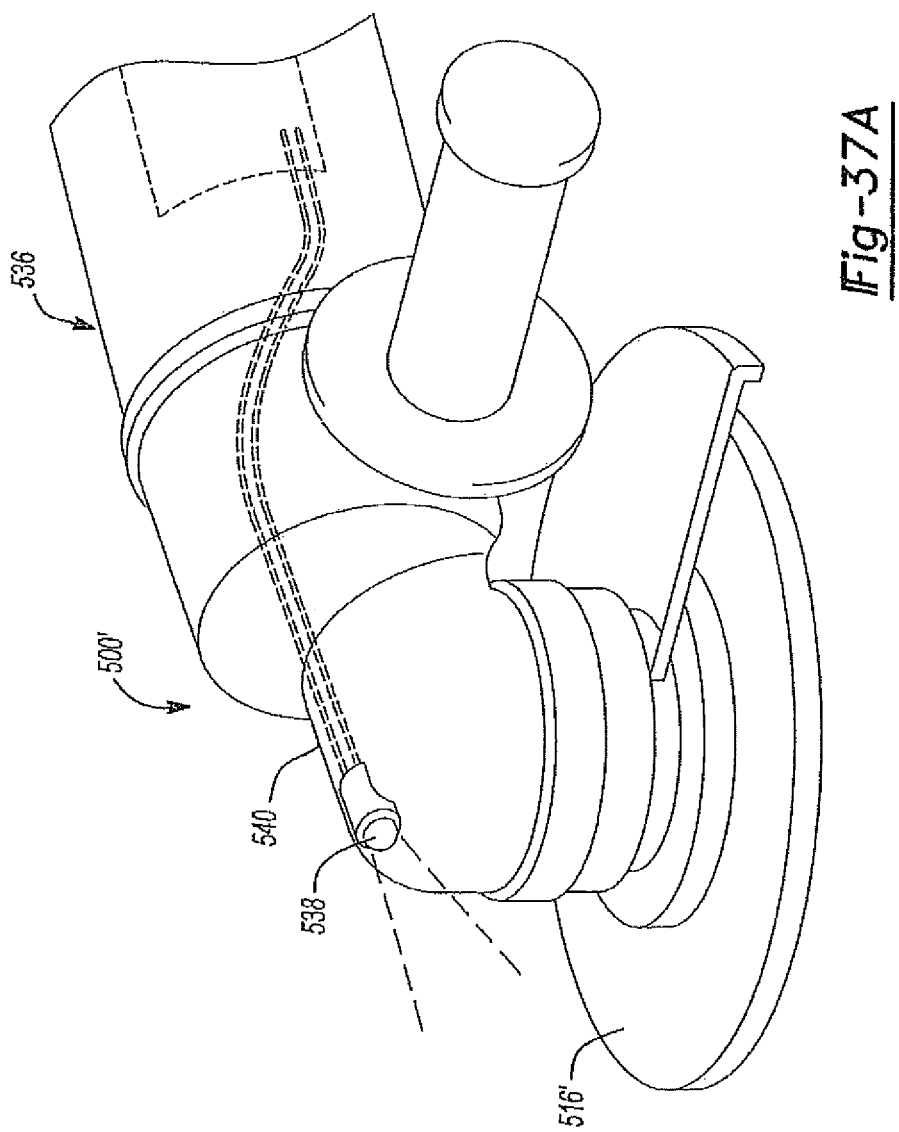
FIG. 37A is a perspective view of a grinding tool incorporating a lighting system according to the present disclosure.

With reference to FIG. 37A, a lighting system 500' constructed in accordance to additional features of the present teachings is shown. The lighting system 500' is generally configured on a grinder tool 536 that incorporates an end effector in the form of a grinding wheel 516'. The lighting system 500' can be powered by alternating current, such as disclosed in the identified embodiments herein. The lighting system 500' can generally include an LED 538 (or a collection of LEDs) coupled to an upper housing 540. In the example shown, the housing 540 can generally be in the form of an upper gearbox case of the grinder tool 536. In this regard, the LED 538 can be affixed in a configuration so as to shine emitted light in a direction toward the grinding wheel 516' and associated workpiece.

Figure 38:
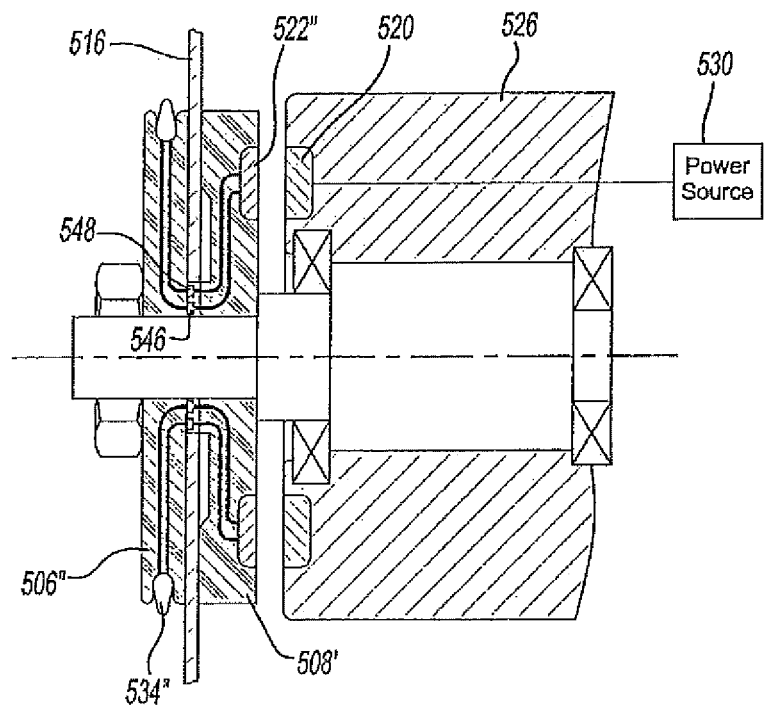
FIG. 38 is a cross-sectional view of another lighting system that is incorporated on a clamp washer assembly.
Figure 39:
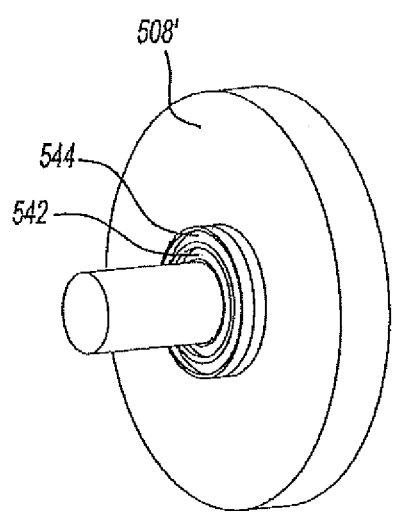
FIG. 39 is a rear perspective view of an inner clamp washer of the clamp washer assembly of FIG. 38.

FIGS. 38 and 39 illustrate another configuration where a secondary coil 522" is configured on an inner clamp washer 508' and the LEDs 534" are configured in the outer clamp washer 506". The inner clamp washer 508' includes a pair of isolated conductive concentric tracks 542 and 544. In the outer clamp washer 506", the LEDs 534" are mounted to illuminate radially outwardly. Conductors 546 and 548 are configured to electrically connect with the tracks 542 and 544 on the inner clamp washer 508'. In this regard, power is conducted to the LEDs 534" on the outer clamp washer 506". Such a configuration can be configured for use with metallic and non-metallic wheels 516. Notably, the LEDs 534" may be powered on either the inner or outer clamp washers 506', 506", or on both of the inner and outer clamp washers 508' and 506". The LEDs 534" may be used for illumination of the workpiece and/or to generate a shadow cut line on a workpiece on one or both sides of the accessory 516. A laser LED may also be placed on the tool holder and used to project a line, dot or other image on a portion of a tool (like a table) and/or the workpiece to indicate a cut line, orientation of the tool to the workpiece, or some condition of the tool or tool holder. For example, the laser may illuminate a red spot on the work surface when the chuck has not been tightened adequately. In other benefits, sensors may be located on the inner and/or outer clamp washers 508', 506" and have a source of power. Information may also be transferred between the components. In other examples, a sensor can be located on one of the inner or outer clamp washers 508', 506" that may be able to identify the type of accessory. This information may be transmitted to a controller in the tool and the controller may be configured to adjust the performance of the tool to match the accessory 516.

Figure 40:
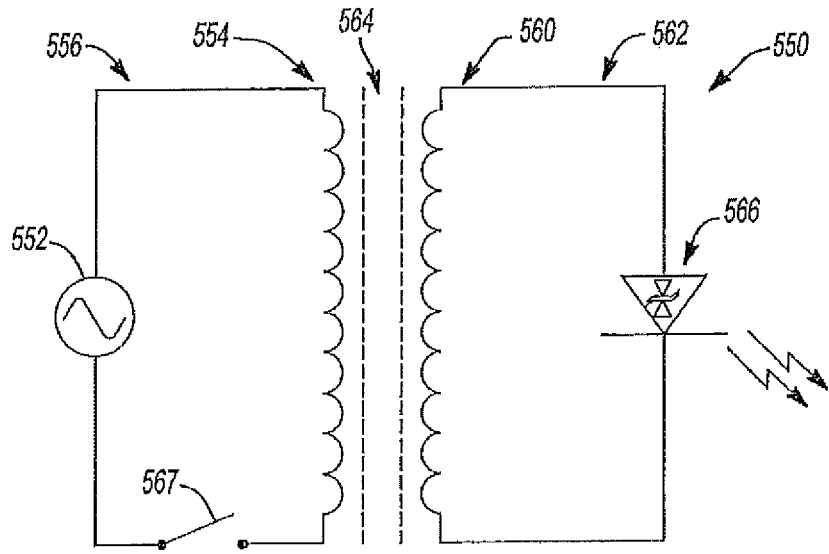
FIG. 40 is an exemplary schematic representation of a rotary transformer constructed in accordance to one example of the present teachings.
Figure 41:
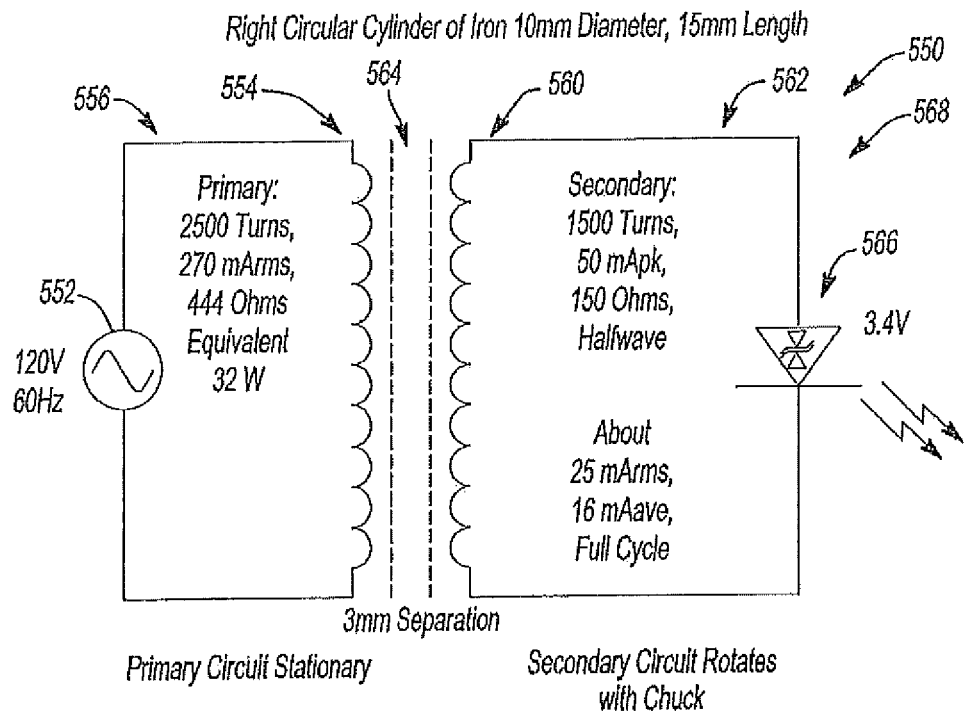
FIG. 41 is a schematic representation of a rotary transformer that includes exemplary values according to a numerical simulation of the present teachings.
Figure 42:
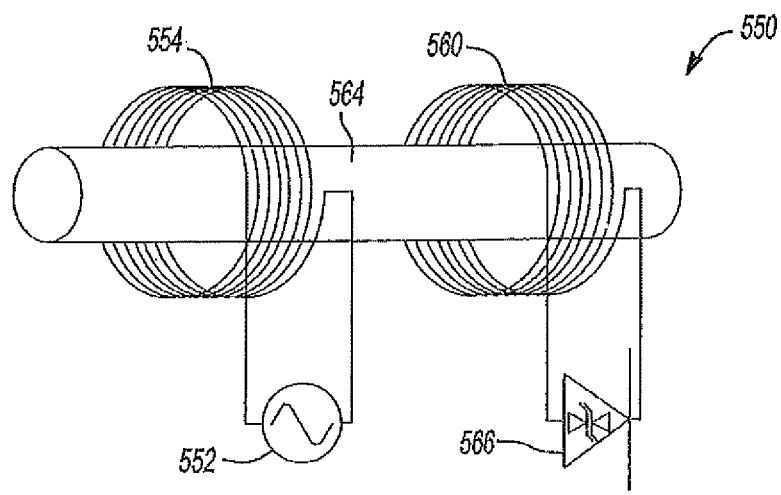
FIG. 42 is an exemplary physical representation of a rotary transformer constructed in accordance to one example of the present teachings.
Figure 43:
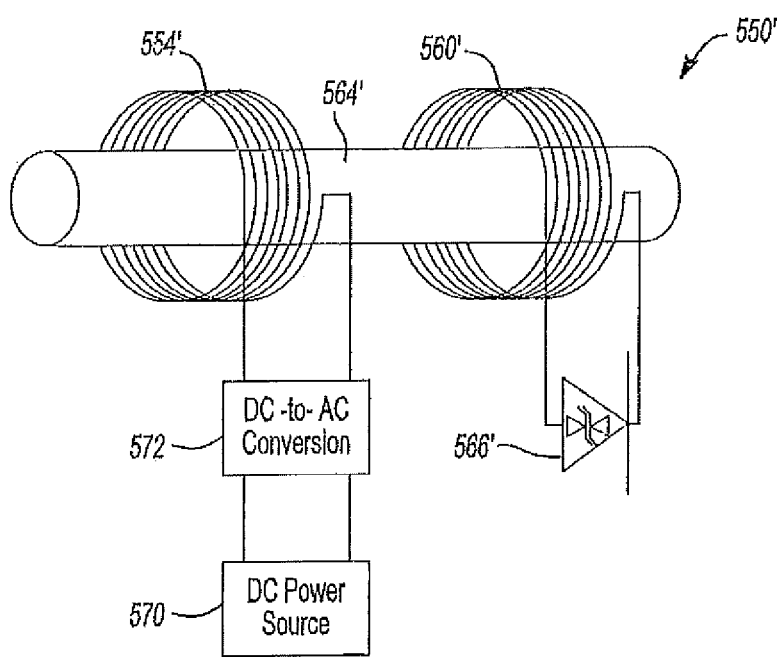
FIG. 43 is another exemplary physical representation of a rotary transformer that incorporates a DC to AC conversion.

With general reference now to FIGS. 40-65, various configurations and methods for illuminating LEDs on a power tool through a rotary transformer (such as those disclosed herein) will be described. With initial reference to FIG. 40, a rotary transformer 550 constructed in accordance to one example of the present teachings is shown. In general, the rotary transformer 550 shown in FIG. 40 represents a corded power tool that receives power through an AC power source 552. It will be appreciated from the following discussion, however, that other examples may be provided for using a rotary transformer in a cordless, battery-powered power tool. The rotary transformer 550 includes a primary winding 554 incorporated on a stationary portion 556 of the power tool. The stationary portion 556 can comprise a non-rotating portion of the power tool, such as the body of the power tool. The rotary transformer 550 further comprises a secondary winding 560 incorporated on a rotating portion 562 of the power tool. The rotating portion 562 can include a rotating chuck such as disclosed herein. A core 564 is disposed between the primary and secondary windings 554 and 560, respectively. An LED 566 is electrically connected to the secondary winding 560. The rotary transformer 550 provides a configuration that electrically transfers power between the primary winding 554 and secondary winding 560. A magnetic flux is conducted by way of the core 564 to facilitate a mutual inductance that couples energy from the primary winding 554 (having the AC power source 552) to the secondary winding 560 (having the LED 566). In one example, the rotary transformer 550 may include a switch 567. FIG. 41 illustrates exemplary parameters 568 for the rotary transformer 550. It will be appreciated by those skilled in the art, however, that the exemplary parameters 568 may be altered within the scope of this disclosure. FIG. 42 illustrates an exemplary physical diagrammatic representation of the rotary transformer 550. The AC power source 552 is electrically connected to the primary winding 554. The core 564 extends within the primary winding 554 and the secondary winding 560. The secondary winding 560 is electrically connected to the LED 566. In one example, the core 564 can be an iron core. FIG. 43 illustrates a rotary transformer 550' incorporated on a cordless power tool that receives DC power from a battery. In this regard, the rotary transformer 550' includes a DC power source or battery 570 that communicates DC power into a DC to AC conversion 572. The DC to AC conversion 572 electrically communicates with a primary winding 554' that is arranged around a core 564'. A secondary winding 560' is electrically connected to an LED 566'.

Figure 44:
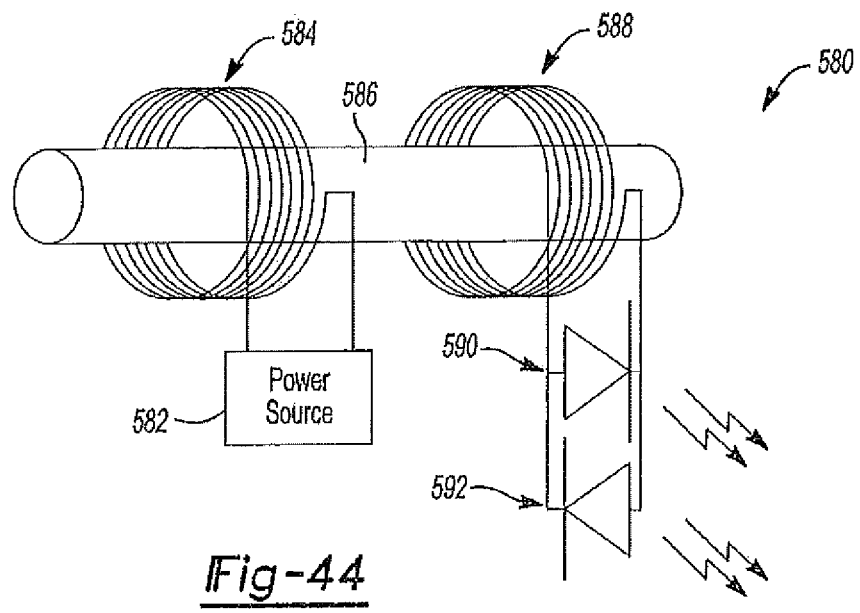
FIG. 44 is another physical representation of a rotary transformer constructed in accordance to the present teachings that incorporates a pair of LEDs connected in parallel and opposite directions.
Figure 45:
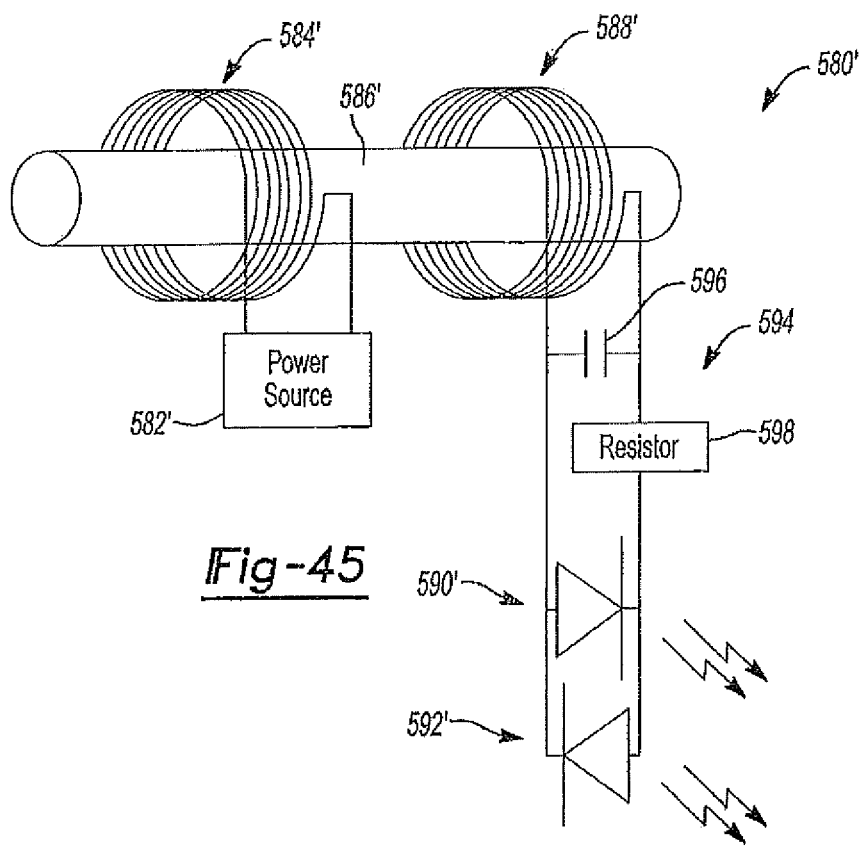
FIG. 45 is another physical representation of a rotary transformer according to the present teachings that further incorporates a secondary circuit that includes a capacitor and resistor according to one example.

With reference now to FIG. 44, additional features of exemplary rotary transformers according to the present teachings will be described. A rotary transformer 580 includes a power source 582 that is electrically connected to a primary winding 584. The power source 582 is generically represented with the intent to encompass either an AC power source or a DC power source. The primary winding 584 is wound around a core 586. A secondary winding 588 is also wound around the core 586. The secondary winding 588 is electrically connected to a first LED 590 and a second LED 592. Notably, the first and second LEDs 590 and 592 are connected in parallel but in opposite directions. FIG. 45 illustrates another exemplary rotary transformer 580' that incorporates similar features as disclosed above with respect to FIG. 44 but also incorporates a secondary circuit 594. The secondary circuit 594 includes a capacitor 596 and a resistor 598. It will be appreciated that the secondary circuit 594 may comprise other electrical components based on the intended application. Like components to the rotary transformer 580 disclosed in FIG. 44 are represented with like reference numerals having a prime suffix.

Figure 46:
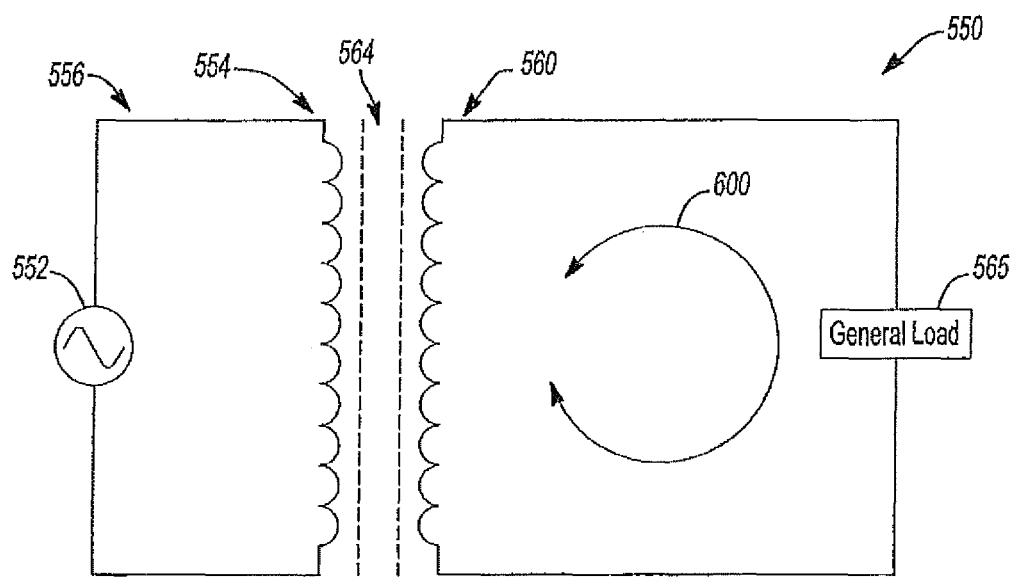
FIG. 46 is a schematic representation of a rotary transformer according to the present teachings.
Figure 47:
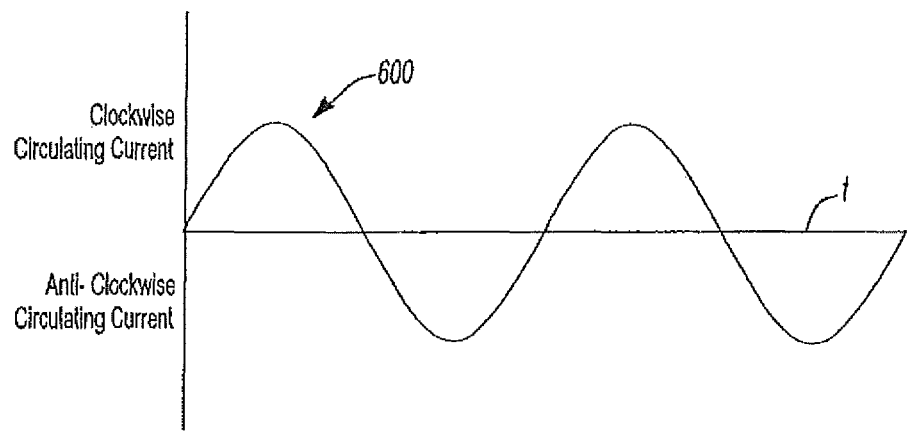
FIG. 47 is an exemplary plot of current versus time for the rotary transformer shown in FIG. 46.

With reference to FIG. 46, the rotary transformer 550 as shown and described above with respect to FIG. 40 is shown to have a general load (565) and a current 600 that circulates in both a clockwise and counterclockwise direction around the secondary winding 560. FIG. 47 is an exemplary plot of the current 600 over time t. Notably, the current 600 provides a classical sine wave of circulating current for the general load 565.

Figure 48:
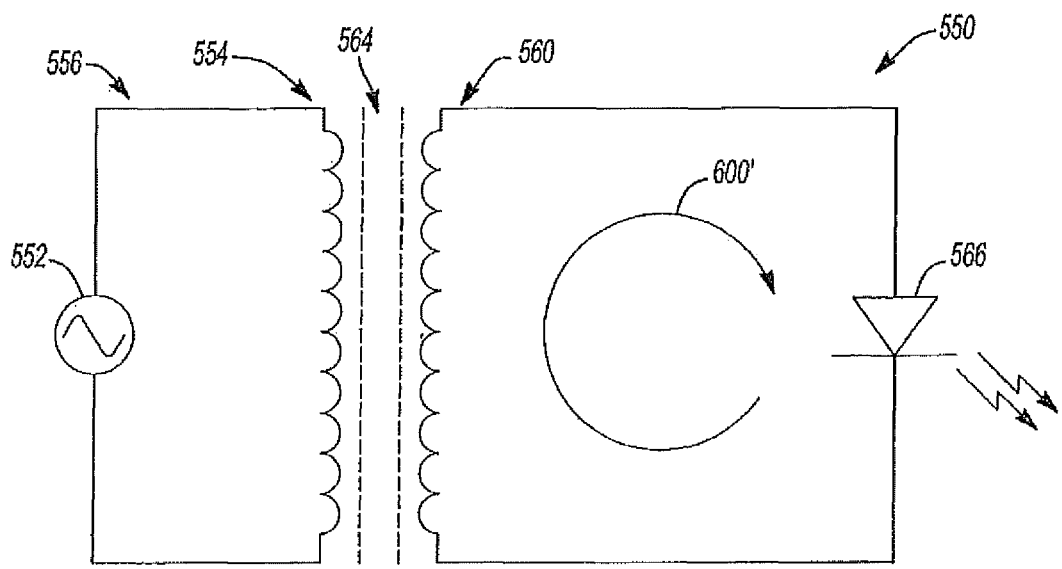
FIG. 48 is a schematic representation of another rotary transformer constructed in accordance to the present teachings.
Figure 49:
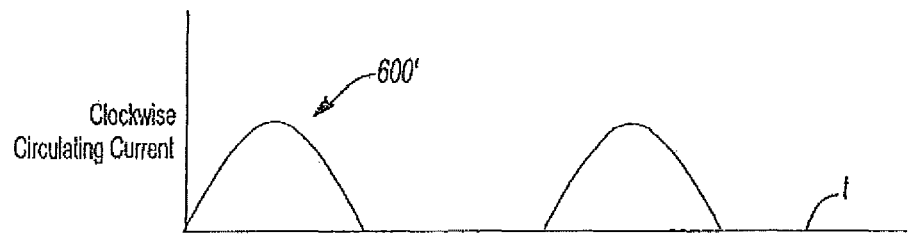
FIG. 49 is a plot of current versus time for the rotary transformer of FIG. 48.
Figure 50:
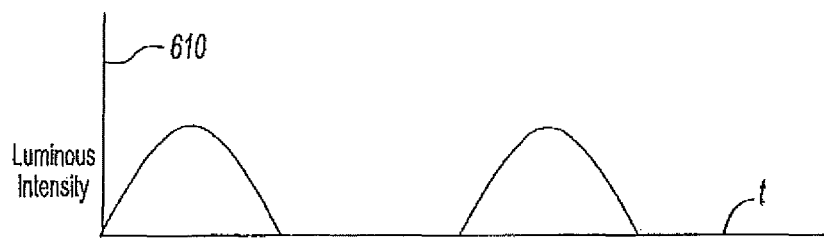
FIG. 50 is a plot of luminous intensity versus time for the rotary transformer shown in FIG. 48.

Turning now to FIG. 48, the rotary transformer 550 is shown having a current 600' that flows in only one direction as a result of the LED 566 being electrically coupled to the secondary winding 560. It will be appreciated that the nature of the LED 566 may also permit a minimal amount of current to flow in the reverse direction. However, the amount is virtually negligible. FIG. 49 represents the current resulting from configuration of the rotary transformer 550 in FIG. 48. Notably, as current is only permitted to flow in a clockwise direction, zero current is provided in the anti-clockwise direction. FIG. 50 represents the luminous intensity of the LED 566. In this regard, the light emitted by the LED 566 can be approximately equivalent to the magnitude of current that flows through it. The luminous intensity 610 is represented on the y-axis versus time t along the x-axis in FIG. 50. As shown in FIG. 50, the luminous intensity 610 is approximately proportional to the current 600' that flows through the LED 566 as represented in FIG. 49. Because the current 600' corresponds to the luminous intensity 610 shown in FIG. 50, the LED 566 is effectively flashing on and off several times a second (for example, sixty times a second). In many examples, a well accommodated human eye can detect this flashing. In some examples, the human eye can better identify the flashing while not looking directly at the LED 566 and instead viewing the LED 566 through peripheral vision. In this regard, because some people can detect such flickering, the configuration may be a distraction.

Figure 51:
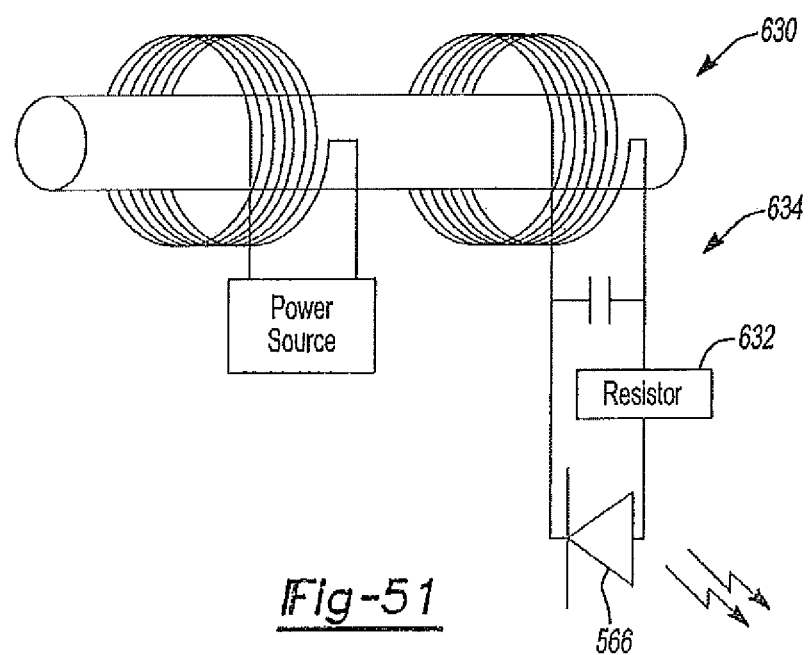
FIG. 51 is a physical representation of another rotary transformer constructed in accordance to the present teachings that incorporates a resistor and capacitor.
Figure 52:
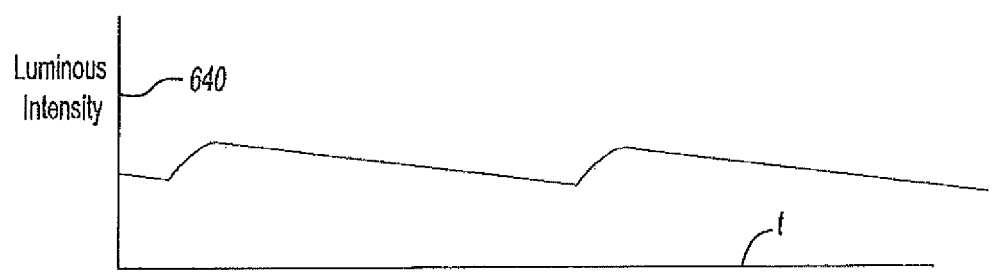
FIG. 52 is a plot of luminous intensity versus time for the rotary transformer of FIG. 51.

FIG. 51 illustrates a rotary transformer 630 that is configured to smooth out the ripple in the luminous intensity of the LED 566 represented in FIG. 50. The rotary transformer 630 incorporates a resistor 632 and a capacitor 634 that can cooperate to reduce the amount of ripple to yield a luminous intensity 640 versus time t shown in FIG. 52. It will be understood that additional and/or alternative components may be used to yield similar results. Those skilled in the art will appreciate that the luminous intensity 640 has both a DC component and an AC component. The DC component is the average value of the entire string of waves. The remainder is the AC component. Therefore, when the AC component is filtered, the AC component of current flowing through the LED 566 is reduced considerably and, as a result, the apparent flickering of light perceived is also significantly reduced. It will be appreciated that the flickering of light has not been removed entirely, however, the flickering of light can be reduced significantly such that the human eye may no longer be able to perceive it.

Figure 53:
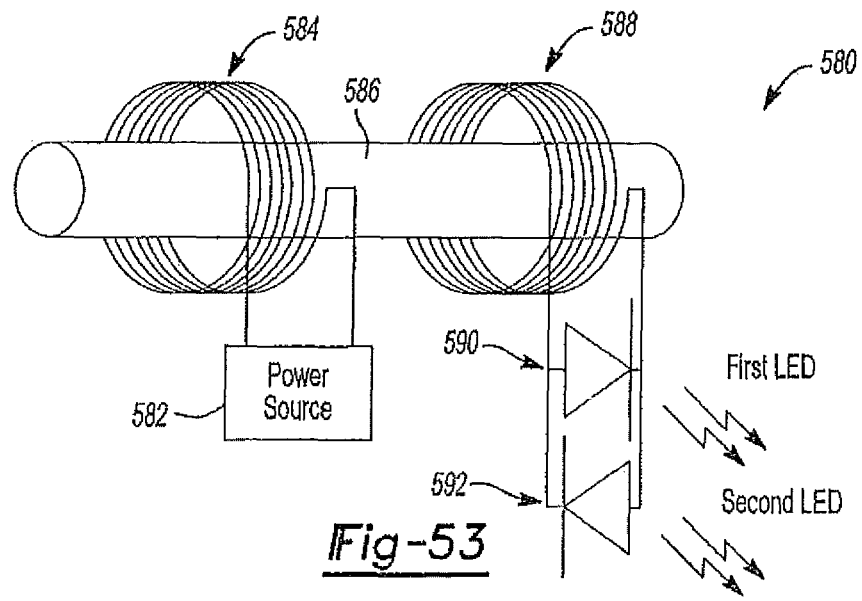
FIG. 53 is a physical representation of another rotary transformer constructed in accordance to the present teachings.
Figure 54:
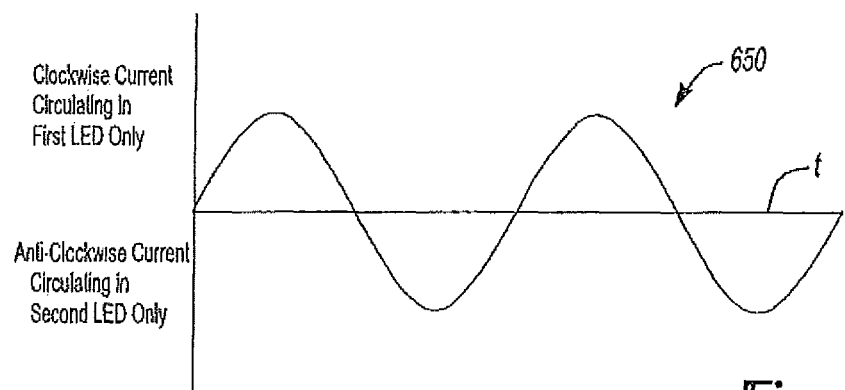
FIG. 54 is an exemplary plot of current versus time for the rotary transformer illustrated in FIG. 53.
Figure 55:
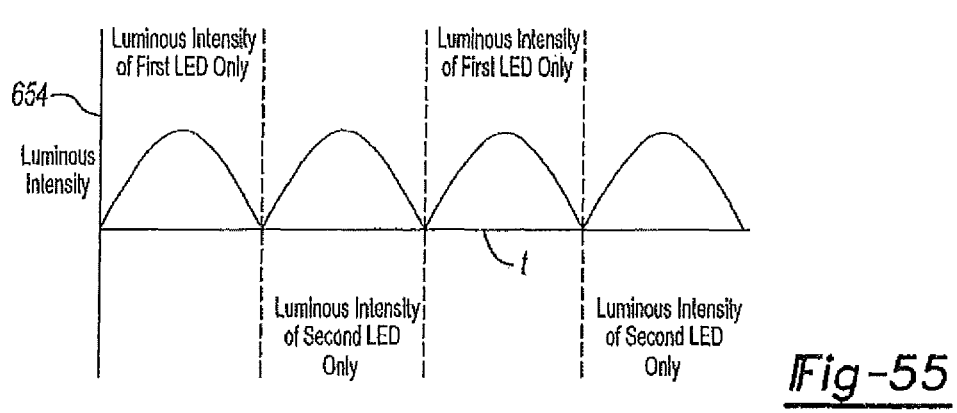
FIG. 55 is a plot of luminous intensity versus time for the rotary transformer shown in FIG. 53.

Turning now to FIG. 53, the rotary transformer 580 is shown having the primary winding 584 and the secondary winding 588 wound around the core 586. The first and second LEDs 590 and 592 are connected in parallel and in opposite directions to the secondary winding 588. In the configuration shown in FIG. 53, current circulates in both a clockwise and anti-clockwise direction. A plot 650 is shown in FIG. 54 that depicts the current circulating in both directions from the schematic representation in FIG. 53. Notably, the clockwise current circulates essentially only through the LED 590 while the anti-clockwise current circulates only in the second LED 592. A luminous intensity 654 is plotted versus time in FIG. 55 for the schematic configuration illustrated in FIG. 53. In this regard, for the positive clockwise circulating current, one of the LEDs (such as 590) will illuminate and for the anti-clockwise current, the other LED (such as the second LED 592) will illuminate. The human eye generally cannot perceive with clarity the alternating light as the frequency is too fast. In essence, the result of luminous intensity can be similar to that described above with respect to FIG. 50, however, twice the amount of light results. Explained further, while FIG. 55 represents a combination of both AC and DC current, the amount of the DC component has been doubled and the AC component has been reduced relative to that described above with respect to FIG. 50.

Figure 56:
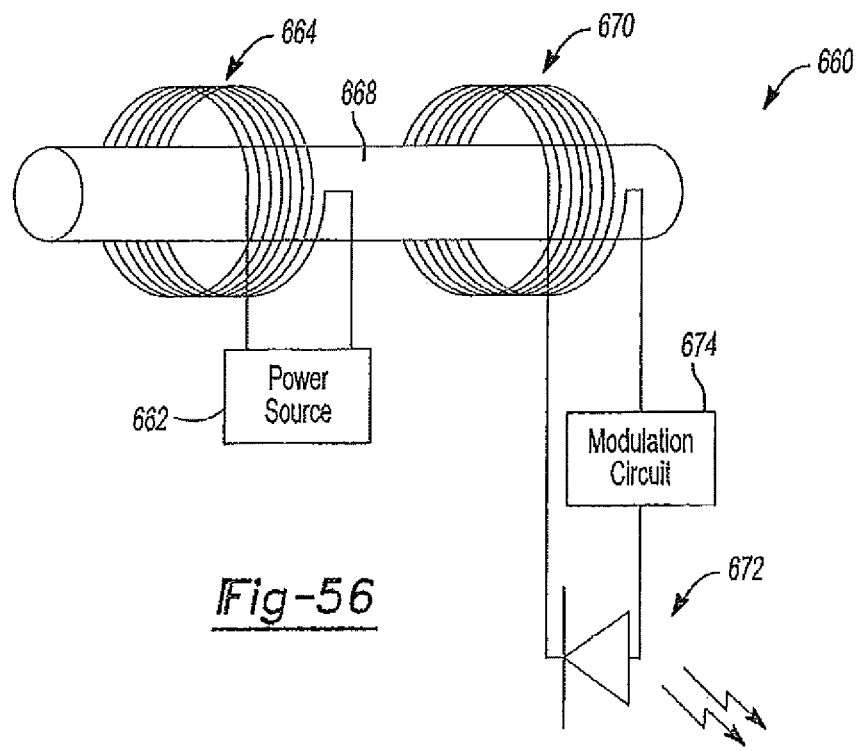
FIG. 56 is another physical representation of a rotary transformer constructed in accordance to the present teachings that incorporates a modulation circuit.

FIG. 56 illustrates a rotary transformer 660 constructed in accordance to additional features of the present teachings. The rotary transformer 660 is connected to a power source 662 that may be consistent with either a corded or cordless power tool as described above. A primary winding 664 is incorporated around a core 668. Similarly, a secondary winding 670 is wrapped around the core 668. An LED 672 is electrically connected to the secondary winding 670. A modulation circuit 674 is also electrically connected with the secondary winding 670 and the LED 672. The modulation circuit 674 can be configured in any desirable manner such as to encourage the LED 672 to flash on and off and/or control the intensity of the LED 672 over time. In some examples, the modulation circuit 674 can modulate the LED 672 at exactly the rate of rotation of the chuck. In other examples, the modulation circuit 674 can be configured to modulate at a frequency that is either slightly higher or slightly lower than the rate of rotation of the chuck to make the rotating accessory appear that it is rotating very slowly. In this regard, such a configuration can convey to a user that the accessory is rotating and not static.

Figure 57:
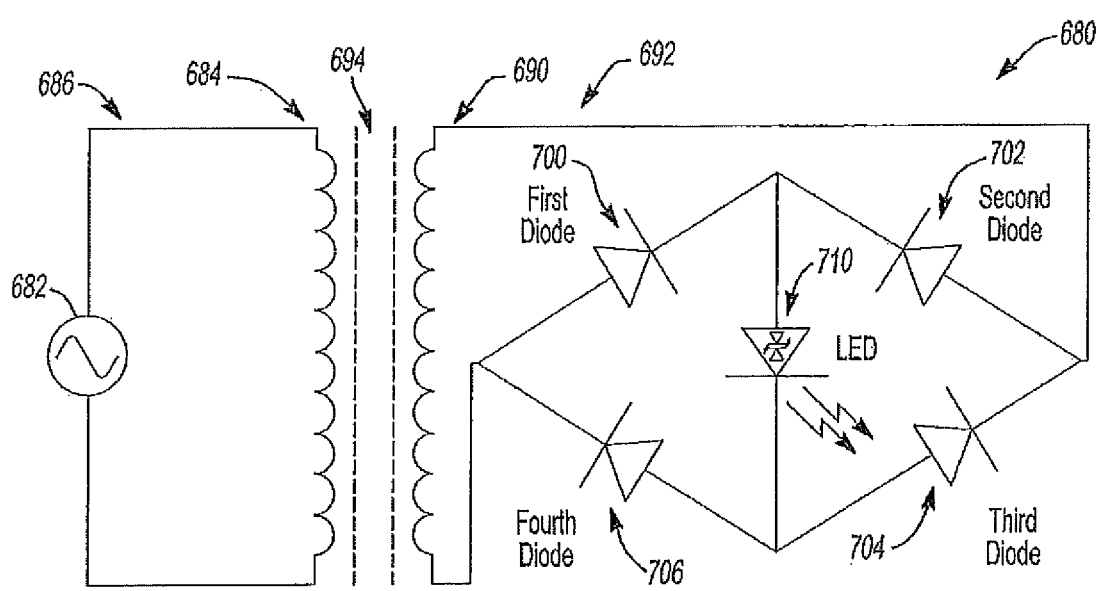
FIG. 57 is a schematic illustration of another rotary transformer constructed in accordance to the present teachings that incorporates the present teachings.
Figure 58:
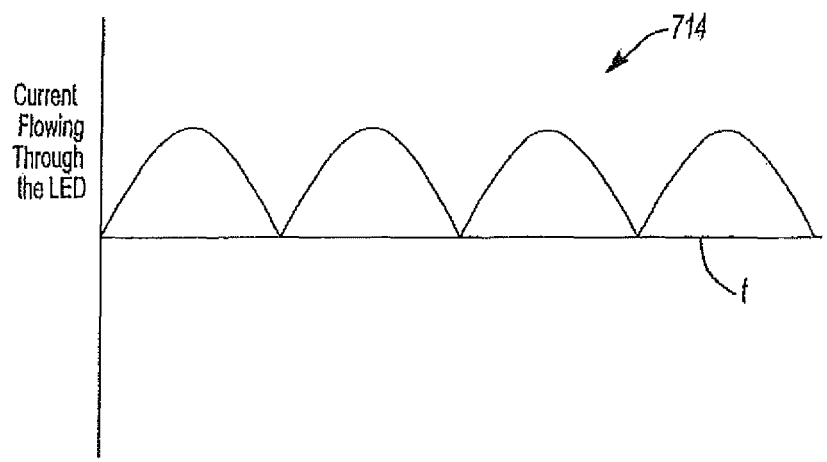
FIG. 58 is a plot of current versus time for the rotary transformer shown in FIG. 57.
Figure 59:
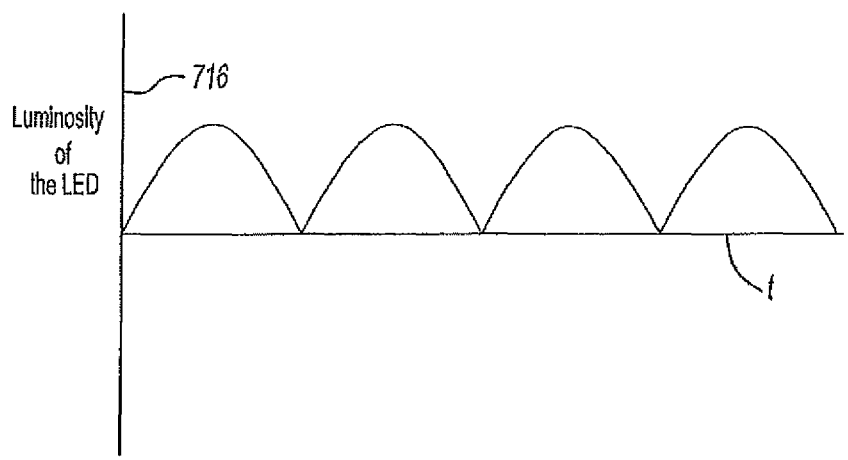
FIG. 59 is a plot of luminosity versus time of the rotary transformer of FIG. 57.

With reference now to FIG. 57, a rotary transformer 680 constructed in accordance to other features of the present disclosure is shown. The rotary transformer 680 can have an AC power source 682 (or a DC power source as described herein), a primary winding 684 incorporated on a stationary portion 686, and a secondary winding 690 incorporated on a rotating portion 692. A core 694 can be disposed between the primary and secondary windings 684 and 690, respectively. The secondary winding 690 can include a first diode 700, a second diode 702, a third diode 704, a fourth diode 706, and an LED 710. The schematic configuration provided in the rotary transformer 680 of FIG. 57 doubles the light output using both clockwise and anti-clockwise circulating currents while only requiring a single LED 710. The circuit offered by the rotary transformer 680 provides a full-wave rectification. In this regard, by utilizing four common (less costly) diodes (700, 702, 704, and 706) that make a bridge, the cost of requiring two LEDs is not necessary as the full light output can be realized with the single LED 710. The current 714 flowing through the LED 710 is shown in FIG. 58. The luminosity 716 is shown in the plot of FIG. 59 for the LED 710 in the circuit illustrated in FIG. 57.

Figure 60:
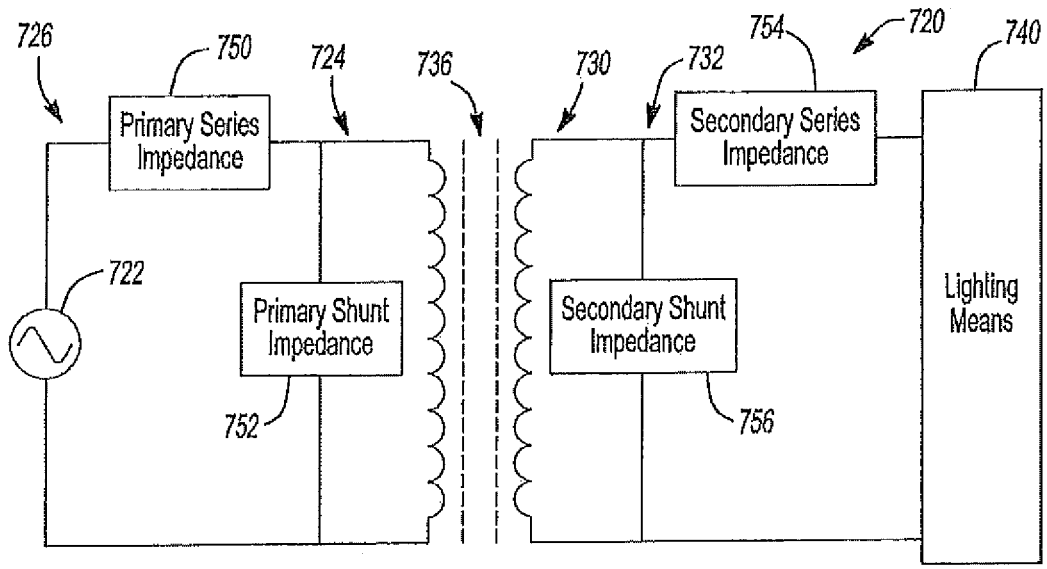
FIG. 60 is a schematic illustration of another exemplary rotary transformer constructed in accordance to the present teachings.

Turning now to FIG. 60, another exemplary rotary transformer 720 constructed in accordance to another example of the present teachings will be described. The rotary transformer 720 generally includes a power source 722, a primary winding 724 incorporated on a stationary portion 726 of the power tool. Again, the stationary portion 726 can comprise a non-rotating portion of the power tool, such as the body of the power tool. The rotary transformer 720 can further comprise a secondary winding 730 incorporated on a rotating portion 732 of the power tool. The rotating portion 732 can include a rotating chuck such as disclosed herein. A core 736 is disposed between the primary and secondary windings 724 and 730, respectively. A lighting means 740 is electrically connected to the secondary winding 730. The rotary transformer 720 can include a primary series impedance 750 incorporated on the primary winding 724 or primary circuit. A primary shunt impedance 752 can additionally or alternatively be electrically coupled to the primary winding 724 or primary circuit. Likewise, a secondary series impedance 754 can be electrically connected to the secondary windings 730 or secondary circuit. A secondary shunt impedance 756 can additionally or alternatively be electrically coupled to the secondary winding 730 or secondary circuit. The primary and secondary series impedances 750 and 754 can be incorporated for many reasons according to the desires of a particular circuit.

Figure 61:
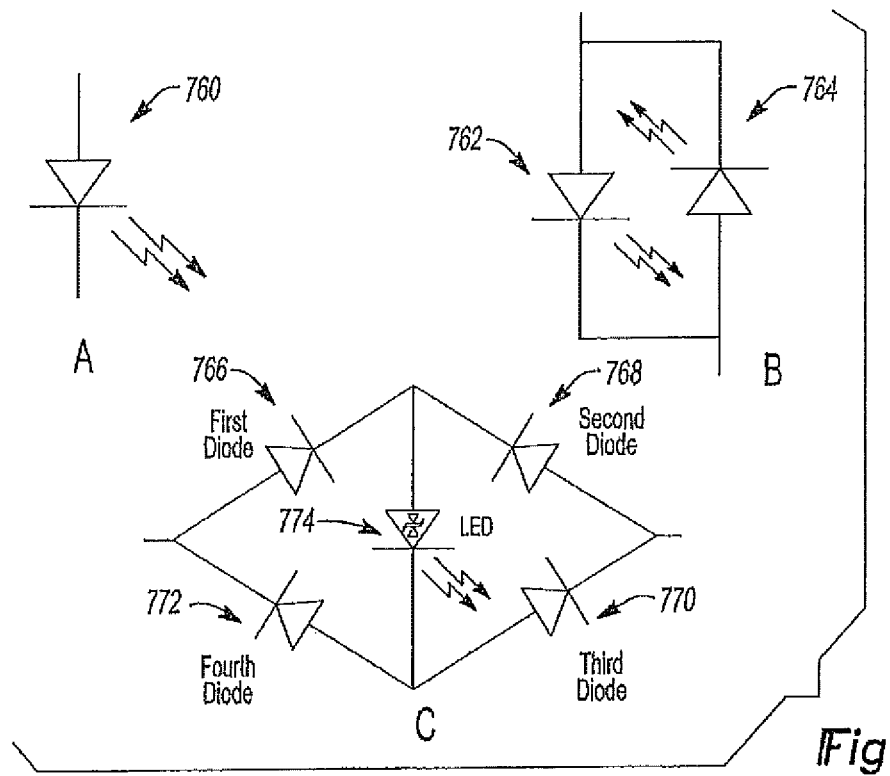
FIG. 61 illustrates various LED configurations that may be incorporated for the lighting means shown in FIG. 60.

Similarly, a primary and/or secondary shunt impedance 752 and 756 can be included according to the needs of a particular application. The various impedances 750, 752, 754, and 756, therefore, can be used for any desired manner such as, but not limited to resonating the circuit or increasing the efficiency of the circuit. FIG. 61 illustrates various LED configurations that may be adapted for use as the lighting means 740. For example, a single LED 760 may be used as the lighting means 740. Alternatively, a first and second LED 762 and 764 may be connected in parallel and opposite directions and may be used as the lighting means 740 in FIG. 60. Likewise, a first diode 766, second diode 768, third diode 770, fourth diode 772, and LED 774 can also be used as the lighting means 740. In sum, a modulation means can be provided in either the primary circuit or the secondary circuit. Either of the primary or secondary side may be modulated. The secondary side can also incorporate regulation means such as a resistor and capacitor configuration to smooth out the ripple. In this regard, various components can be interchanged in an effort to remove a 60 or 120 Hertz ripple. Additionally or alternatively, if it is desired to modulate the circuit to flash the LED at a slower rate, appropriate modulation can be incorporated.

It will be appreciated that the modulation means described herein may be configured to control the illumination of the LEDs in any desired manner. For example, the LEDs can be configured to flash at a rate synchronized with an output spindle of the power tool to provide a stroboscopic effect. In this way, the perceived rotary motion of the tool accessory may be stopped or slowed. Moreover, the LEDs can be configured to illuminate once per spindle rotation or multiple times per spindle rotation. The timing of illumination can be adjusted to lead or lag the spindle rotation. This can give the appearance of a slowly rotating accessory. In some examples, the rotation rate of the chuck and the AC frequency can cause the LEDs, powered by AC, to appear as a "string of pearls" when the chuck is rotating at any substantial speed. When the frequency of rotation and AC are coordinated, the string of pearls can appear to stand still. As the rotation increases or decreases slightly from the "still" condition, the string of pearls will begin to rotate clockwise or counter-clockwise. The further the deviation in frequencies, the faster the pearls rotate until a new synchrony is approached and the peals begin to slow down until the pearls appear to stand still. With the appropriate modulation, rotation, position sensing, micro processing and other circuitry, the string of pearls can be made to appear as if they are never rotating. It will be appreciated that sufficient rotation speed must be attained.

Figure 62:
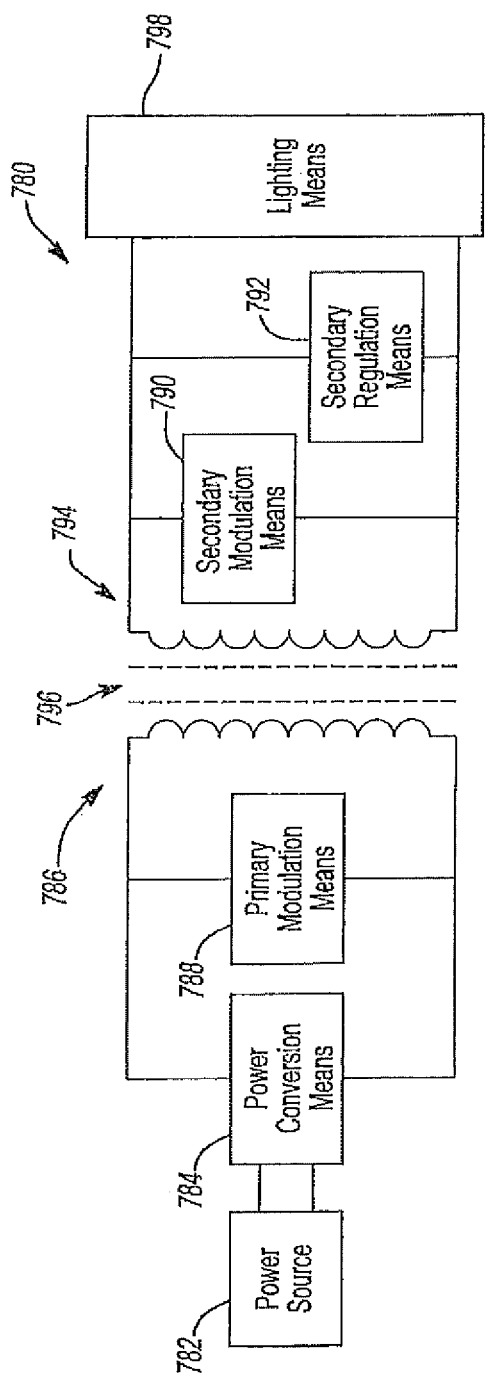
FIG. 62 is a partial schematic representation of another exemplary rotary transformer according to the present teachings.

FIG. 62 is a generalized rotating transformer 780 having a power source 782 that may incorporate a power conversion means 784 connected to a primary winding 786. A primary modulation means 788 may also be incorporated with the primary winding 786. A secondary modulation means 790 and secondary regulation means 792 can be incorporated on a secondary winding 794. A core 796 can be disposed between the primary and secondary windings 786 and 794. Lighting means 798 can be incorporated on the secondary winding 794.

Figure 63:
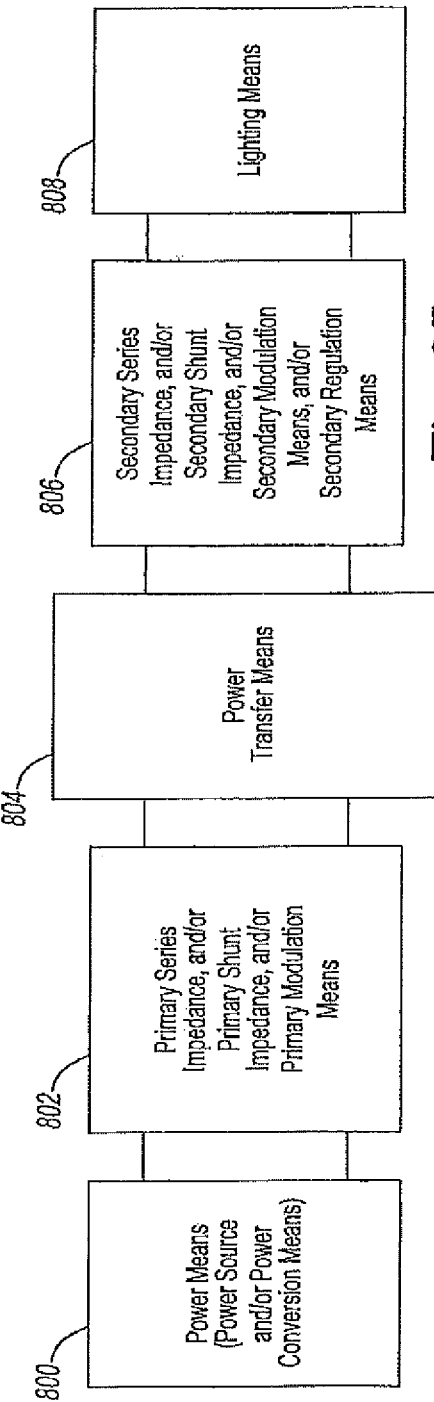
FIG. 63 is a generalized representation of a lighting system for a power tool according to the present teachings.

Turning now to FIG. 63, a generalized representation of one example of the present teachings is shown. A power means 800 can include a power source and/or a power conversion means. Box 802 represents a primary series impedance and/or a primary shunt impedance and/or a primary modulation means. A power transfer means 804 connects box 802 with box 806. Box 806 can include a secondary series impedance and/or a secondary shunt impedance and/or a secondary modulation means and/or a secondary regulation means. A lighting means 808 is connected to box 806.

Figure 64:
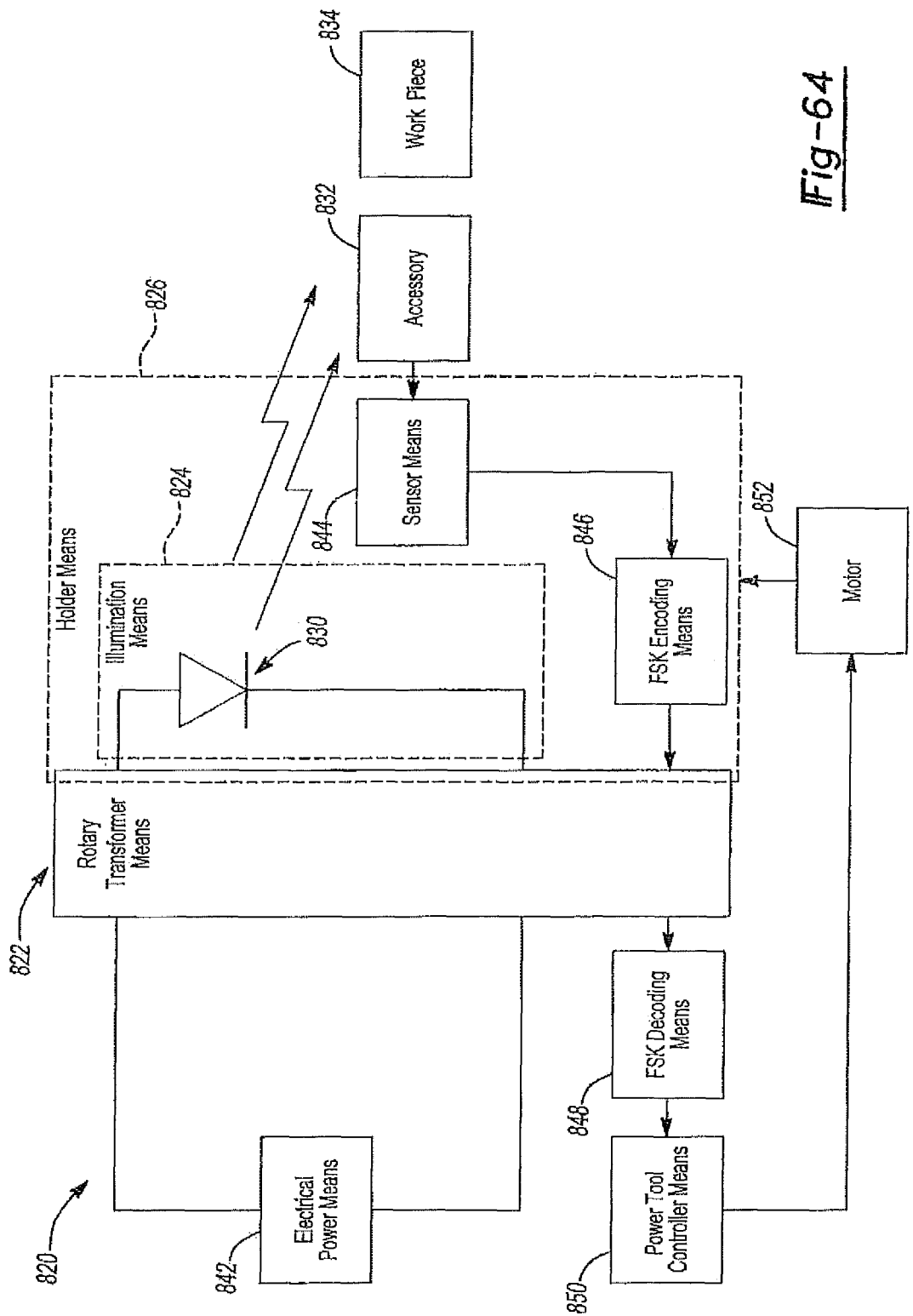
FIG. 64 is a schematic representation of an exemplary power tool constructed in accordance to the present teachings.

FIG. 64 is a schematic diagram illustrating an exemplary power tool 820 constructed in accordance to the present teachings. A rotary transformer 822 is collectively represented by an illumination means 824 and a holder means 826. The illumination means 824 can include a single LED 830 (or a plurality of LEDs). The holder means 826 can be any of the chucks disclosed herein, but it may also comprise a different kind of tool holder within the scope of the present disclosure. The holder means 826 can be configured to retain an accessory 832. The accessory can be a drill, a saw blade, or any other kind of cutting tool that may be in contact with a workpiece 834 performing an action onto the workpiece 834. The power tool 820 can include an electrical power means 842 such as disclosed herein. Sensor means 844 can be used to convey information back to the non-rotating body of the power tool 820 such as through a frequency shift keying encoding means 846 and frequency shift keying decoding means 848. A power tool controlling means 850 can communicate between the frequency shift encoding and decoding means 846, 848, and a motor 852. It is contemplated that the sensor means 844 can communicate data that is encoded through the frequency shift encoding and decoding means 846, 848 that is transferred through the rotary transformer means 822 back to a non-rotating side of the power tool 820. The digital information can be decoded and provided to the power tool controller means 850 to take an appropriate action. For example, the power tool controller means 850 may be configured to reduce the torque output of the power tool 820 such as when a binding of the accessory 832 is identified. In such a scenario, the power tool controller means 850 can communicate a signal to the motor 852 consistent with reducing the output torque thereof. As a further example, a sensor in the tool holder may identify the accessory inserted into the holder and this may be transmitted to the power tool controller. The controller may then choose to depower or slow down the tool for small drill bits and thread taps. Alternatively, the controller may choose to instruct the transmission (or the user) to shift to low gear and the motor to high power when a hole saw or some similarly large accessory is inserted into the tool holder. In a different example, a sensor and indicator are included in the tool holder and powered by any of the means described herein. The sensor may sense when the tool holder is not tight and illuminate an LED on the chuck indicating to the user that the tool holder is not tight. For a chuck, the user may need to tighten the sleeve until a green LED on the chuck is illuminated.

Figure 65:
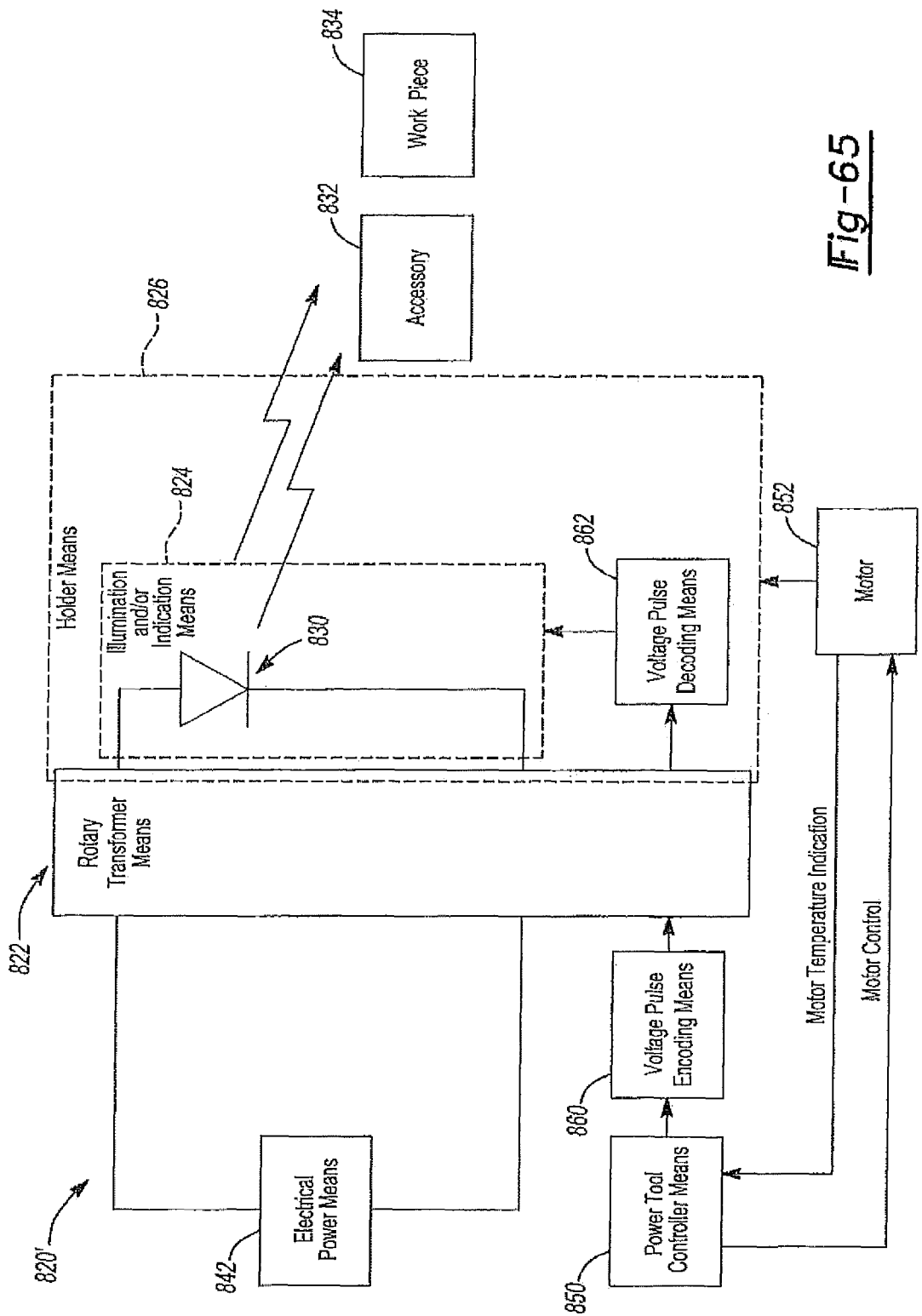
FIG. 65 is a schematic illustration of a power tool constructed in accordance to still other features of the present teachings.

FIG. 65 illustrates another power tool 820' constructed in accordance to additional features of the present disclosure. The power tool 820' can be constructed similar to the power tool 820 discussed above, therefore like reference numerals have been repeated for similar components. The power tool 820' includes a configuration that can communicate information from the stationary side of the tool to the rotating side of the tool. The power tool 820' includes a voltage pulse encoding means 860 and a voltage pulse decoding means 862. In this example, a temperature sensor may be provided in the motor 852 and the power tool controller means 850 can be configured to sense if the motor 852 is getting too hot. The power tool controller means 850 can communicate through the voltage pulse encoding means 860 and voltage pulse decoding means 862 (other configurations are contemplated). The voltage pulse decoding means 862 can communicate with the rotating holder means 826 to perform an action. In some examples, the LED 830 can be configured to modulate or flash to indicate that the motor 852 is getting too hot, for example. In other examples, the LED 830 can be a plurality of LEDs of different colors for instance, which can be illuminated sequentially or alternately so as to convey information to the power tool user. In yet other examples, the LED 830 can be a plurality of LEDs of different colors disposed about the rotating holder such that as the speed of rotation increases, the mixing of colors conveys information to the power tool user. In sum, the configuration of the power tool 820' shown in FIG. 65 essentially communicates information from the non-rotating side of power tool 820' through the rotary transformer means 822 to the rotating side of the power tool 820'.

Contrastingly, the power tool 820 can be arranged to communicate information from the rotating side of the power tool through the rotary transformer means 822 to the non-rotating side of the power tool. Other configurations are contemplated. The rotary transformers described herein can provide many benefits. For example, in the rotary transformers described for use with an AC power source (corded power tool), the LEDs can be configured to stay illuminated whether the chuck is rotating or not. Moreover, the LED is on at the same brightness whether it is rotating or not and whether the accessory is doing any work on the workpiece or not. In one configuration, when a user plugs the cord of the power tool into a wall outlet, the LEDs can be configured to turn on immediately. In another configuration, the LEDs may not illuminate immediately upon plugging the power cord into the wall outlet. Alternatively, the LEDs can be configured to illuminate when a user pulls the trigger of the tool (and even before the chuck starts rotating), which provides AC power that will then go through the rotary transformer to illuminate the LED. For the DC application (such as a battery powered tool), the LEDs can be configured to illuminate when the battery pack is plugged into the power tool. As such a configuration may unnecessarily drain the battery, another configuration can be provided where once an initial pressure on the trigger is detected and before the chuck begins to rotate, the LED illuminates. The LED would also remain illuminated throughout application of pressure on the trigger.

Figure 66:
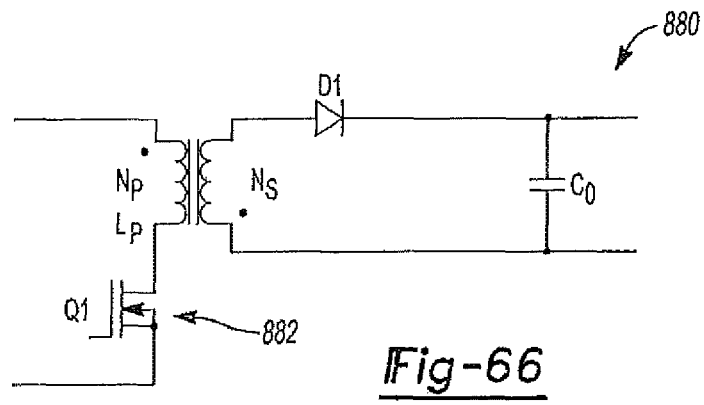
FIG. 66 is an exemplary flyback circuit for use in an exemplary rotary transformer according to the present teachings.

With reference now to FIGS. 66-73, various circuits will be described that incorporate switching methods to enable an AC rotating transformer to be used in a cordless power tool where only DC is available to excite the transformer. In general, the circuits can be classified in two categories, either a flyback circuit (see FIG. 66) or a forward circuit (FIGS. 67-73). A flyback circuit can be preferred in a low power system for being relatively simple and cheap. A forward type circuit may require more components and complexity but can offer the potential for increased power transfer for a given transformer design. FIG. 66 illustrates an exemplary flyback circuit 880. The flyback circuit 880 incorporates a switching device 882. The switching device 882 is schematically represented by an FET and can be either an N or P-channel FET device. Additionally, the switching device 882 can be other types of electronic switching devices, such as NPN or PNP-type bipolar transistors, or any other type of electronic switching device.

Figure 67:
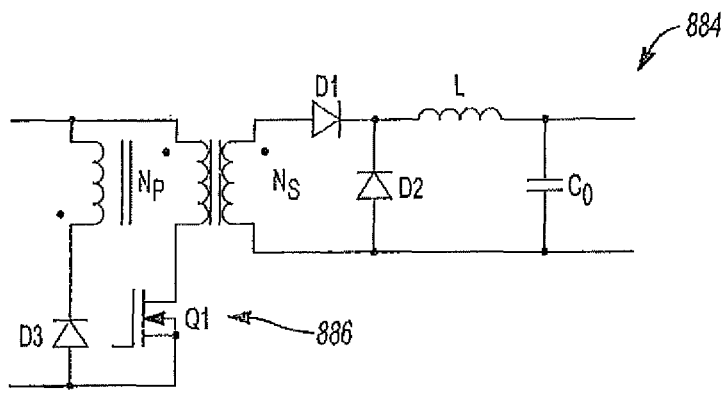
FIG. 67 is an exemplary forward single switch circuit constructed in accordance to the present teachings.
Figure 68:
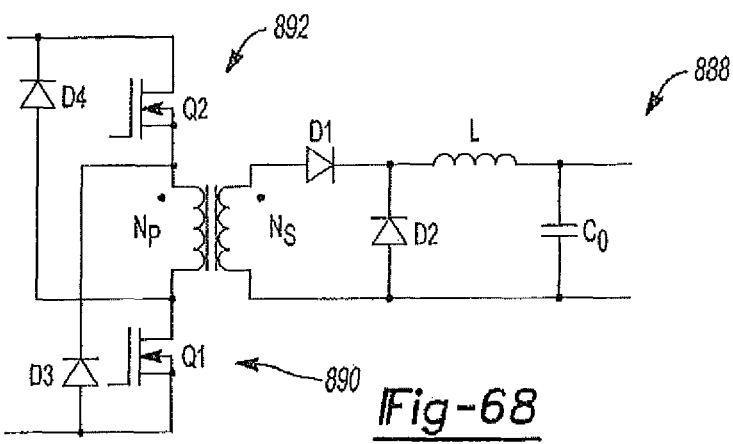
FIG. 68 is an exemplary forward two switch circuit constructed in accordance to the present teachings.
Figure 69:
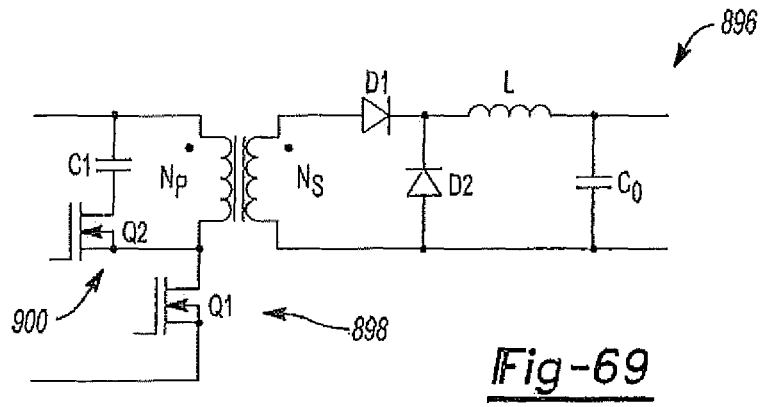
FIG. 69 is an exemplary forward, active clamp circuit constructed in accordance to the present teachings.
Figure 70:
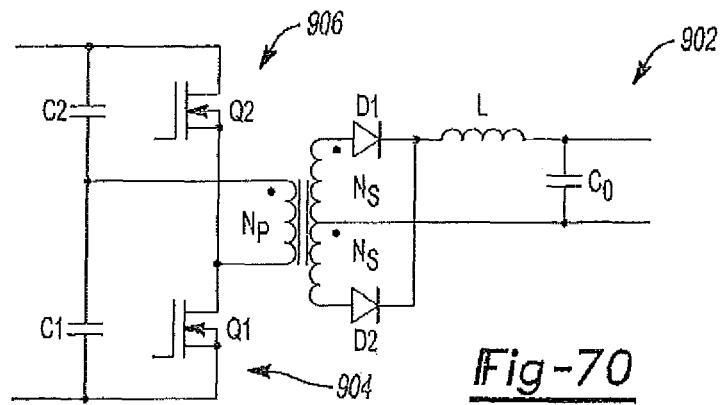
FIG. 70 is an exemplary forward, half-bridge circuit constructed in accordance to the present teachings.
Figure 71:
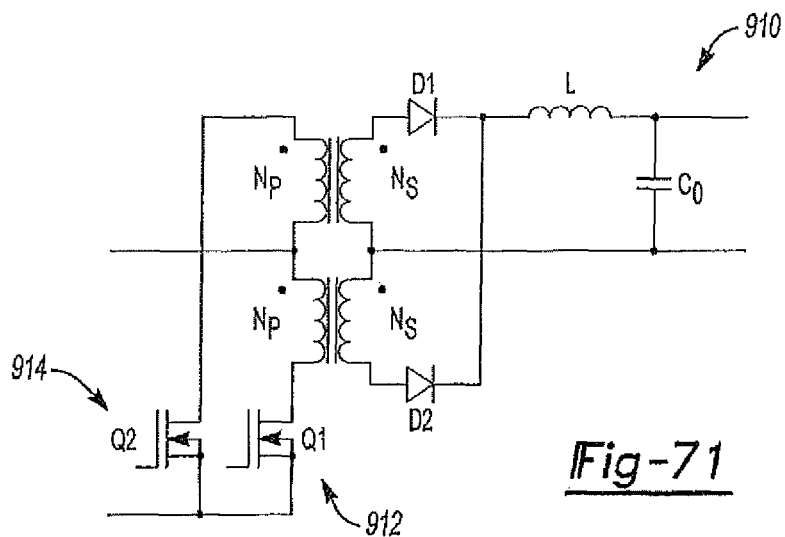
FIG. 71 is an exemplary forward, push-pull circuit constructed in accordance to the present teachings.
Figure 72:
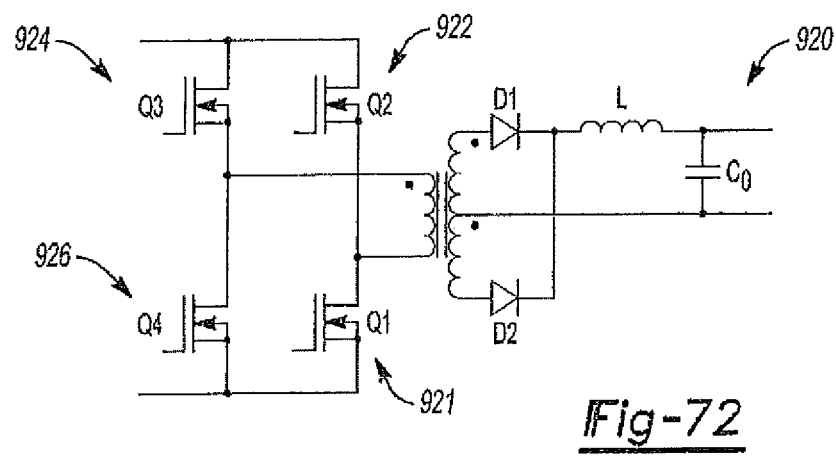
FIG. 72 is an exemplary forward, full-bridge circuit constructed in accordance to the present teachings.
Figure 73:
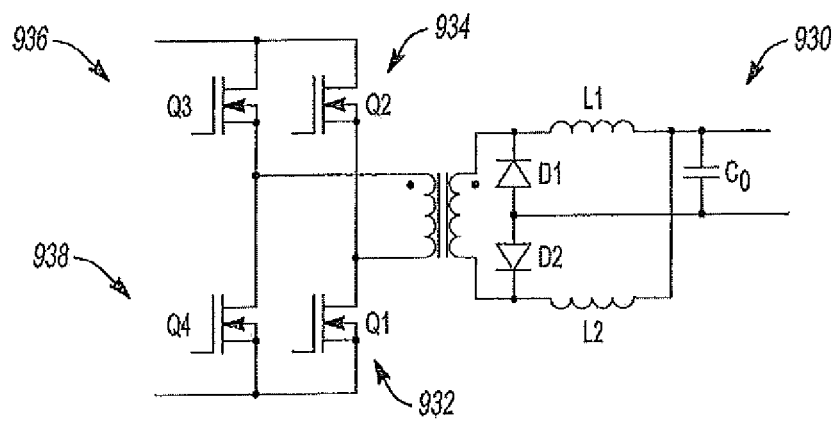
FIG. 73 is an exemplary phase shift zero voltage switching circuit constructed in accordance to the present teachings.
Figure 76:
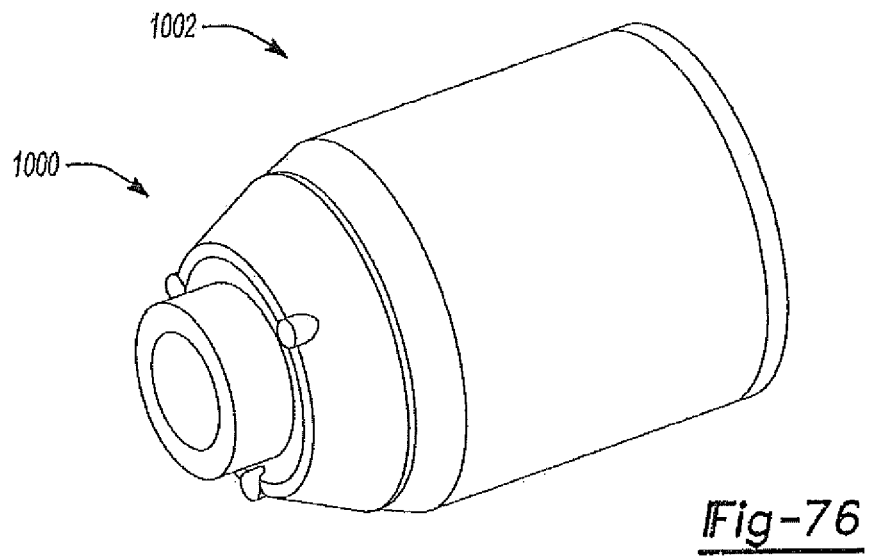
FIG. 76 is a front perspective view of a keyless chuck subassembly constructed in accordance to other features of the present teachings.
Figure 77:
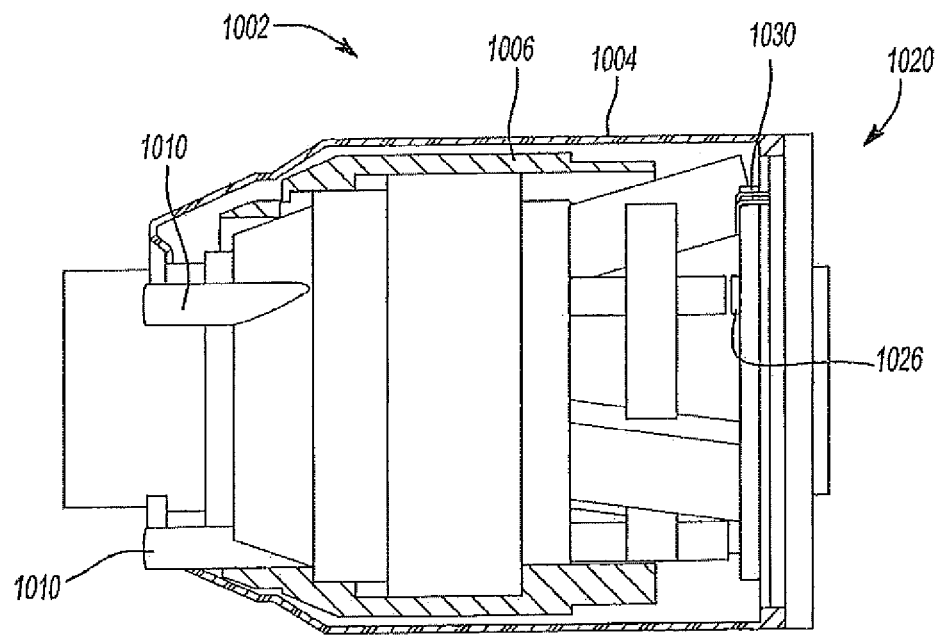
FIG. 77 is a cross-sectional view of the keyless chuck subassembly of FIG. 76.
Figure 80:
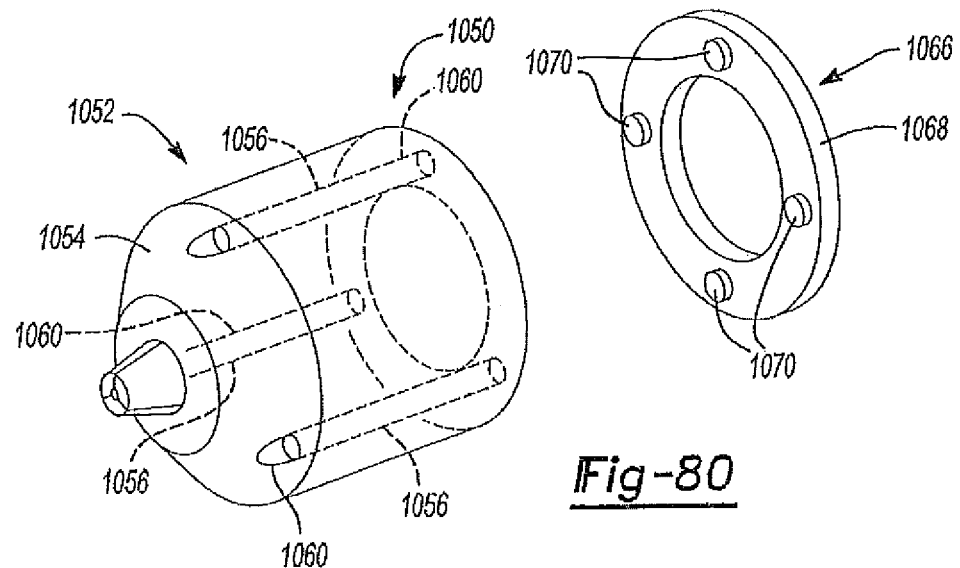
FIG. 80 is an exploded view of another exemplary chuck that incorporates a lighting system according to the present teachings.

The switching device 882 can be controlled either with dedicated power supply control devices, or a microcontroller. In other examples, other forms of analog or digital devices can control the FET switching device 882 based on an input voltage, output voltage, input and/or output current conditions of the power supply. FIG. 67 illustrates a forward single switch circuit 884 having a switching device 886. FIG. 68 illustrates a forward, two-switch circuit 886 having a first switching device 890 and a second switching device 892. FIG. 69 illustrates a forward, active clamp circuit 896 having a first switching device 898 and a second switching device 900. FIG. 70 illustrates a forward, half-bridge circuit 902 that incorporates a first switching device 904 and a second switching device 906. FIG. 71 illustrates a forward, push-pull circuit 910 that incorporates a first switch 912 and second switch 914. FIG. 72 illustrates a forward, full-bridge circuit 920 that incorporates a first switching element 921, a second switching element 922, a third switching element 924, and a fourth switching element 926. FIG. 73 illustrates a forward, phase shift zero voltage switching circuit 930. The circuit 930 incorporates a first switching device 932, a second switching device 934, a third switching device 936, and a fourth switching device 938.

In some examples of the present teachings, one or more primary cells may be used to make a battery that can power LEDs mounted in a rotating chuck. In such examples, the method to turn "on" and "off" the LEDs is critical for user satisfaction and also for minimizing the frequency of the battery replacement. In this regard, various sensing methods may be incorporated to turn "on" the LEDs in the chuck using very low powered electronic circuitry which does not drain the battery when the LEDs are turned "off". One configuration includes a centrifugal switch that is activated by the rotating chuck. A second configuration includes an accelerometer that detects vibration of the tool and/or rotation of the chuck. In a third configuration, a piezoelectric sensor can be incorporated that detects tool vibration. In a fourth configuration, a Hall-effect sensor is incorporated that senses rotation of a small magnet. In each of the configurations and sensing methods described above, the LEDs could be turned "off" when the sensor output is below a turn "on" sensing threshold (such as to allow for suitable hysteresis). In addition, it is possible to also include a time delay such that the LED remains on for a given time, once the sensor output is below the turn "on" sensing threshold. The various sensing methods described above can enable a battery in the chuck to power the LEDs mounted in a chuck only when the tool is in operation and thus provide maximum battery life. A suitable LED delay can also be provided to aid the user when the tool is not running.

With reference now to FIGS. 74 and 75, another lighting configuration 950 constructed in accordance to additional features of the present disclosure will be described. The lighting configuration 950 disclosed in FIGS. 74 and 75 can include similar features as discussed above with respect to the various rotary transformers (reference 550, FIG. 40 etc.). Specifically, the configuration set forth in FIGS. 74 and 75 provides a keyless chuck subassembly 952 that incorporates a ring 954, an outer sleeve 956, an inner sleeve 958, and a body/jaw/nut subassembly 960. The inner sleeve 958 can incorporate a secondary coil 964 that electrically connect with LEDs 966 on a distal end of the inner sleeve 958. The secondary coil 964 can be configured to cooperate with a primary coil that may be configured on a stationary portion of the power tool such as any configuration disclosed herein.

In one example, the inner sleeve 958 is formed of plastic that is molded with a cylindrical depression 970 around an inner diameter that the secondary coil 964 may be wound around. The inner sleeve 958 can be configured to accommodate one or more LEDs 966 either as discrete components or surface mounted to a printed circuit board similar to disclosed herein (see for example, printed circuit board 472, FIG. 23). The outer sleeve 956 may be modified to include ports that allow light to be projected onto a workpiece. In the lighting configuration 950 disclosed in FIGS. 74 and 75, the metal outer sleeve 956 and the body/jaw/nut subassembly 960 can serve as the flux path.

With reference now to FIGS. 76-79, another lighting configuration 1000 incorporated on a keyless chuck subassembly 1002 according to the present teachings will be described. The keyless chuck subassembly 1002 can generally include an outer sleeve 1004, an inner sleeve 1006, and a chuck body 1008. A series of light pipes 1010 are incorporated on the keyless chuck 1002 and locate through passages 1014 formed in the chuck body 1008. An end cap subassembly 1020 can be incorporated on a rear end of the keyless chuck subassembly 1002. The end cap subassembly 1020 can generally include a cap body 1022, a printed circuit board 1024, and a series of LEDs 1026. A secondary coil winding 1030 can be incorporated in the end cap body 1022 of the end cap subassembly 1020. The secondary coil winding 1030 can cooperate with a primary coil winding such as incorporated on the body of the power tool as described above. The outer sleeve 1004, chuck body 1008, and tool spindle (not shown) can provide a flux path for the rotary transformer. The light pipes 1010 can be aligned with the LEDs 1026 to communicate a light beam from the LEDs 1026, through the keyless chuck 1002, and out a distal end onto a workpiece. A conical cap 1034 can be arranged on a forward end of the outer sleeve 1004.

With reference now to FIGS. 80-86, a lighting system 1050 incorporated on a drill chuck 1052 according to another example of the present teachings will be described. The drill chuck 1052 generally includes a chuck body 1054 having a plurality of light pipes 1056 positioned within a corresponding series of bores 1060 formed through the chuck body 1054. In the example provided, the chuck body 1054 incorporates three light pipes 1056. A light ring 1066 can include a PCB 1068 having a plurality of LEDs 1070 formed thereon. In the example provided, the PCB 1068 includes four LEDs 1070. The light ring 1066 can be incorporated on a stationary portion of the power tool such as the tool body. The LEDs may be powered by any method disclosed herein. In this regard, the light ring 1066 remains fixed with the tool body while the chuck body 1054 with the light pipes 1056 rotates relative thereto. While the chuck body 1054 has been described as having distinct light pipes 1056 that are located within bores 1060, it will be appreciated that the light pipes 1056 and the bores 1060 can be the same feature. In other words, the bores 1060 can act as light pipes or a distinct component may be inserted within the bores 1060 to act as a light pipe.

Figure 81:
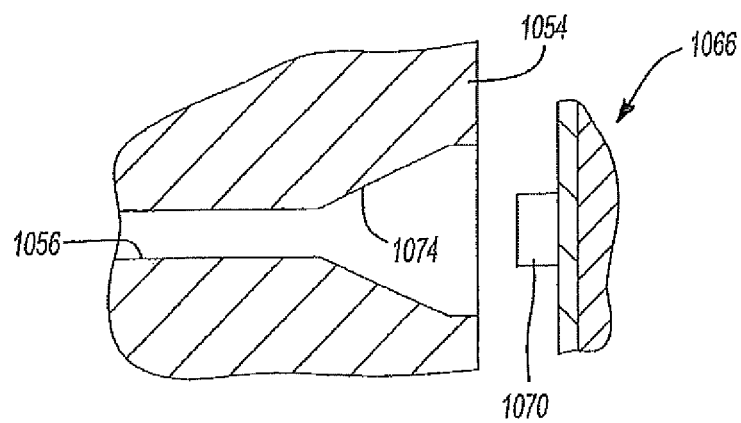
FIG. 81 is a partial cross-sectional view of the chuck shown in FIG. 80.
Figure 82:
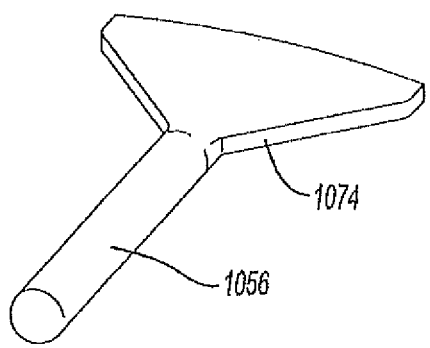
FIG. 82 is a front perspective view of an exemplary light pipe incorporated on the chuck of FIG. 80.
Figure 83:
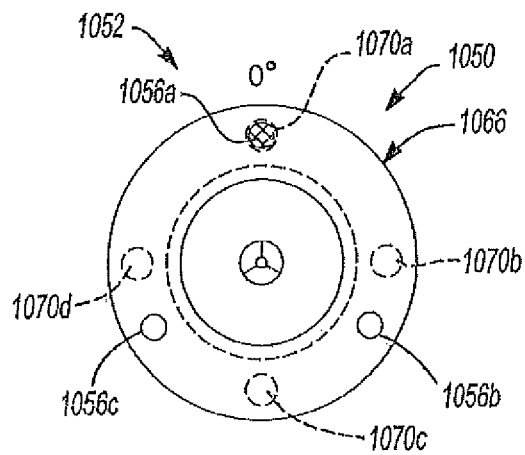
FIG. 83-86 illustrate an exemplary operational sequence that shows one LED illuminating through a given light pipe for each of thirty degrees of rotation according to one implementation.
Figure 84:
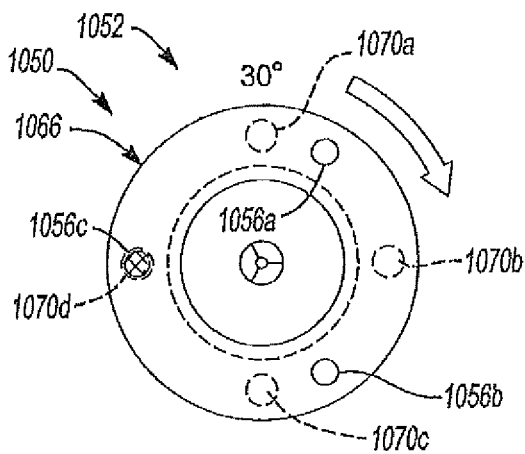
Figure 85:
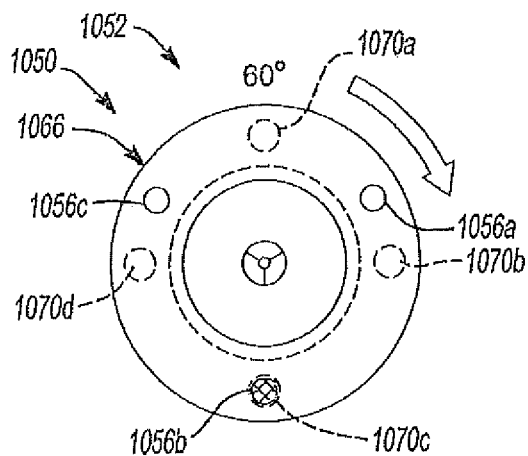
Figure 86:
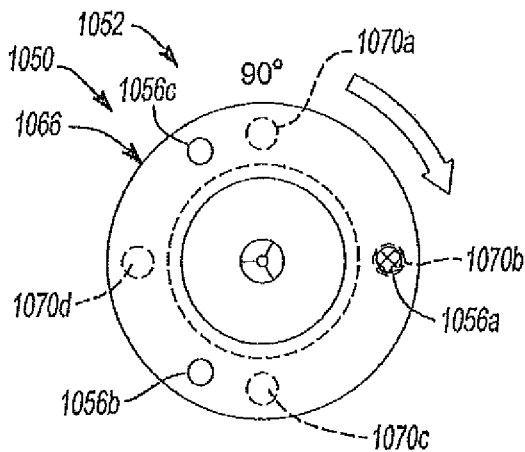

In some examples, as illustrated in FIGS. 81 and 82, the light pipe 1056 can have a conical bore surface 1074 provided in the chuck body 1054 adjacent to the light ring 1066. Operation of the lighting configuration 1050 in the drill chuck 1052 according to one example of the present teachings will be described with reference to FIGS. 83-86. As identified above, the light ring 1066 with the LEDs 1070 remains fixed to the body of the power tool while the chuck body 1054 having the light pipes 1056 rotates. The exemplary configuration includes LEDs 1070 located at the 0 degree (1070*a*), 90 degree (1070*b*), 180 degree (1070*c*), and 270 degree (1070*d*) locations around the light ring 1066. The light pipes 1056 are generally located at three equally spaced increments (1056*a*, 1056*b*, and 1056*c*) around the chuck body 1054. As a result, one of the rotating light pipes 1056 will align with one of the stationary LEDs 1070 every thirty degrees of chuck rotation. For example, as shown in FIG. 83, at zero degrees of chuck rotation, an LED 1070*a* illuminates through one of the light pipes 1056*a* at the twelve o'clock position. With reference to FIG. 84, with thirty degrees of chuck rotation, another light pipe 1056*c* will align with one of the LEDs 1070*d* to communicate light therethrough. In the example shown, the LEDs 1070 is aligned with a corresponding light pipe 1056*c* at the nine o'clock position. As shown in FIG. 85, with another thirty degrees of rotation of the chuck body 1054, another pipe ring 1056*b* will align with a corresponding LED 1070 on the light ring 1066. In the example shown, the light pipe 1056*b* aligns with the LED 1070*c* at the six o'clock position. With another thirty degrees of rotation of the chuck body, as shown in FIG. 86, a pipe ring 1056*a* will align with an LED 1070*b* of the light ring 1066 at the three o'clock position. Therefore, in the example provided, for every thirty degrees of rotation of the chuck body 1054, one of the light pipes 1056 will be aligned with one of the stationary LEDs 1070 on the light ring 1066. It will be appreciated that many other combinations may be provided such as incorporating additional LEDs 1070 and/or light rings 1056 to produce other combinations of lighting frequencies. It will also be appreciated that the conical surface 1074 (FIG. 81) can facilitate the passage of light illuminated from the LED 1070 during a longer span of rotational position of the chuck body 1054.

Figure 87:
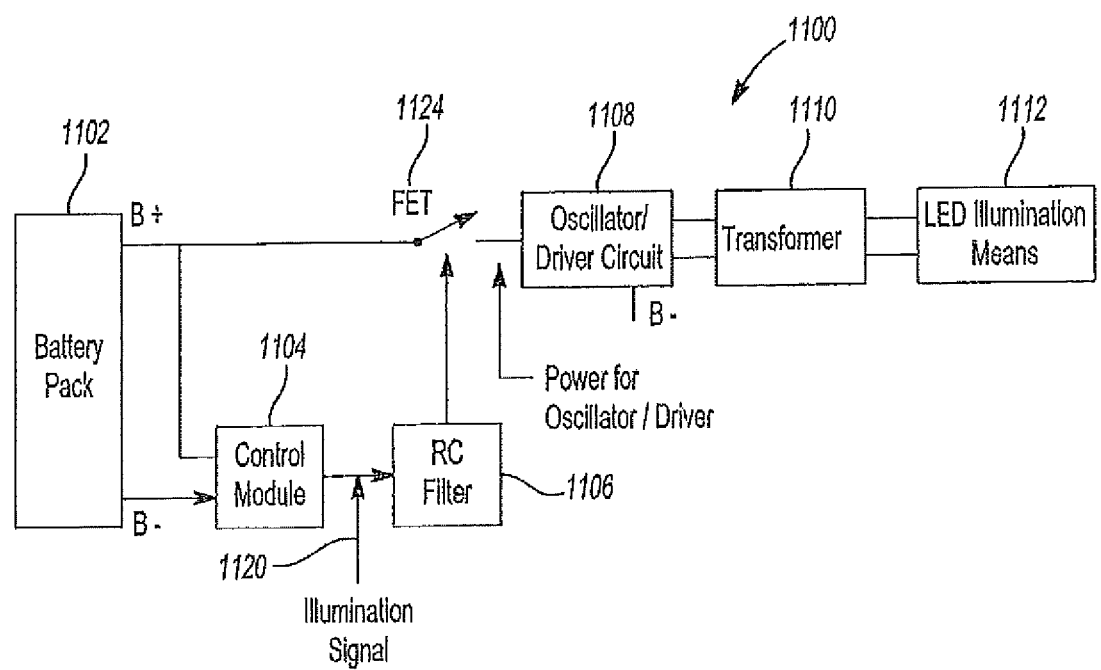
FIG. 87 is a schematic view of a power tool constructed in accordance to another example of the present disclosure.
Figure 88:
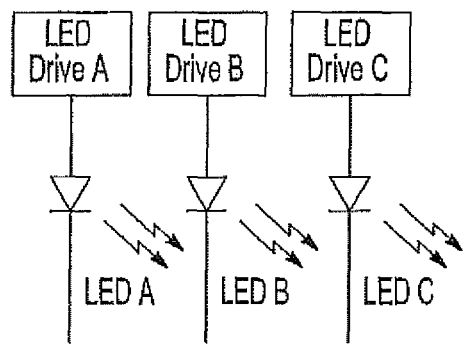

With reference now to FIG. 87, a power tool 1100 constructed in accordance to one configuration of the present disclosure. The power tool 1100 is generally a battery powered power tool having a battery pack 1102, a control module 1104, an resistor-capacitor (RC) filter 1106, an oscillator/driver circuit 1108, a transformer 1110, and an LED illumination means 1112. In general, the LED illumination means 1112 can include one or more collection of LEDs such as discussed herein. The LED illumination means 1112 can be powered exclusively from the battery pack 1102. An illumination signal 1120 can denote an LED output that can comprise a signal that is a square-wave signal with approximately fifty percent duty cycle and an arbitrary fundamental frequency chosen for convenience. The illumination signal 1120 can be filtered by the RC filter 1106. The RC filter 1106 can be a single-pole, low-pass filter of sufficient cut-off frequency such that a steady voltage can be applied to the base of a field effect transistor (FET) 1124 that is connected between a positive battery potential (B+) and an input to the oscillator/driver circuit 1108. In the configuration provided, the FET 1124 can act as a switch that selectively connects B+ to the oscillator/driver circuit 1108. The oscillator/driver circuit 1108 can connect to the primary of the transformer 1110. The secondary of the transformer 1110 can connect to the LED illumination means 1112. The configuration disclosed herein can be particularly advantageous as no drain on the battery pack 1102 is realized when the trigger (such as trigger 22, FIG. 1) is not depressed because the illumination signal 1120 disappears and the FET 1124 will shut off. In this regard, the FET 1124 can offer high impedance to the battery pack 1102 and thereby prevent any drain of charge from the battery pack 1102. In some examples, the control module 1104 can be configured such that the LED illumination means 1112 can be illuminated for some period of time after the trigger is released because the control module 1104 maintains the illumination signal 1120 for that time, and as long as the illumination signal 1120 persists, the LED illumination means 112 will be energized and thus illuminated.

With reference now to FIGS. 88-91, various methods and configurations for illuminating LEDs on a power tool such that not all of them are illuminated simultaneously will be described. In examples where more than one LED (or other discrete light source) is used to indicate or illuminate, it becomes possible to energize them individually. LEDs intrinsically have no persistence, fluorescence, or phosphorescence. When current flows through an LED at a sufficient level, they emit light. When insufficient current flows through them, they do not emit light. With multiple LEDs, their individual energizations may overlap. If they do not overlap, there can be a time between successive illuminations, referred to as "dead-time" between the illumination of one LED to another. White LEDs are specially constructed with a blue LED overlain by a yellow fluorescent layer. The combination of the blue light of the LED and the yellow light of the fluorescence layer appears as white light to the human eye. In practice, white LEDs extinguish after current stops flowing within nanoseconds. The configuration shown in FIG. 88 constitutes time multiplexing. Only one LED (LED A, LED B, LED C) is illuminated at any instant. Each LED can be driven at three times its steady-state drive. In this regard, three times the ordinary current is passed through each LED while it is illuminated. Because the duty cycle of each LED is 33.3% (only one third of the overall time period is each LED illuminated) the result is that each LED appears to the human eye to be illuminated steadily with its normal amount of current. The time period for illumination of the three LEDs in sequence must be shorter than can be perceived by the human eye for the averaging to take full effect. Typically, one hundred times per second is near the limit of human perception. Various means, as is known in the art, are available to drive many LEDs from few control pins of a microcontroller.

Figure 89:
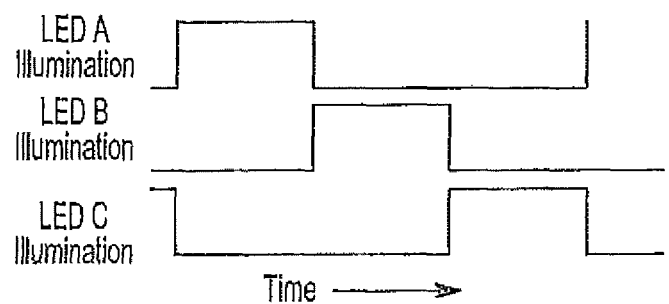
Figure 90:
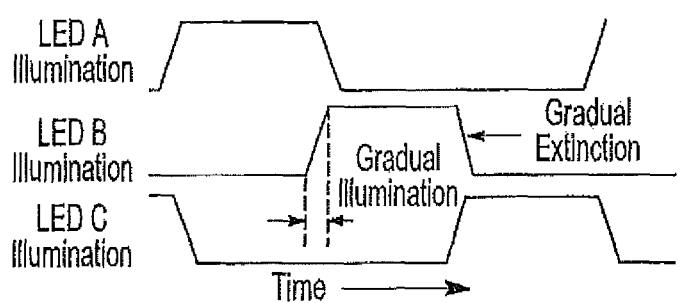

As shown in FIG. 89, dead time between each LED illumination is illustrated. As shown in FIG. 90, special effects may be incorporated by invoking overlap and/or gradual illumination and extinction. In the case of alternating current (AC) energization, time multiplexing becomes an inherent feature (see also FIGS. 53-55 and related discussion).

As shown in FIG. 91, LED A and LED B are in series and illuminated for one-third of the overall period (33.3% duty cycle). Therefore, they are driven with three times their ordinary steady-state current. LED C is illuminated for two thirds of the overall period (66.7% duty cycle). It is illuminated at one and one half times its ordinary steady-state current. The end result is that the combination appears to be three LEDs illuminated at their ordinary steady-state brightness. In configurations that incorporate LEDs A, B, and C of FIG. 88 as red, green, and blue, respectively, then the combination of the specific current through each LED, and its respective duty cycle, can be used to produce a broad spectrum of perceived colors. This perceived color, and the change over time of perceived color, can be employed to communicate many different parameters important to the power tool user. These exemplary parameters include, but are not limited to, battery life, drill depth, tool speed, and operating torque.

In examples where a single LED on a power tool is used to indicate or illuminate, it becomes possible to do so in a similar way to the examples above. On a power tool such as disclosed herein, with a single LED, that LED can be driven with three times its normal current. In this way, the LED can be driven with a duty cycle of 33.3%, resulting in an illumination equivalent to continuous energization at its normal current. In some examples, varying the duty cycle inversely with the drive current can result in equivalent illumination. The values of three times and 33.3% are meant merely as examples and other values may be used. Illuminating a single LED at its ordinary current, but with a duty cycle of 50%, has the effect of an LED illuminated at one-half its ordinary level. Thus, the duty cycle becomes a way of controlling perceived brightness while current is held constant, just as varying the current through the LED is a way of controlling perceived brightness while the duty cycle is held constant.

FIG. 92 illustrates a rotary transformer 1150 that incorporates the principles of FIG. 91 discussed above. The rotary transformer 1150 is connected to a DC power source 1152. A primary winding 1154 may be incorporated on a stationary portion 1156. A secondary winding 1160 may be incorporated on a rotating portion 1162. A core 1166 can be disposed between the primary and secondary windings 1154 and 1160, respectively. The core 1166 can be an iron core, an air core, a ferrite core, or a core of any other material magnetic or non-magnetic. The rotary transformer 1150, while represented as rotary, may be configured alternatively as a stationary transformer. A DC drive of a predetermined duty cycle can be provided, not necessarily 50%, and with opposing DC magnitudes (not necessarily equal) as discussed above with respect to FIG. 91.

Figure 93:
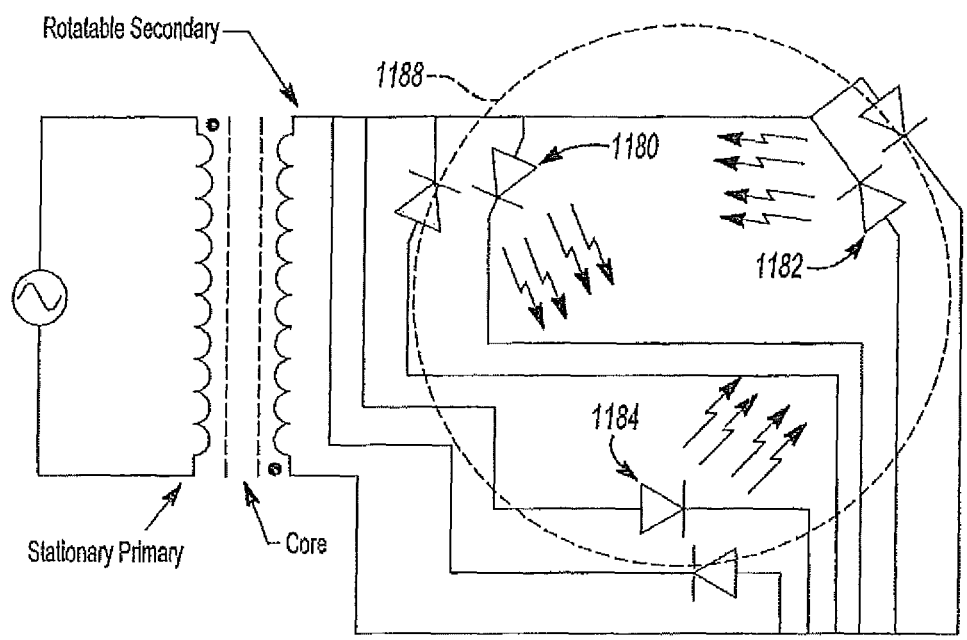
FIG. 93 is a schematic illustration of another exemplary rotary transformer constructed in accordance to the present teachings.

FIG. 93 illustrates a specific arrangement of LEDs 1180, 1182, and 1184 arranged around a circular chuck 1188. The LEDs 1180, 1182, and 1184 are disposed equally to achieve a pleasing symmetry. In other configurations, the LEDs 1180, 1182, and 1184 may be arranged in a non-symmetrical pattern.

Figure 94:
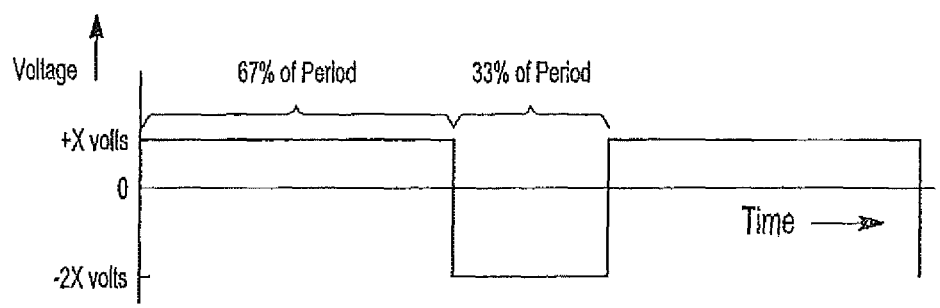
FIG. 94 is a plot of voltage versus time according to one example of the present disclosure.
Figure 95:
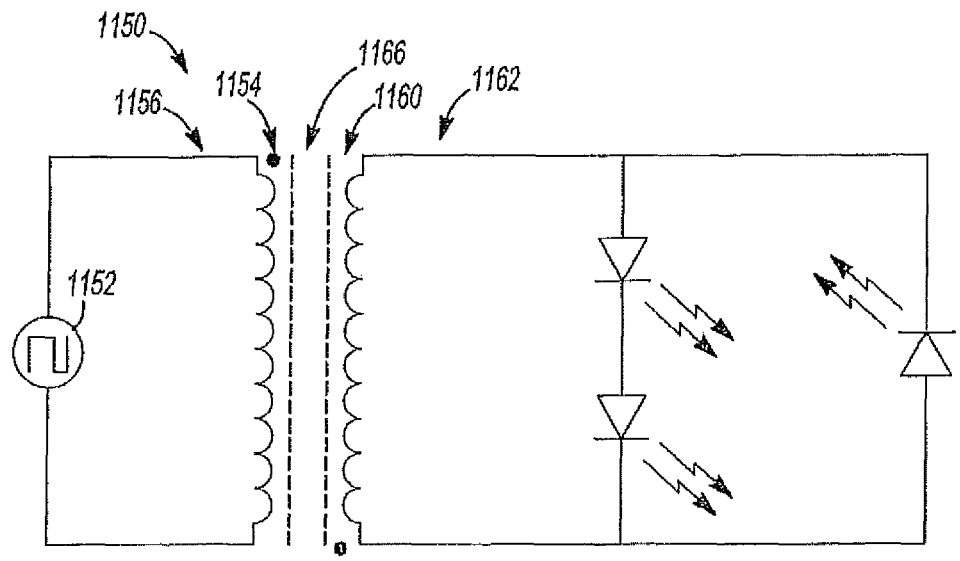
FIGS. 95-98 are schematic illustrations showing various configurations for disposing three LEDs symmetrically around a chuck of an AC power tool according to various examples of the present disclosure.
Figure 96:
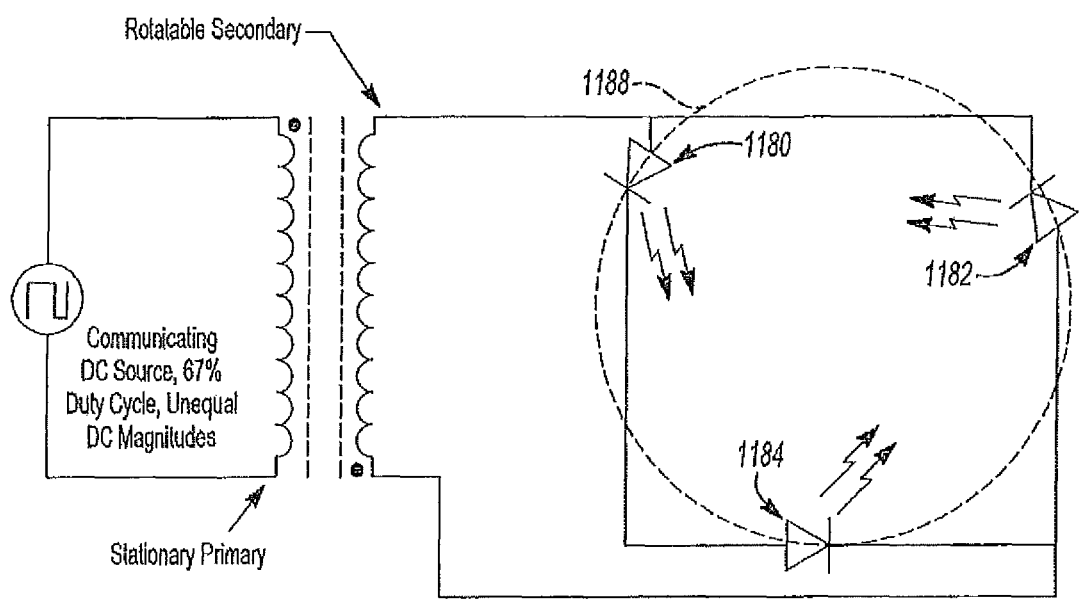
Figure 97:
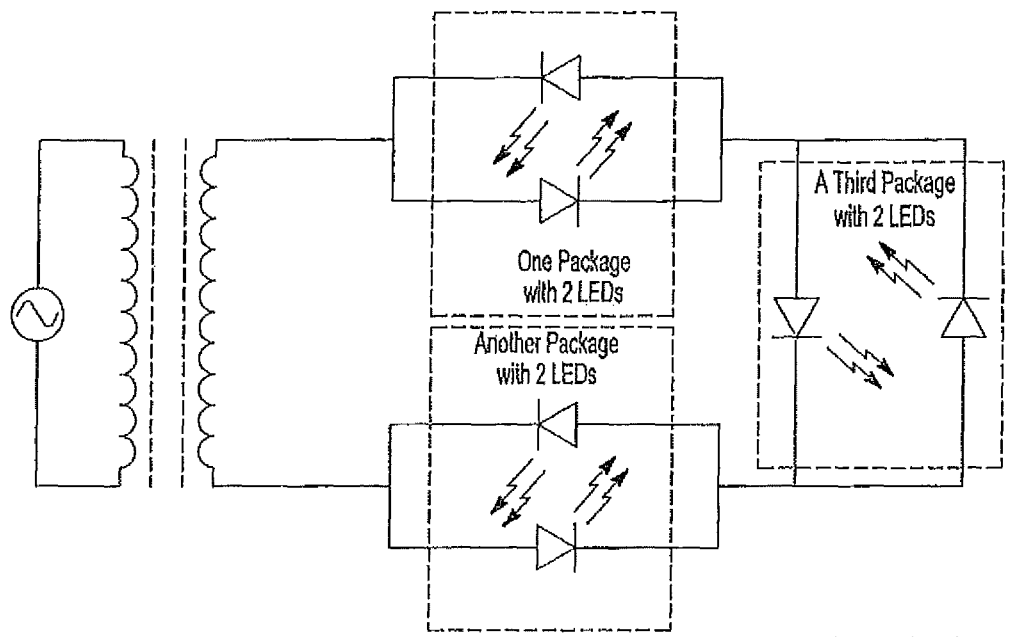
Figure 98:
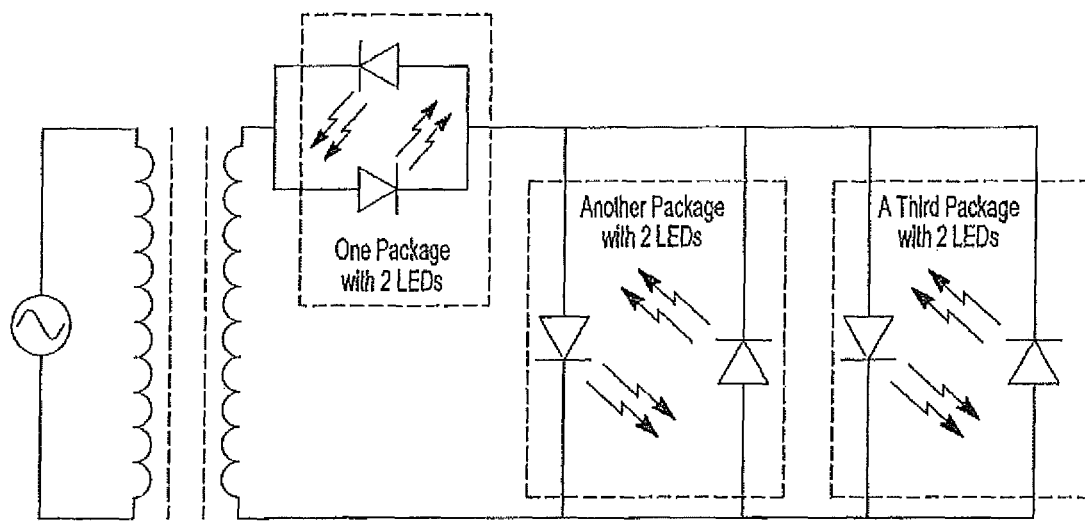

FIG. 94 illustrates a drive signal with no net DC component. In this regard, there is minimal power dissipated in the primary winding 1154 when the net DC drive is zero. Any other value than zero (i.e., a net non-zero DC offset in the drive signal), constitutes wasted power in the primary winding 1154. Small values of net DC offset may also be acceptable, but large values may be unacceptable.

Turning now to FIGS. 95-98, various configurations for disposing three LEDs symmetrically around a chuck of an AC power tool will be described in greater detail. In general, disposing three LEDs symmetrically around the chuck of an AC power tool may be challenging because of the bipolar nature of AC electricity. The following configurations incorporate packages of two LEDs unconnected to each other inside the package. Electrical connections for each LED are available as leads, or terminations of the surface mount package. In this regard, one LED in each package is illuminated during one half-cycle, and the other LED in each package is illuminated during the other half-cycle. The three LEDs of each half-cycle may be combined in parallel (FIGS. 95 and 96) or in series (FIG. 97) or two in parallel and one in series (FIG. 98) according to a given design requirement and determined by the output characteristics of the secondary winding. The combination of six discrete LEDs, arranged according to FIGS. 95-98 achieves the same end.

Figure 99:
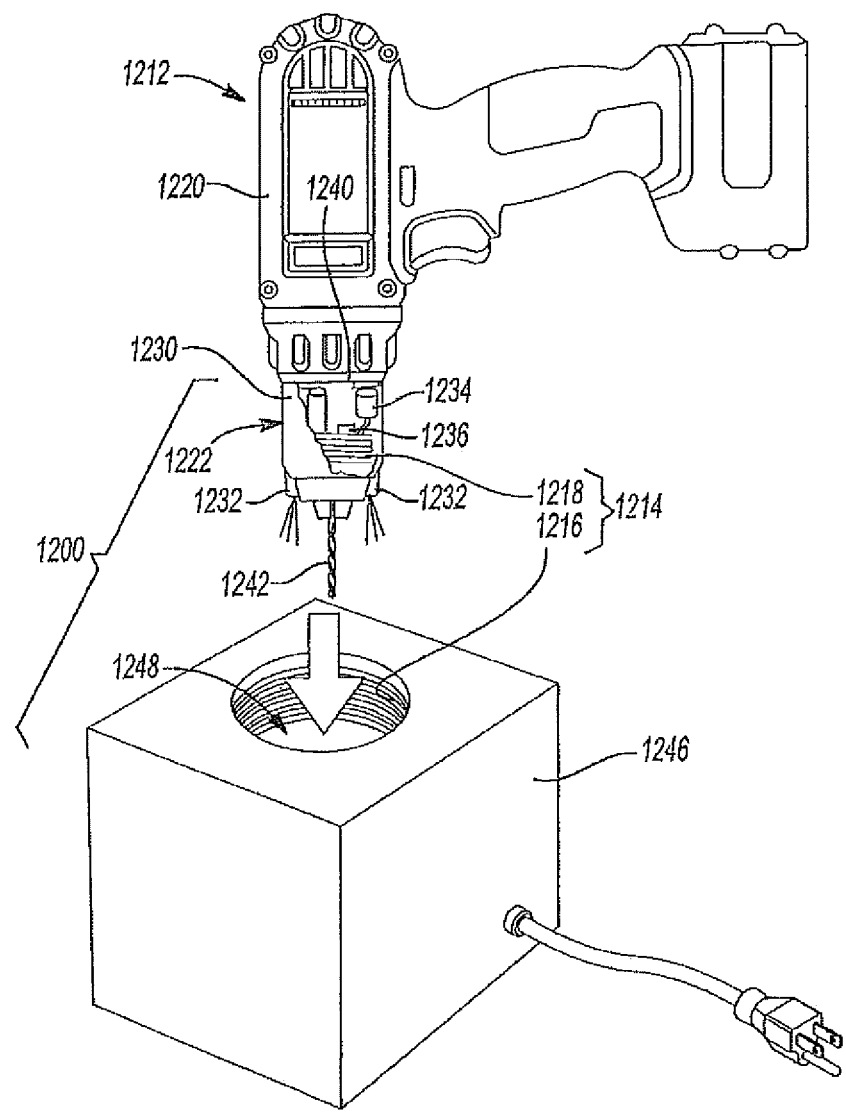
FIG. 99 is a perspective view of a tool system constructed in accordance to additional features of the present disclosure, the tool system having a tool and an inductive powering unit.

With reference to FIG. 99 of the drawings, a tool system constructed in accordance with the teachings of the present disclosure is generally indicated by reference numeral 1200. The tool system 1200 can include a tool 1212 and an inductive powering unit 1214 having a primary coil 1216 and a secondary coil 1218 that is integrated into the tool 1212.

The tool 1212 can comprise any type of tool, such as a battery-powered rotary power tool 1220 with a chuck assembly 1222. The rotary power tool 1220 can comprise any type of drill, driver, drill/driver, hammer drill, hammer drill/driver or screwdriver for example.

The chuck assembly 1222 can comprise a tool chuck 1230, one or more light emitting diodes (LED's) 1232, an energy storage device 1234 and a controller 1236. The tool chuck 1230 can be coupled to an output member 1240 of the rotary power tool 1220 for rotation therewith. The tool chuck 1230 can be any type of chuck, including a keyed chuck or a keyless chuck, that is configured to drivingly engage a tool bit 1242, such as a drill bit. The LED's 1232 can be mounted on the tool chuck 1230 for rotation therewith and can be configured to illuminate an area adjacent to the tool bit 1242. The energy storage device 1234 can be any device for storing electrical energy, such as a battery and/or a capacitor. The energy storage device 1234 can be coupled or mounted to the tool chuck 1230 and can be electrically coupled to the LED's 1232 and the controller 1236. The controller 1236 can be configured to selectively operate the LED's 1232 and can include sensors, switches and/or timers that can permit electric current to flow from the energy storage device 1234 to the LED's 1232 upon the occurrence of one or more predetermined criteria. The controller 1236 can also be configured to control charging of the energy storage device 1234 as will be discussed in more detail below.

The primary coil 1216 can be integrated into a storage device 1246 for the tool 1212. The storage device 1246 is schematically illustrated in the figure, but it will be appreciated from this disclosure that the storage device 1246 could comprise any suitable storage device, such as a holster, a tool box, a kit box, or a battery charging device, such as a battery charger, a radio, or a Knaack box. The primary coil 1216 can be coupled to any desired source of electrical power, such as a power mains that provides alternating current (AC) power. It will be appreciated, however, that the primary coil 1216 could be configured to operate using direct current (DC) power, or may include a switchable power supply that permits a user to couple the primary coil 1216 to both AC and DC power sources (in which case the primary coil 1216 may select which of the AC and DC power sources it will receive power from). The primary coil 1216 can be configured to generate a magnetic field. The storage device 1246 can define a cavity 1248 into which the tool 1212 can be received. In some situations, the cavity 1248 can be configured such that the tool 1212 is oriented in a predetermined manner so that the secondary coil 1218 can be oriented to the magnetic field of the primary coil 1216 in a desired manner.

The secondary coil 1218 can be integrated into the tool 1212 and can be configured to employ the magnetic field of the primary coil 1216 to generate electrical power that is in turn used to charge the energy storage device 1234. In the particular example provided, the secondary coil 1218 is integrated into the tool chuck 1230 and electrically coupled to the controller 1236 and the energy storage device 1234. Optionally, the controller 1236 can be configured to interact with one or both of the primary and secondary coils 1216 and 1218 to control the generation of magnetic field and/or the electrical power produced by the secondary coil 1218 based on the position or alignment of the secondary coil 1218 relative to the primary coil 1216. Accordingly, it will be appreciated that the energy storage device 1234 may be re-charged in a wireless manner so that replacement of the energy storage device 1234 may not be needed when the energy storage device 1234 has been discharged to a predetermined level.

Figure 100:
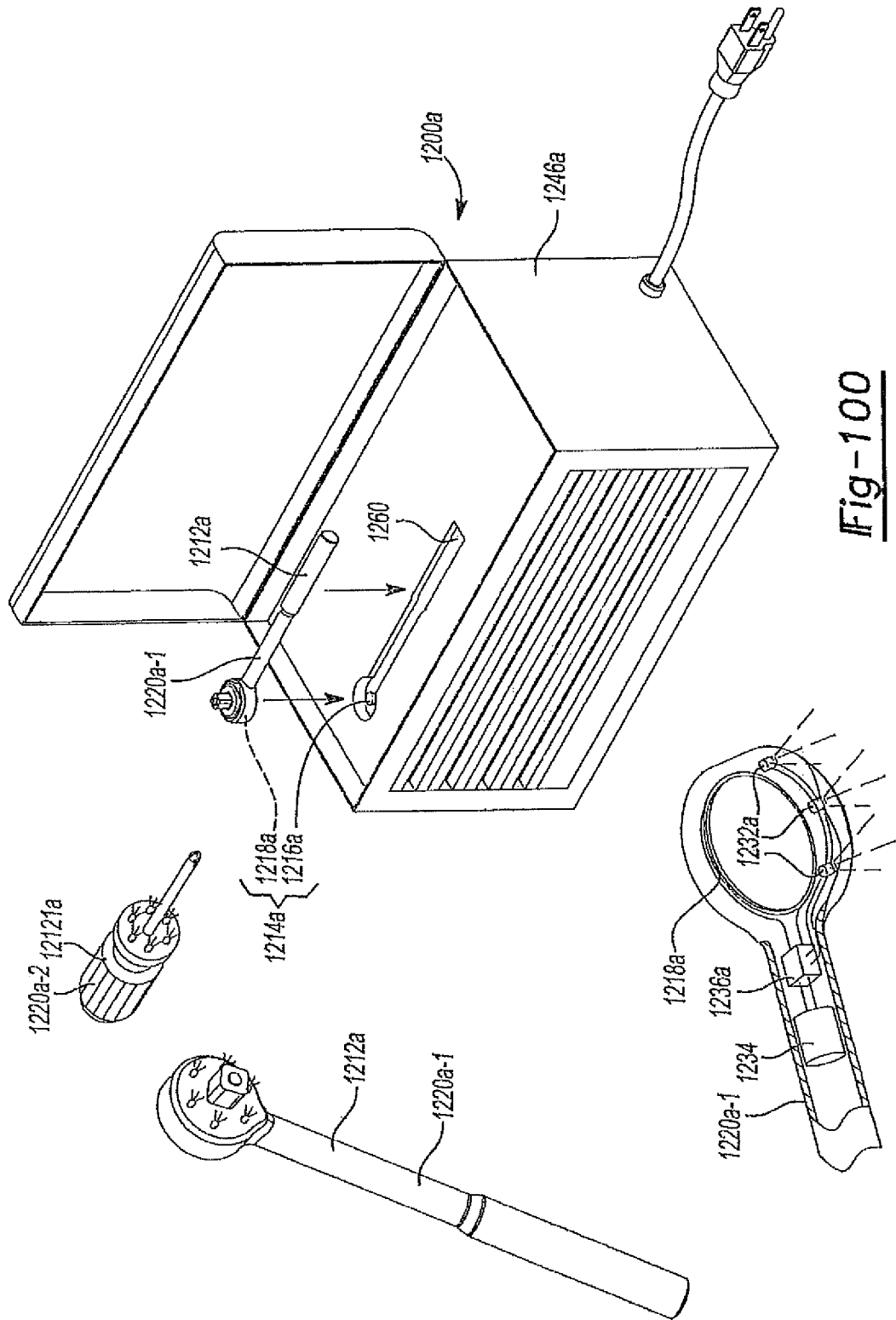
FIG. 100 is a perspective view of another tool system constructed in accordance to the present disclosure and having one or more tools associated with an inductive powering unit.

With reference to FIG. 100, another tool system constructed in accordance with the teachings of the present disclosure is generally indicated by reference numeral 1200a. The tool system 1200a can include one or more tools 1212a and an inductive powering unit 1214a having one or more primary coils 1216a and one or more secondary coils 1218a, each of the secondary coils 1218a being integrated into a corresponding one of the tools 1212a. In contrast to the tool system 1200 of FIG. 99, the tool system 1200a comprises a plurality of a hand tools, such as a ratchet wrench 1220a-1 and a screwdriver 1220a-2. The ratchet wrench 1220a-1 and the screwdriver 1220a-2 each have tool bodies to which the secondary coil 1218a, a plurality of LED's 1232a, an energy storage device 1234 and a controller 1236a are mounted. In the particular example provided, the inductive powering unit 1214a comprises a plurality of primary coils 1216a (only one being shown), with each primary coil 1216a being disposed in a recess or well 1260 in the storage container 1246a (e.g., a tool box) that is configured to receive an associated one of the tools 1212a (and to thereby orient the secondary coil 1218a to the primary coil 1216 in an optimal manner). The LED's 1232a can be configured to illuminate an area adjacent to the tool 1212a when the tool 1212a is used in its intended manner. The energy storage device 1234 can be electrically coupled to the LED's 1232a and the controller 1236a. The controller 1236a can be configured to selectively operate the LED's 1232 and can include sensors, switches and/or timers that can permit electric current to flow from the energy storage device 1234 to the LED's 1232a upon the occurrence of one or more predetermined criteria, such as removal of the secondary coil 1218a from the magnetic field of the primary coil 1216a. The controller 1236 can also be configured to control charging of the energy storage device 1234 in a manner that is similar to that which was discussed above in more detail.

While the tool system 1200a has been described as having tools 1212a with LED's 1232a that are configured for illuminating an area adjacent to the tool 1212a when the tool 1212a is used in its intended manner, it will be appreciated that the energy storage device 1234 could be employed to power other devices in lieu of or addition to the LED's 1232a. For example, an electronic torque sensor (not shown) could be incorporated into the tool 1212a and can be employed to generate an electronic signal indicative of a magnitude of a torque that is output from the tool 1212a. The electronic signal could be employed to generate an alarm or signal that can be communicated aurally or visually to an operator of the tool 1212a. For example, the alarm or signal could comprise sound generated by a speaker (not shown) and/or light generated by a display (that may display an actual value, a single light indicative that a minimum torque has been met, or a series of lights that display in a relative manner the magnitude of the torque that has been applied by the tool 1212a). It will be appreciated that the alarm or signaling devices (e.g., speaker, lights) could be powered by the energy storage device 1234.

Figure 101:
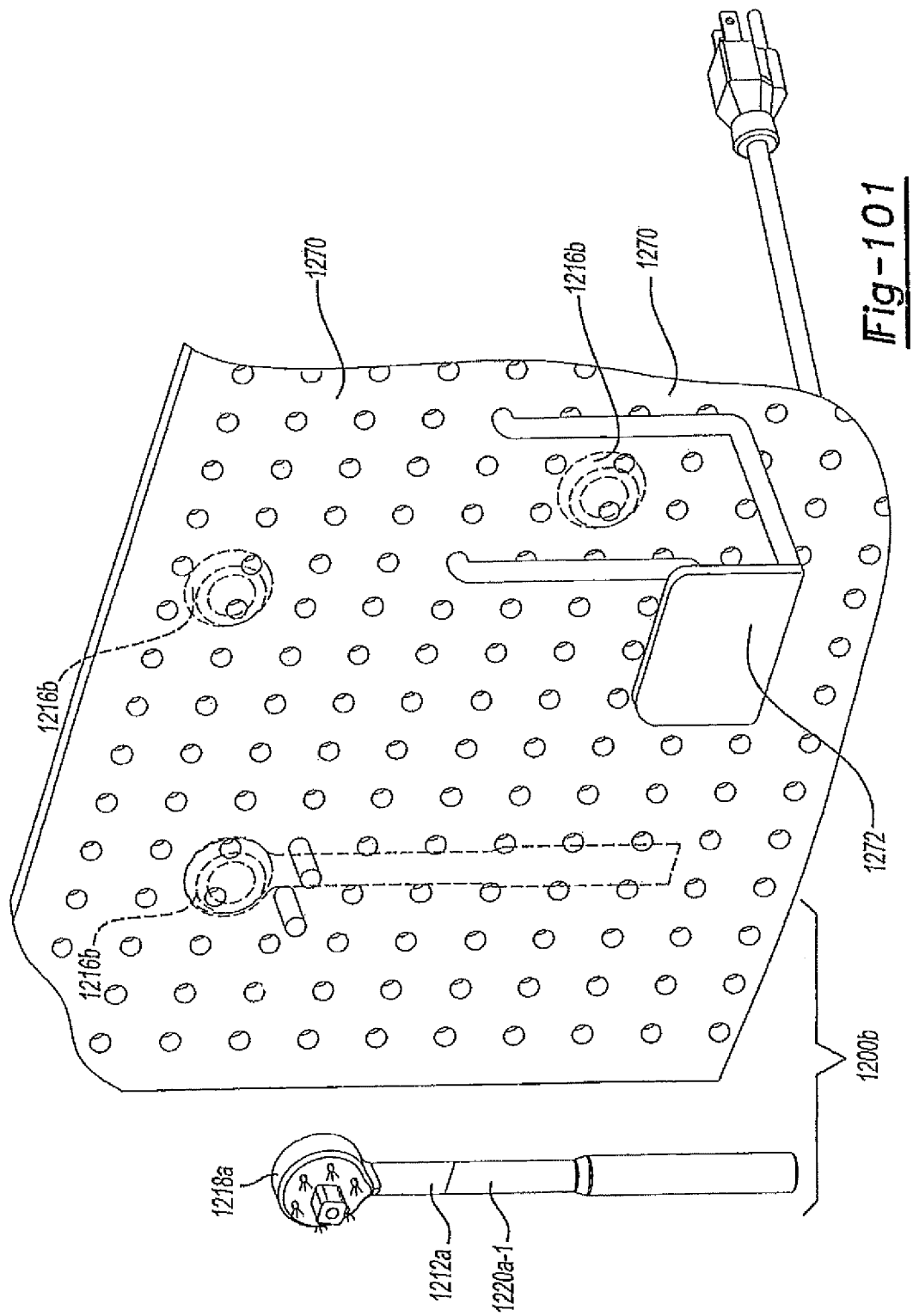
FIG. 101 is a perspective view of another tool system constructed in accordance to the present disclosure and incorporating primary coils mounted on a back side of a peg board.

With reference to FIG. 101, another tool system constructed in accordance with the teachings of the present disclosure is generally indicated by reference numeral 1200b. The tool system 1200b can be similar to the tool system 1200a of FIG. 100, except that the primary coils 1216b are mounted to the back side of a pegboard 1270 from which the tools 1212a may be hung. It will be appreciated that each of the tools 1212a can be packaged as a kit with an appropriately sized and shaped one of the primary coils 1216b. The primary coils 1216b can be provided with a coupling means for coupling the primary coil 1216b to the back side of the pegboard 1270. The coupling means could comprise an adhesive film, or may include fasteners (not shown) that can extend through (otherwise unused) holes in the pegboard 1270.

Additionally, one or more of the primary coils 1216b can be configured to cooperate with a secondary coil (not shown) in a battery pack (not shown) so that the battery pack may be recharged in a wireless manner. It will be appreciated that the battery pack may be of the type that is removably coupled to a power tool, or may of the type that is substantially permanently mounted within a power tool. A primary coil 1216b that is configured to re-charge a battery for a power tool can be packaged as a kit with a cradle 1272 that is configured to hold the battery pack or power tool when the battery pack is to be recharged via the magnetic field produced by the primary coil 1216b.

Figure 102:
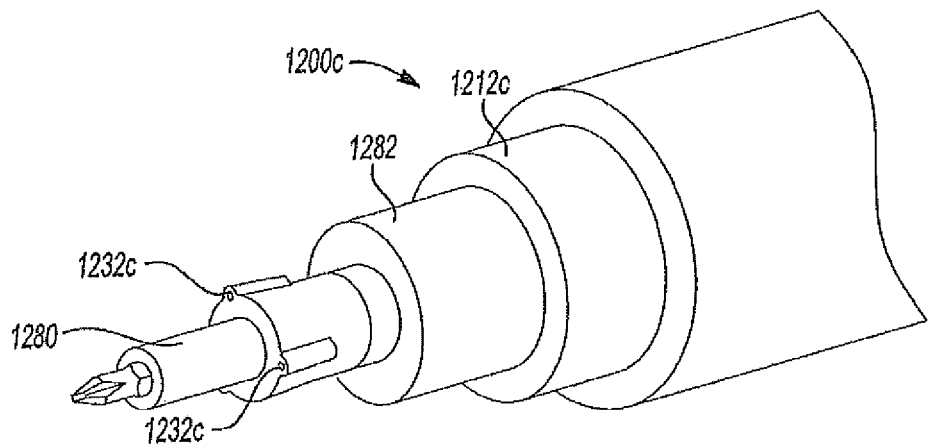
FIG. 102 is a perspective view of another tool system constructed in accordance to the present disclosure and including an inductive powering unit having a primary coil and a secondary coil.
Figure 103:
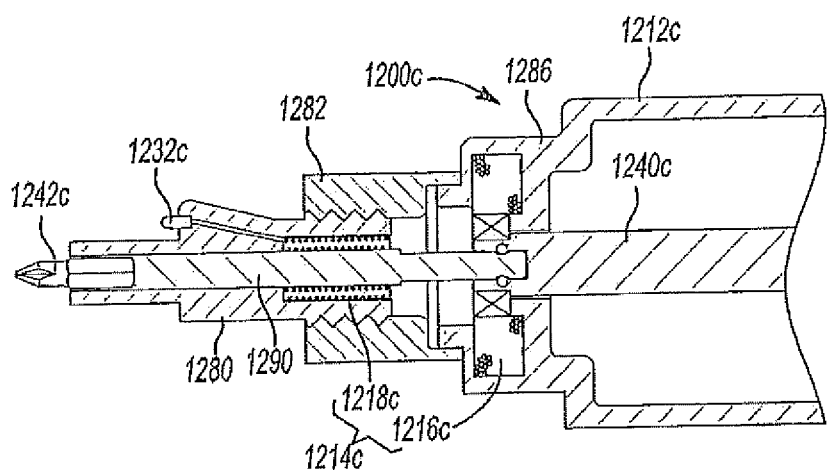
FIG. 103 is a cross-sectional view of the tool system of FIG. 102.

With reference to FIGS. 102 and 103, another tool system constructed in accordance with the teachings of the present disclosure is generally indicated by reference numeral 1200c. The tool system 1200c can include a tool 1212c and an inductive powering unit 1214c having a primary coil 1216c and a secondary coil 1218c. In the particular example provided, the tool 1212c is a drywall screwdriver having a depth nose 1280 that is adjustably coupled to an adjusting collar 1282, but it will be appreciated that other types of tools, including tools with an output other than a rotating output, could be utilized in the tool system 1200c. The tool 1212c can include one or more light emitting diodes (LED's) 1232c that can be mounted in a manner that illuminates an area adjacent to the tool 1212c when the tool 1212c is used in its intended manner. In the particular example provided, the LED's 1232c are mounted to the depth nose 1280 and are electrically coupled to the secondary coil 1218c, which is also mounted to the depth nose 1280.

The primary coil 1216c can be integrated into a portion of the tool 1212c that is "stationary" relative to the depth nose 1280, such as a portion of a housing 1286 of the tool 1212c adjacent the adjusting collar 1282. The primary coil 1216c can be electrically coupled to the source of power that powers a motor (not shown) that operates the tool 1212c. In the particular example provided, the primary coil 1216c is electrically coupled to a battery pack (not shown) that powers the tool 1212c. A controller (not shown) is configured to control the supply of electrical power to the primary coil 1216c such that the primary coil 1216c generates a magnetic field after the occurrence of a predetermined set of conditions. For example, the tool 1212c can have a trigger (not shown) and the controller can be configured to cause electrical power to be transmitted to the primary coil 1216c for a predetermined time interval after the trigger has been depressed or after a motor controlled by the trigger has rotated by a predetermined amount. When powered, the primary coil 1216c can generate a magnetic field that can be utilized by the secondary coil 1218c to generate electrical power that is employed to directly power the LED's 1232c.

If desired, the primary coil 1216c and/or the secondary coil 1218c may be housed in a metallic coil housing (not shown) to enhance magnetic coupling of the primary and secondary coils 1216c and 1218c. Additionally, a bit holder 1290, which is configured to hold a tool bit 1242c for driving screws, and/or the output shaft 1240c of the tool 1212c can be utilized as part of the flux path of the magnetic field.

Figure 104:
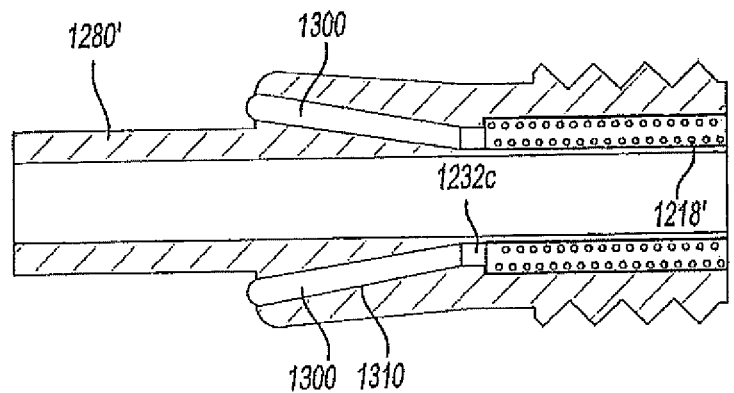
FIG. 104 is a cross-sectional view of another tool system constructed in accordance to another example and incorporating light pipes therein.
Figure 105:
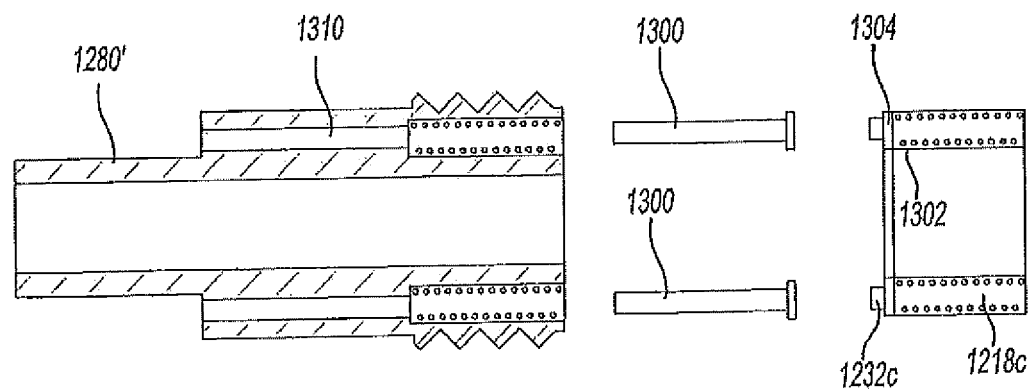
FIG. 105 is an exploded cross-sectional view of another tool system that incorporates light pipes having a different orientation.

The example of FIGS. 104 and 105 is generally similar to that of FIGS. 102 and 103, except that the LED's 1232c are directly mounted to the secondary coil 1218c' and light pipes 1300 are received into the depth nose 1280'. Construction in this manner permits the secondary coil 1218c' to be wound about a bobbin 1302 that includes a printed circuit board 1304 to which the LED's 1232 are surface mounted. The light pipes 1300 can be received into apertures 1310 formed in the depth nose 1280' and the secondary coil 1218c' can be press-fit to the depth nose 1280'. Alternatively, the light pipes 1300, LED's 1232c' and secondary coil 1218c' can be inserted molded into the depth nose 1280'.

Figure 106:
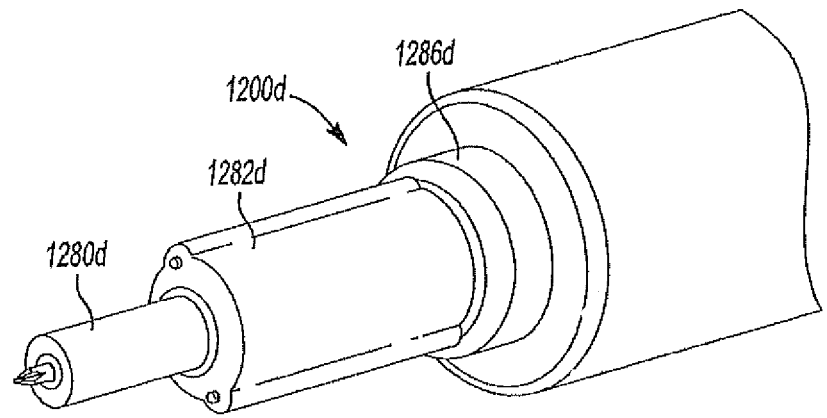
FIG. 106 is a perspective view of another tool system constructed in accordance to the present disclosure.
Figure 107:
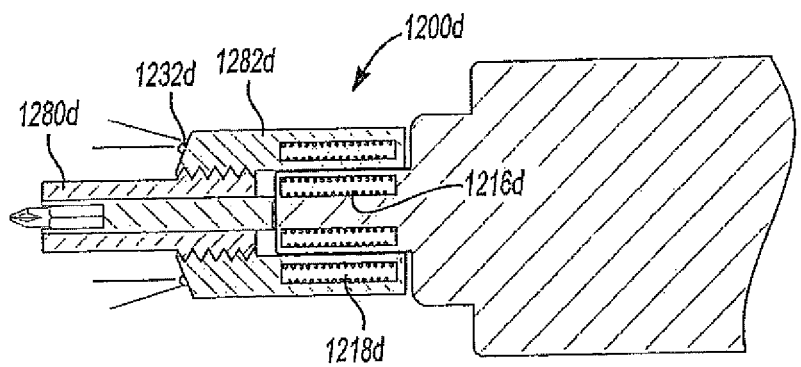
FIG. 107 is a cross-sectional view of the tool system of FIG. 106.
Figure 108:
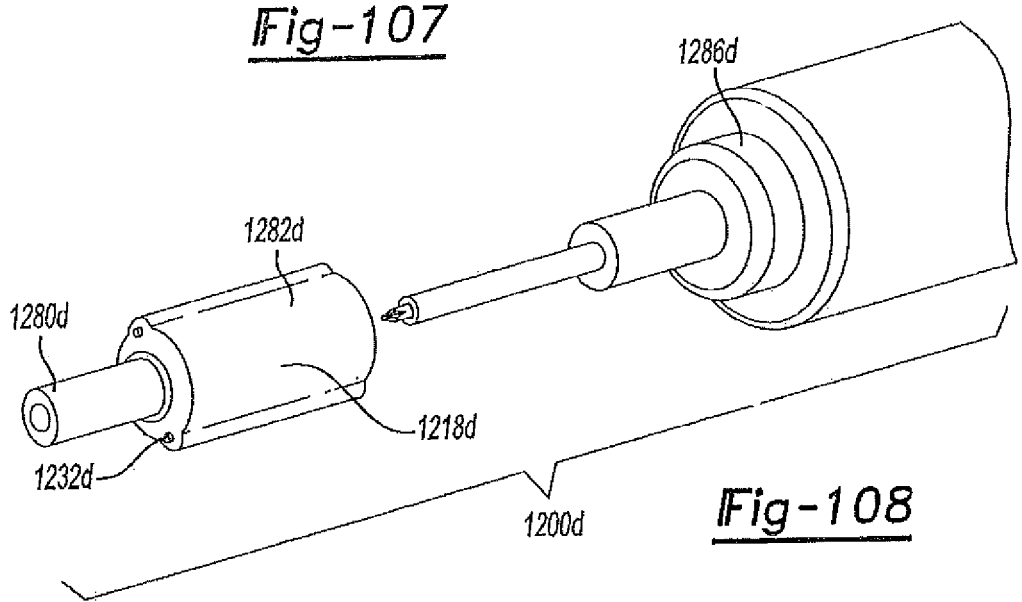
FIG. 108 is an exploded perspective view of the tool system of FIG. 106.

FIGS. 106 through 108 illustrate still another tool system 1200d constructed in accordance with the teachings of the present disclosure. In this example the secondary coil 1218d and the LED's 1232d are mounted to the adjusting collar 1282d and the adjusting collar 1282d is removably coupled to the housing 1286d of the tool 1212d. The primary coil 1216d can be received into a protruding portion of the housing 1286d of the tool 1212d. When the adjusting collar 1282d is mounted to the protruding portion of the housing 1286d, the secondary coil 1218d can be maintained in a single, predetermined orientation relative to the primary coil 1216d despite the manner in which the depth nose 1280d is positioned relative to the adjusting collar 1282d. Any desired means can be employed retain the adjusting collar 1282d to the protruding portion of the housing 1286d, including threads, fasteners, quick-connects and detents.

The secondary coil 1218d and the LED's 1232d may be pressed into or otherwise mechanically fixed to the adjusting collar 1282d, including insert molded to the adjusting collar 1282d, in manners similar to those which are described above for the mechanical coupling of the secondary coil and LED's to the depth nose. It will be appreciated, too, that one or more light pipes (not shown) could be employed to transmit light from the LED's to a point exterior to the adjusting collar.

Those of skill in the art will appreciate from this disclosure that it may be desirable in some instances to incorporate a switching means into the controller 1236 to control the distribution of electrical power from the electrical storage device—to the LED's 1232. In some embodiments, the controller 1236 could include a manually-actuated switch (not shown) that could be accessed by the user to selectively operate the LED's 1232. The manually actuated switch could comprise any type of switch, such as a membrane switch, that could be operated by the user to generate a command signal that could be received by the controller 1236 to operate the LED's 1232. The operation of the LED's 1232 could be toggled in accordance with the command signal. Alternatively, the command signal could be a momentary signal and an edge of the signal, such as a leading edge, could be employed to initiate a timer (not shown) that is employed to control the timing and/or duration with which the LED's 1232 are illuminated.

Additionally or alternatively, a sensor (not shown) can be incorporated into the controller 1236 to sense a parameter that is indicative of whether the tool 1212 is in operation. If the timer times out, information from the sensor may be used to maintain illumination of the LED's 1232 so that the LED's 1232 are not extinguished while the tool 1212 is in use. The sensor could comprise an accelerometer or centrifugal switch that can be incorporated into an appropriate portion of the tool 1212, such as the tool chuck 1230. If an accelerometer is employed, the accelerometer may be configured to sense rotation of the tool chuck 1230 or movement of the tool 1212 in a predetermined manner (e.g., in a jabbing or thrusting motion).

Additionally or alternatively, the controller 1236 can be programmed to wait for two (or more) pulses of rotation that the user achieves by triggering the tool switch. The controller may be programmed to wait for two pulses of the trigger to extinguish the LED's 1232 or wait for a timer to expire or time out. If the controller 1236 senses rotation and illuminates the LED's 1232 during said rotation, and the timer (which may be an integral timer) is continually or periodically reset during the rotary operation of the tool, then upon cessation of rotation the timer will maintain illumination of the LED's 1232 extinguish. In an alternative embodiment, if the controller 1236 is disposed in the stationary body of the power tool rather than the rotating chuck, and power is transferred to the chuck by means of a rotary transformer, then the timer, part of the controller 1236, will be continually or periodically reset during the rotary operation of the tool under control of the controller 1236, and the LED or LEDs will remain illuminated. Upon cessation of rotation, again under the control of the controller 1236, the LED or LEDs remain illuminated until the timer times out, at which point the controller 1236 will cease illumination by terminating power transfer through the rotary transformer. It is obvious that the controller 1236 in this example may be integral with, or separate from, the trigger switch of the power tool. It will be appreciated by those skilled in the art that power tools without rotating accessories also benefit from LEDs powered through a traditional transformer rather than a rotary transformer.

Additionally or alternatively, the controller 1236 and the sensor can be configured to sense a predetermined or programmed sound that is associated with a need for illumination of the LED's 1232. The sensor could comprise a microphone and the controller 1236 could employ a technique, such as voice recognition or recognition of a predetermined sound, such as a clap or the operation of the motor of the power tool, to cause electrical power to be transmitted to the LED's 1232.

It will be appreciated that the techniques described herein have application to other types of tools besides rotary power tools. Non-limiting examples of other types of tools include: tools with one or more LED's integrated into the tool housing; other power tools having an output member that does not rotate, such as reciprocating saws; hand tools with LED's and/or sensors incorporated into the tool body; and flash lights.

Figure 109:
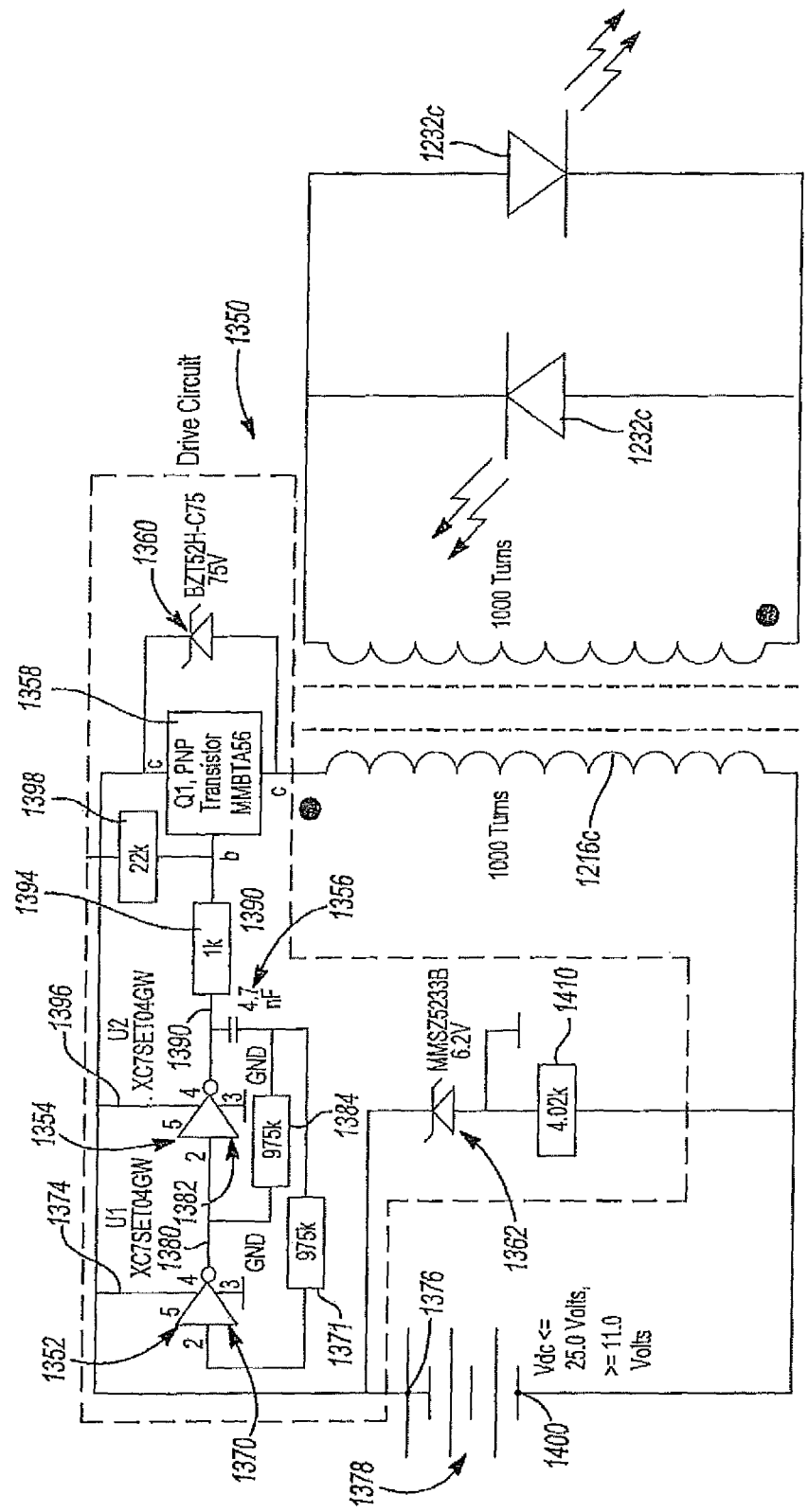
FIGS. 109 and 110 are schematic illustrations of a rotary transformer configuration according to additional features.
Figure 110:
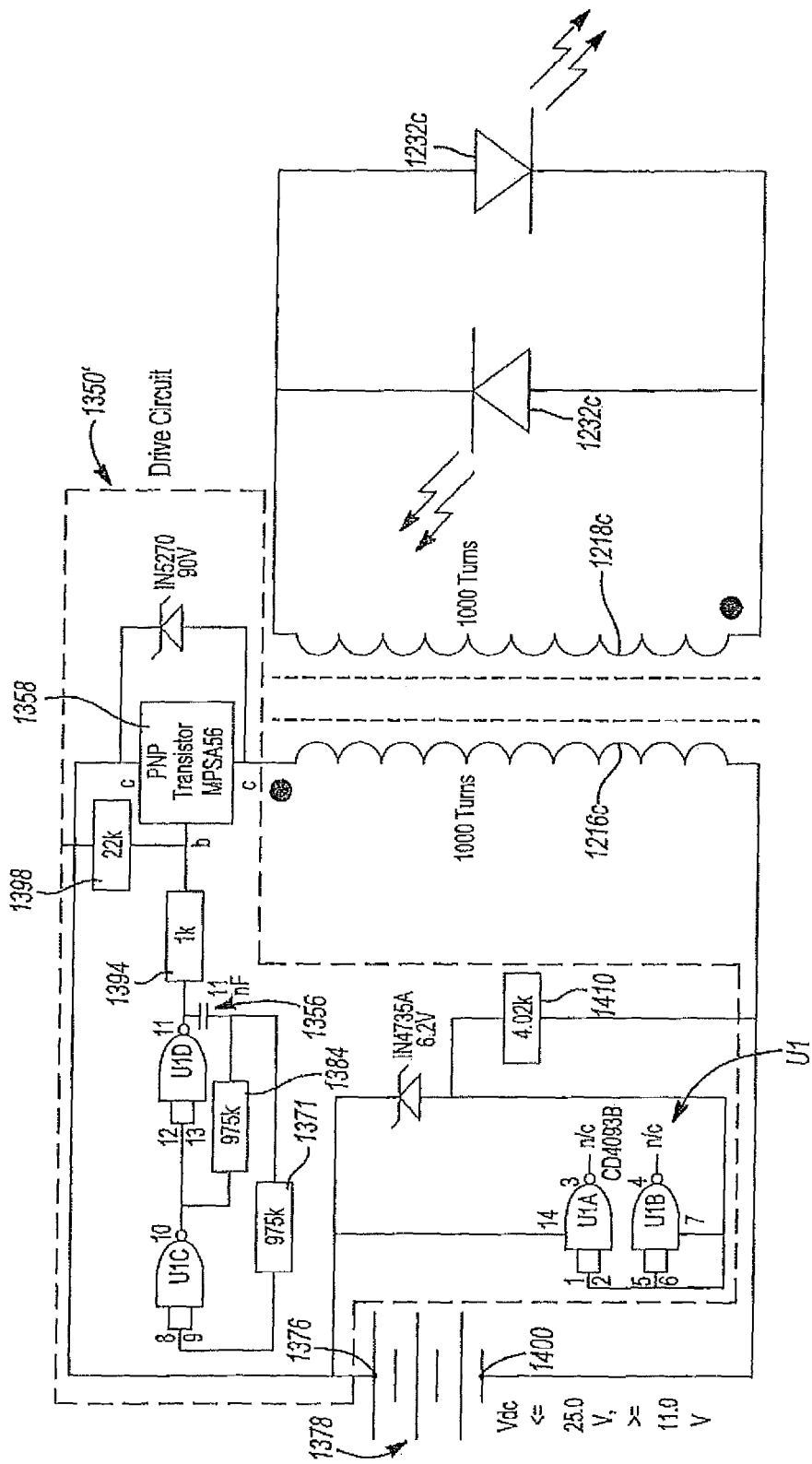

With reference to FIGS. 109 and 110, exemplary drive circuits are illustrated for providing electrical power to the primary coils of an inductive powering unit, such as the inductive powering unit 1214c of FIGS. 102 and 103. The drive circuits configured to receive electrical power from a power source, such as battery pack having a voltage of about 11 VDC to about 25 VDC, and to output power from a transistor to the primary coil 1216c.

With specific reference to FIG. 109, the drive circuit 1350 can comprise a first logic inverter 1352, a second logic inverter 1354, a capacitor 1356, a PNP transistor 1358, a first zener diode 1360, and a second zener diode 1362.

The first logic inverter 1352 can be a NOT gate and can have an input 1370, which is electrically coupled through a first resistor 1371 to the output of the capacitor 1356, a positive supply 1374, which is electrically coupled to positive voltage from a positive terminal 1376 of a battery 1378, and an output 1380 that is coupled to the input 1382 of the second logic inverter 1354, as well as through a second resistor 1384 to the output of the capacitor 1356. The second logic inverter 1354 can be a NOT gate and can have an output 1390 that can be coupled to an input of the capacitor 1356, as well as through a third resistor 1394 to the base b of the PNP transistor 1358. The second logic inverter 1354 can have a positive supply 1396 that can be coupled to the positive terminal 1376 of the battery 1378. A fourth resistor 1398 can couple the positive terminal 1376 of the battery 1378 to the output of the third resistor 1394 and to a base b of the PNP transistor 1358.

The PNP transistor 1358 can also have an emitter e, which is coupled to the positive terminal 1376 of the battery 1378, and a collector c, which is coupled to an input of the primary coil 1216c. The output of the primary coil 1216c can be coupled to a negative terminal 1400 of the battery 1378. The first zener diode 1360 can be disposed across the emitter e and the collector c to permit the flow of current from the collector c to the emitter e but to inhibit the flow of current from the emitter e to the collector c unless the voltage of the current is above a predetermined breakdown voltage, such as 75 volts DC. The second zener diode 1362 can have a cathode that can be coupled to the positive terminal 1376 of the battery 1378 and an anode that can be coupled through a fifth resistor 1410 to the negative terminal of the battery 1378. The second zener diode 1362 becomes the ground, or common, voltage for both NOT gates 1352 and 1354.

From the foregoing, it will be appreciated that the first and second logic inverters 1352 and 1354, the capacitor 1356 and the first, second, third and fourth resistors 1371, 1384, 1394 and 1398 cooperate to control oscillation of operation of the PNP transistor 1358 to generate an alternating current input to the primary coil 1216c. It will also be appreciated that the first zener diode 1360 can protect the PNP transistor 1358 from excess voltage and that the second zener diode 1362 and fifth resistor 1410 can provide a stable power supply voltage for the operation of the NOT gates 1352 and 1354.

FIG. 110 depicts another drive circuit 1350' that employs NAND logic gates in lieu of the NOT logic gates employed in the drive circuit 1350 (FIG. 11), but the controlled oscillation of the operation of the PNP transistor 1358 is similar to that which is provided in the drive circuit 1350 of FIG. 109. Additionally, unused portions of U1, namely U1A and U1B, have inputs terminated at ground potential but outputs that are left unconnected.

Referring to FIG. 111, an electric grinding tool, e.g., a die grinder 1500, generally includes a motor housing 1510 that includes a plastic housing portion 1512 and a metal housing portion 1514, and a handgrip or handle 1520 coupled to a front of the motor housing 1510. The motor housing 1510 contains a motor 1516 coupled to an output shaft 1518 that extends through the motor housing 1510 and handgrip 1520 to a tool holder 1522 in the form of a collet, which is configured to hold a shaft 1532 of grinding accessory 1534 such as a burr. Disposed on the output shaft 1518 is a fan 1524 that cools the motor 1516 as it rotates. The motor housing includes a front vent 1526 and a rear vent 1528 to assist the fan 1524 in cooling the motor. The illustrated grinding tool 1500 is powered by an AC power cord 1530, although it may also be powered by a DC battery or by other means (e.g., by a pneumatic motor). Coupled to the motor housing 1510 is also a power switch 1536. A light unit 1540 is coupled to and at least partially recessed inside a front end 1538 of the handgrip 1520.

Figure 113:
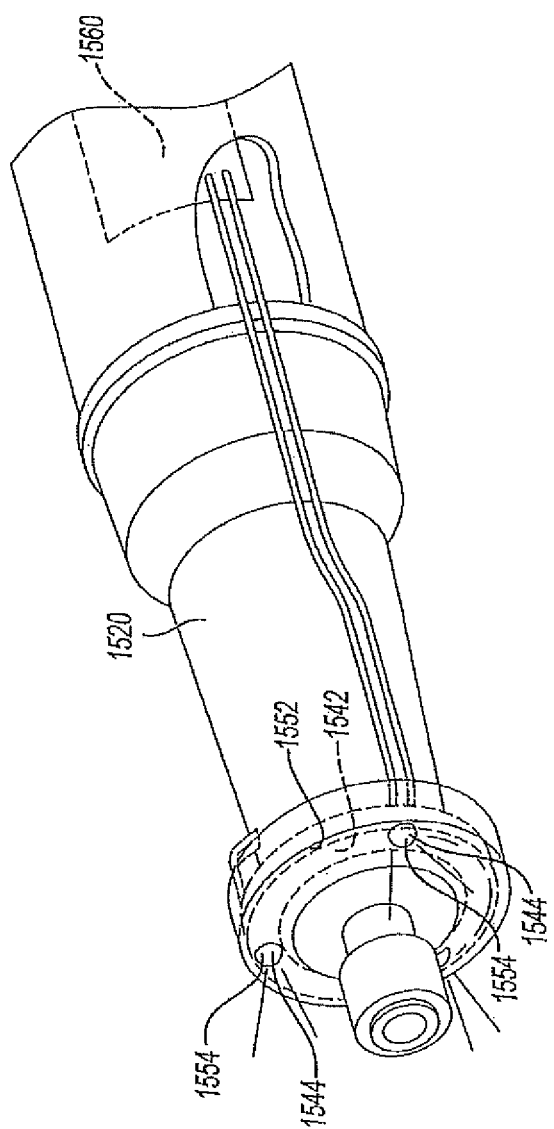

Referring to FIGS. 112 and 113, in one embodiment, the light unit 1540 includes a ring-shaped printed circuit board 1542 to which are mounted a plurality of LEDs 1544 (e.g., surface mount LEDs). The printed circuit board 1542 is received in a support ring 1548 that in turn is received in a recess or internal groove 1545 of the handle 1520. Received over the light unit 1540 is a cover assembly 1550 that includes a cover ring 1552 with a plurality of openings 1554 for the LEDs 1544. Received inside of the cover ring 1552 and over the LEDs 1544 may be one or more clear covers or lenses (not shown). The printed circuit board 1542, support ring 1548, handle 1520, lenses, and cover ring 1552 may be connected to one another in any known manner such as by a snap-fit connection, using threaded connectors, a bayonet connection, or by heat staking the components together.

Figure 114:
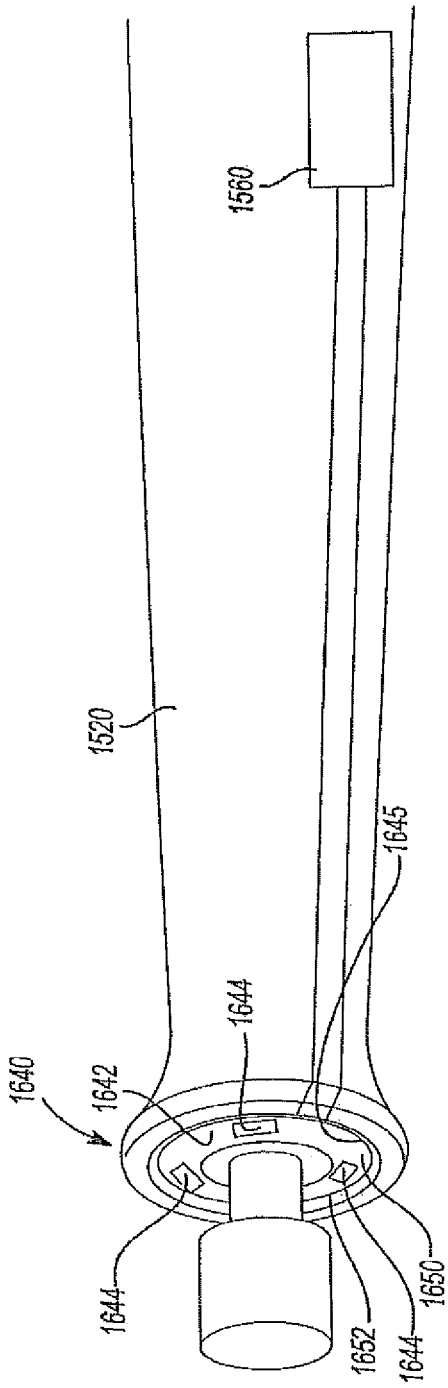
FIG. 114 is a side view of a grinding tool with an alternate light unit.

Referring to FIG. 114, in another embodiment, a light unit 1640 includes a ring-shaped printed circuit board 1642 to which are mounted a plurality of LEDs 1644 (e.g., surface mount LEDs). The printed circuit board 1642 is received in a recess or internal groove 1645 of the handle 1520. Received over the light unit 1640 is a cover assembly 1650 that includes a ring shaped clear cover or lens 1652 that is also received and recessed in the handle 1520. The printed circuit board 1642 and clear cover 1652 may be connected to one another and to the handle 1520 in any known manner such as by a snap-fit connection, using threaded connectors, a bayonet connection, or by heat staking the components together.

Figure 122:
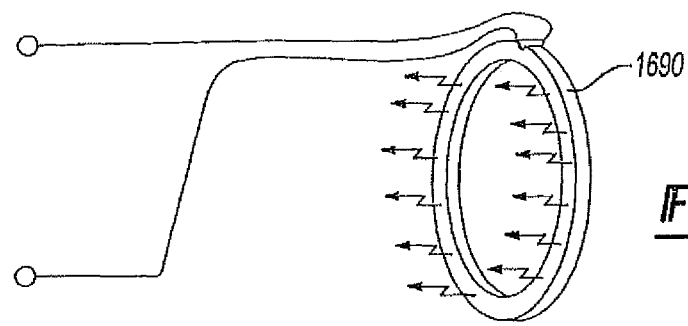
FIG. 122 is a diagram of another type of lighting unit.

Referring to FIG. 122, in another embodiment, the light unit can include an annular ring 1690 of a continuous light-emitting material, such as an organic light emitting diode (OLED), a light emitting electrochemical cell (LEC), or a plurality of quantum dot LEDs.

In one embodiment, the printed circuit board 1542 or 1642 is connected by wires (which are shown outside of the handle 1520 and housing 1510 for convenience in FIG. 114, but which will be received inside of the handle 1520 and housing 1510 as shown in FIG. 4) to a control circuit 1560. In one implementation, the wires may be routed via a guide as shown in the aforementioned Commonly Owned Applications and Patents. The control circuit 1560 connects the LEDs to the power source, converts the AC current to a DC signal, and controls illumination of the LEDs. The control circuit 1560 may have one or more of a plurality of configurations.

Figure 115:
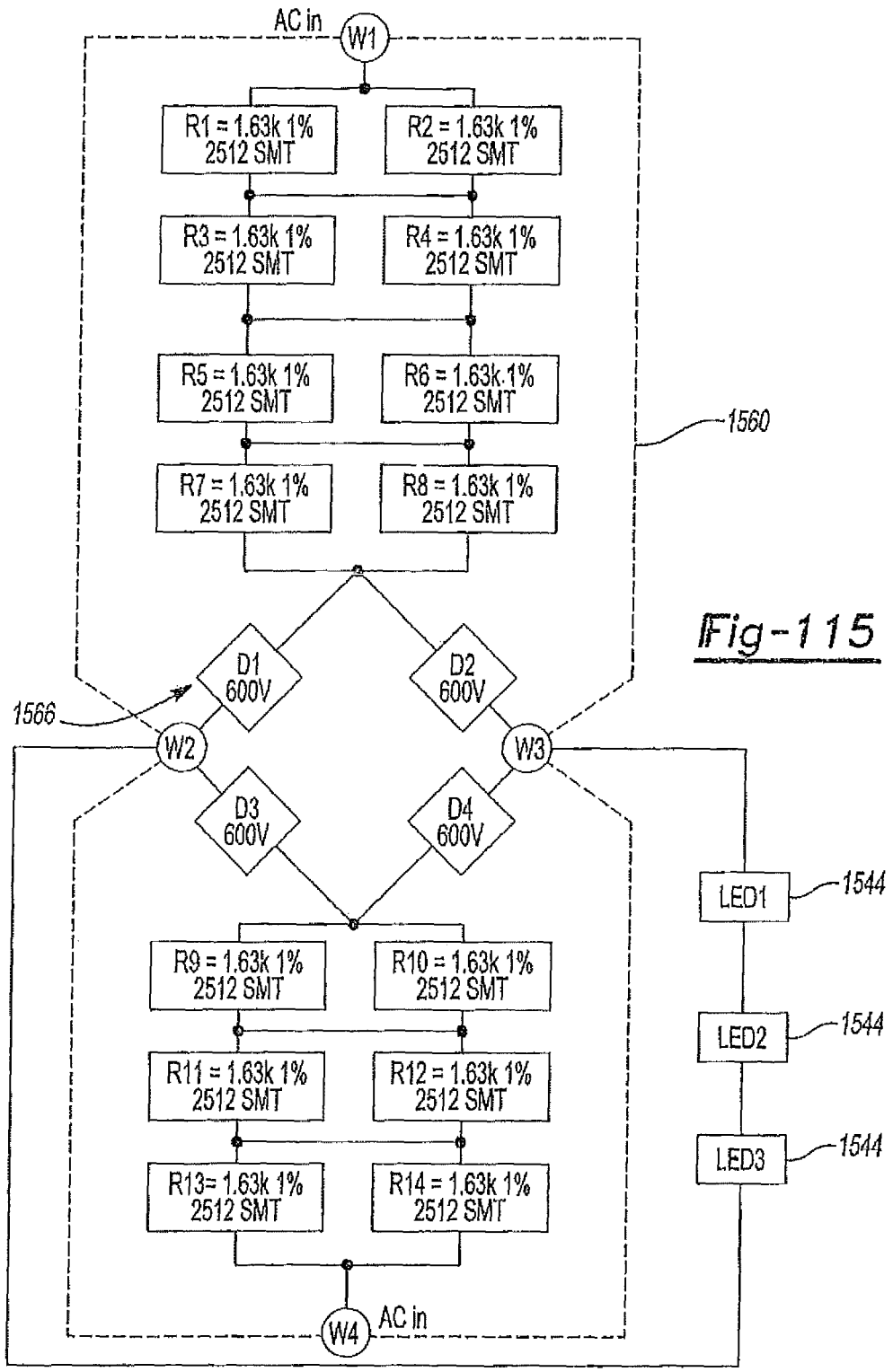
FIG. 115 is a circuit diagram of a control circuit for a light unit.

Referring to FIG. 115, in one embodiment, the control circuit 1560 connects the AC power source to the LEDs 1544 (or 1644). The control circuit 1560 includes a plurality of dropping resistors R1-R14 connected to either pole of the AC power source, and on either side of a full-wave bridge rectifier 1566 that includes four diodes D1-D4. The LEDs 1544 are connected across the full wave bridge rectifier 1566. The dropping resistors are configured to drop the voltage of the AC power source to a voltage that is suitable for use with the LEDs, and the full-wave-bridge rectifier is configured to rectify the AC line voltage into a substantially DC signal. It should be understood that the number and values of the resistors R1-R14 and diodes D1-D4 as shown in FIG. 115 are only one example, and that the circuit can be configured with a different number of resistors and/or with resistors and/or diodes having different values.

Figure 116:
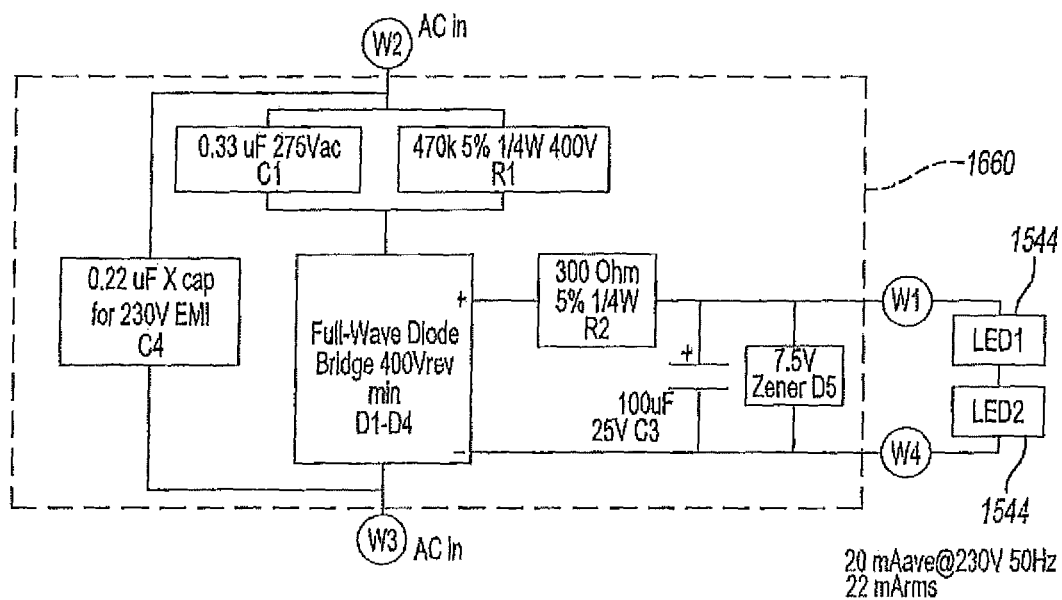
FIG. 116 is a circuit diagram of another control circuit for a light unit.

Referring to FIG. 116, in another embodiment, the control circuit 1660 connects the AC power source to the LEDs 1544 (or 1644). The control circuit 1660 includes a capacitor C1 and resistor R1 connected between one AC input and a full wave bridge rectifier circuit that includes diodes D1-D4. There is also an EMI capacitor C4 connected between the poles of the AC input. The output of the full wave bridge rectifier is connected to the LEDs via a resistor R2, a capacitor C3, and Zener diode D5. The capacitor C1 and the resistor R1 work together to reduce the voltage level of the AC power source The full-wave-bridge rectifier diodes D1-D4 are configured to rectify the AC line voltage into a substantially DC signal. The EMI capacitor C4 attenuates noise in the line. The resistor R2 and capacitor C3 work together to smooth out the voltage output of the full wave-bridge, while the Zener diode D5 acts as a voltage clamp to prevent damage to the LEDs upon spikes in the voltage signal. It should be understood that the number and values of the resistors, capacitors, and diodes shown in FIG. 6 are only one example, and that the circuit can be configured with a different number of resistors and capacitors and/or with resistors, capacitors, and/or diodes having different values.

Figure 117:
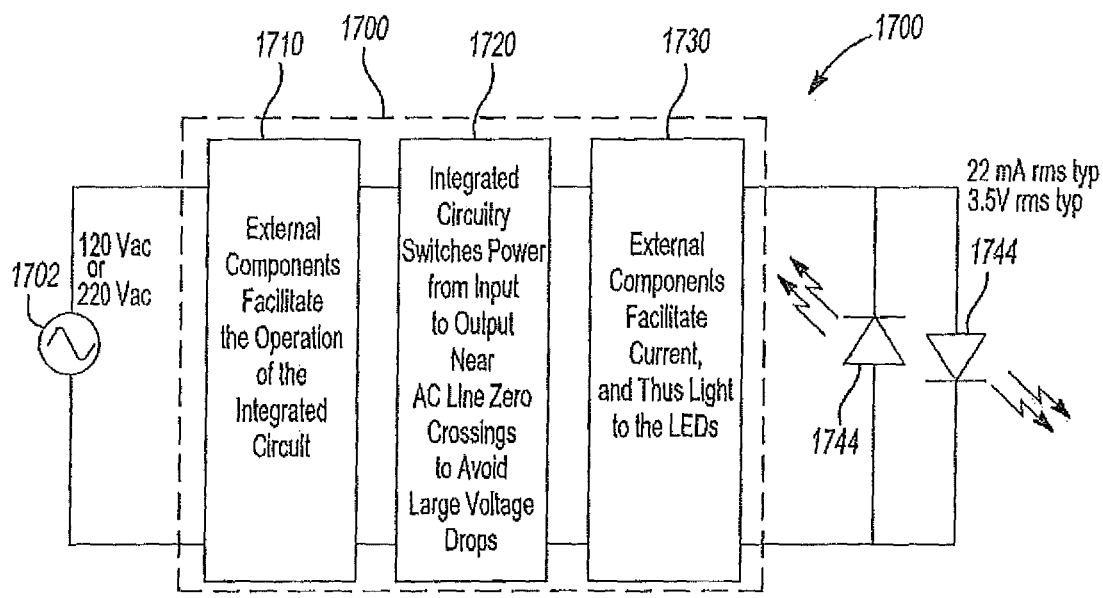
FIGS. 117 and 118 are circuit diagrams of another control circuit for a light unit.
Figure 118:
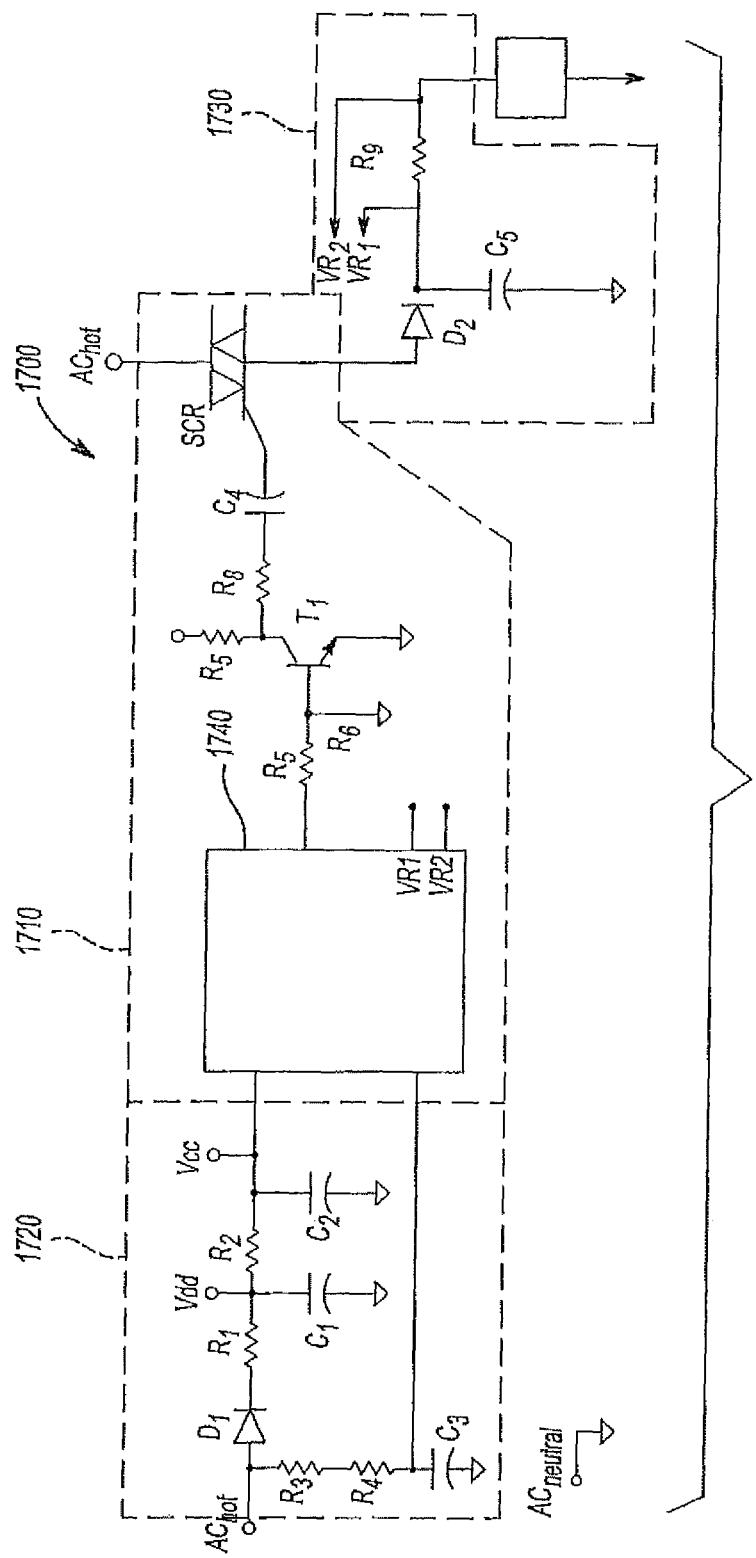
Figure 119:
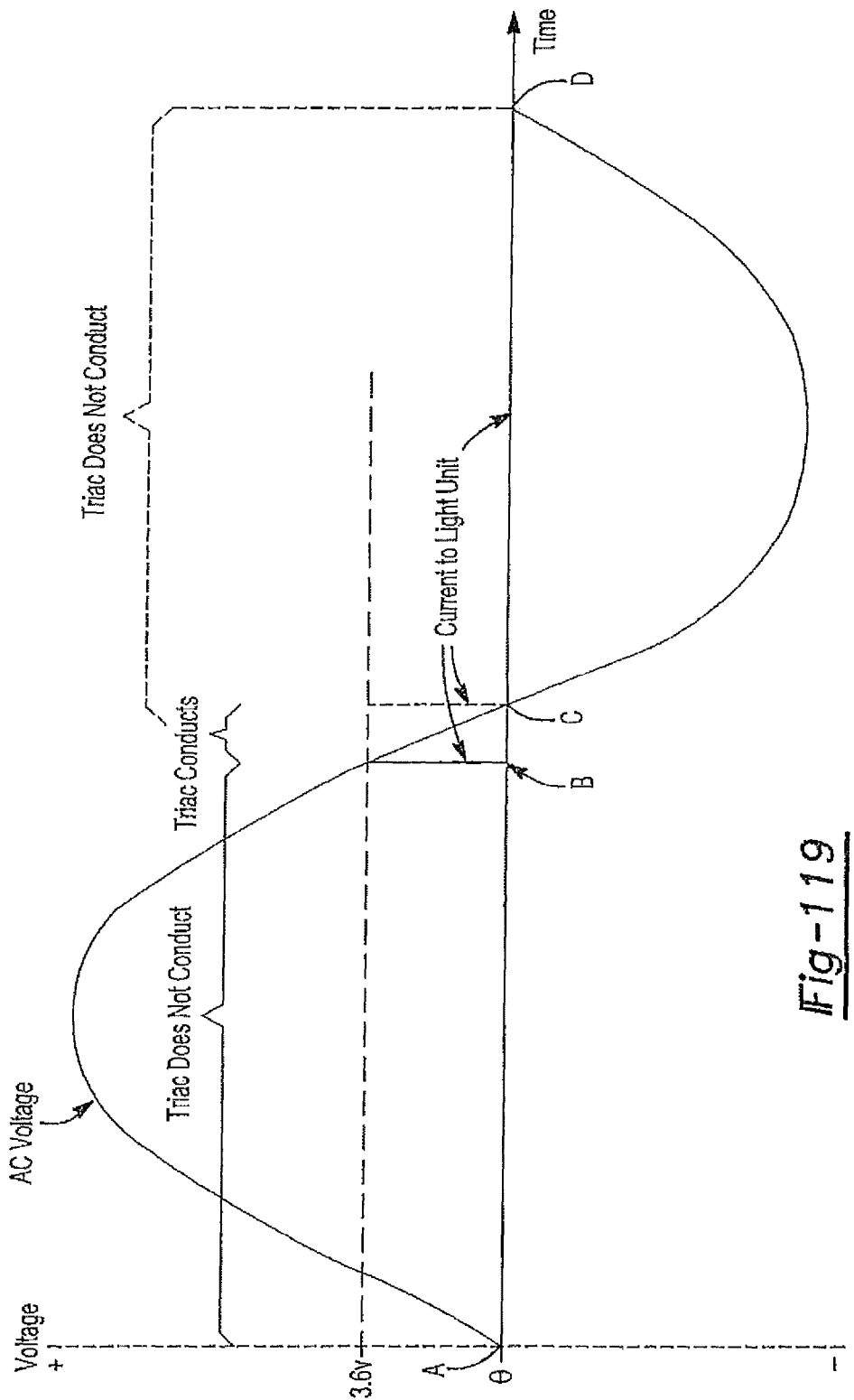
FIG. 119 is a diagram of the voltage signal input and output in the circuit of FIG. 117.

Referring to FIGS. 117-119, in another embodiment, a control circuit or power supply 1700 that connects the AC power source 1702 to the LEDs 1544 (or 1644) is a universal power supply that works with any voltage level AC signal, including 120V and 220V. This enables the tool to work in both the United States and Europe. Referring to FIG. 117, the universal power supply 1700 includes an integrated circuit 1710 that that allows AC power to flow to the LEDs only when the sinusoidal AC voltage is near to a zero crossing, thus avoiding the need for large resistors and capacitors to drop the voltage level. The power supply 1700 further includes external electronic components 1720 that facilitate operation of the integrated circuit, and external electronic components 1730 that facilitate transmitting current from the near zero-crossing switch to the LEDs.

Referring to FIG. 118, in one implementation the external components 1720 include a diode D1, a resistor R1, a capacitor C1, a resistor R2, and capacitor C2 that connect the AC hot line to a power line of a microcontroller 1740, to power the microcontroller 1740 with a low level DC voltage. The external components 1720 also include resistors R3 and R4, and a capacitor C3 that reduce the voltage of the AC signal and that are input into a zero-crossing detector of the microcontroller 1740. The integrated circuitry 1710 includes the microcontroller 1740. The output of the microcontroller is connected to resistor R5, a voltage divider resistor R6, and to the base of a PNP NPN bipolar transistor T. The NPN transistor T is in turn connected to the gate of a triac (SCR) via a resistor R8 and a capacitor C4. The triac or SCR is also connects the AC hot to the external components 1730. The external components 1730 include a diode D2 to prevent reverse current flow, and a capacitor C5 and resistor R9 to smooth out the voltage and current passed to the light unit. The output of the external components 1730 is connected to the light unit, which in this case includes two LEDs wired in series with like polarity. In addition, the microcontroller 1740 includes inputs VR1 and VR2 that are connected across resistor R9 to measure the voltage drop, and to determine whether the triac (SCR) is being fired at the desired time.

Referring also to FIG. 119, in operation, the zero-cross detector detects when the AC hot signal has crossed the zero line into a positive signal (point A), and starts a timer within microcontroller 1740. The timer, knowing the frequency of the earlier AC signal, counts until the timer reaches point B, which corresponds to the time when the voltage of the AC signal is some value (e.g., approximately 10 V) above the next zero crossing. At this point, the timer interrupts the microcontroller which causes the triac (SCR) to fire, enabling current to flow to the capacitor C5. The voltage potential on C5 rises as it accumulates charge from the flowing current. The triac remains in a conductive state until the negative-going AC current zero-cross which occurs slightly later than the negative-going AC voltage zero-cross (point C), at which point the triac ceases conduction and current cannot flow through the triac to the capacitor C5. The cycle starts again at the next zero crossing (point D). Thus, the voltage of the signal that is allowed to flow through the triac to the capacitor C5 is always positive. VR1 and VR2 continuously monitor the discharge of capacitor C5 by means of the voltage drop across resistor R9, which is to say the current through resistor R9 and also the current through the light unit. The microcontroller 1740 monitors average current through the light unit by means of the analog voltage drop across resistor R9, and may adjust that average current by adjusting the timing of triac firing. If that monitored average value is too low, then the firing point of the triac is move to a slightly earlier time allowing more current to flow. If that monitored average value is too high, then the firing point of the triac is moved to a slightly later time, allowing less current to flow. In this fashion the microcontroller 1740 adapts to different or varying AC input voltages while maintaining constant average current through the light unit.

Figure 120:
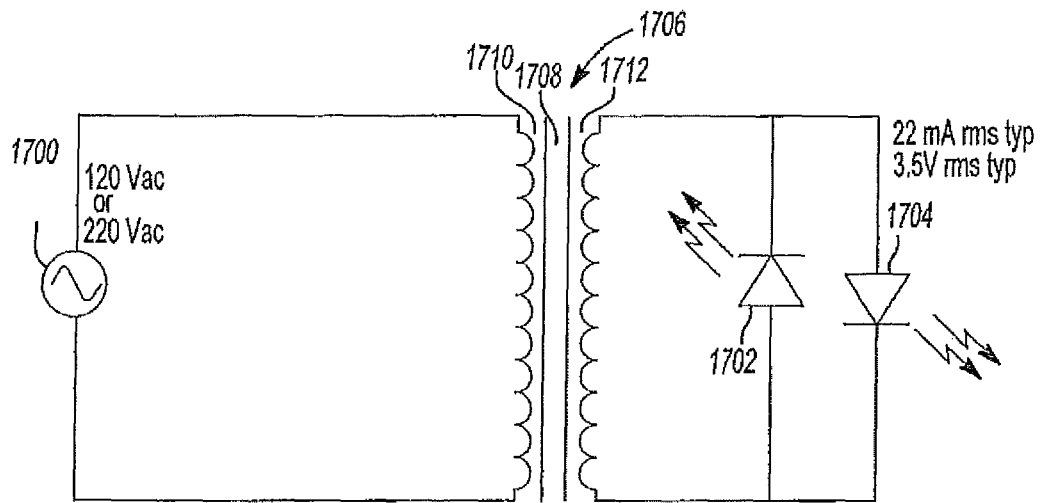
FIG. 120 is a circuit diagram of another control circuit for a light unit.

Referring to FIG. 120, in another embodiment, an AC power source 1700 is connected wirelessly to LEDs 1702, 1704 by a transformer 1706, e.g., a step down transformer, to avoid an obstacle 1708 in the housing that does not easily permit a wired connection. The transformer 1706 includes a primary winding 1710 on the AC power source side of the obstacle 1708, and a secondary winding 1712 one the LED side of the obstacle 1708. The LEDs 1702 and 1704 may be wired in parallel with reversed polarity so as to reduce the need for a separate rectifying circuit. The transformer 1706 serves to transmit current wirelessly across the obstacle 1708, and to reduce the voltage level to a level that is appropriate for powering the LEDs.

Figure 121:
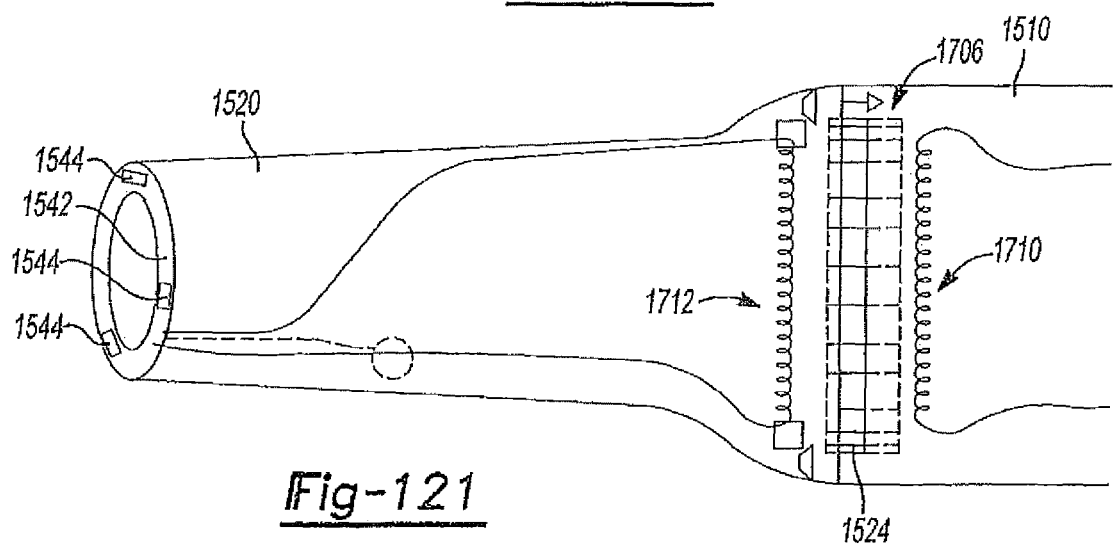
FIG. 121 is a schematic side view of the circuit of FIG. 120 implements in a grinding tool.

Referring to FIG. 121, in one particular design, the embodiment of FIG. 120 can be implemented in the die grinder 1500 of FIG. 111. As described above, the cooling fan 1524 of the die grinder 1500 that makes it difficult to connect wires from the power source to the LEDs. The AC power source is connected via wires in the motor housing 1510 to the primary winding 1710 of the transformer 1706 on the AC power source side of the fan 1524. The secondary winding 1712 is on the LED side of the fan 1524 and is connected via wires to the LED printed circuit board 1542. The transformer 1706 wirelessly transmits current from one side of the fan to the other, while at the same time dropping the voltage level. It should be understood that the wires in the handgrip 1520 may also be connected to the circuit board 1542 via a rectifying circuit to smooth the AC signal into a DC signal, and/or by further dropping resistors or capacitors. It should also be understood that in the case of a DC powered tool, it may be necessary to include a DC to AC converter circuit on the primary winding side of the transformer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tool system comprising:
a tool storage device including an inductive transmitting unit configured to receive a source of electrical power; and
a power tool with a battery, a controller configured to control charging of the battery, and an inductive receiving unit,
wherein the tool storage device is configured to receive the power tool such that the inductive transmitting unit is configured to induce generation of electrical power in the inductive receiving unit to charge the battery, wherein the controller is configured to control generation of electrical power by the inductive receiving unit based on a position or alignment of the inductive receiving unit relative to the inductive transmitting unit.

2. The tool system of claim 1, wherein the inductive transmitting unit comprises a first coil and the inductive receiving unit comprises a second coil.

3. The tool system of claim 2, wherein the first coil is configured to generate a magnetic field which is employed by the second coil to generate electrical power to charge the battery.

4. The tool system of claim 3, wherein the power tool is configured to be oriented relative to the tool storage device in a predetermined manner to orient the magnetic field of the first coil relative to the second coil in a predetermined manner.

5. The tool system of claim 1, wherein the tool storage device comprises one of a holster, a tool box, a kit box, a battery charger, a radio, and a tool storage box.

6. The tool system of claim 5, wherein the tool storage device comprises a cavity configured to receive the power tool.

7. The tool system of claim 1, wherein the inductive transmitting unit is configured to receive at least one of a source of AC power and a source of DC power.

8. The tool system of claim 1, wherein the inductive transmitting unit further comprises a switchable power supply.

9. The tool system of claim 1, wherein the power tool includes a chuck with the battery being disposed in the chuck.

10. The tool system of claim 1, wherein the power tool comprises a light unit and the battery is configured to power the light unit.

11. The tool system of claim 1, wherein the tool storage device is configured to receive a plurality of tools.

12. A tool system comprising:
a tool storage device including an inductive transmitting unit configured to receive a source of electrical power; and
a handheld tool with a battery, a controller configured to control charging of the battery, and an inductive receiving unit,
wherein the tool storage device is configured to receive the handheld tool such that electrical power delivered to the inductive transmitting unit is configured to induce generation of electrical power in the inductive receiving unit to charge the battery, wherein the controller is configured to control generation of electrical power by the inductive receiving unit based on a position or alignment of the inductive receiving unit relative to the inductive transmitting unit.

13. The tool system of claim 12, wherein the inductive transmitting unit comprises a first coil and the inductive receiving unit comprises a second coil.

14. The tool system of claim 13, wherein the first coil is configured to generate a magnetic field which is employed by the second coil to generate the electrical power to charge the battery.

15. The tool system of claim 14, wherein the handheld tool is configured to be oriented relative to the tool storage device in a predetermined manner to orient the magnetic field of the first coil relative to the second coil in a predetermined manner.

16. The tool system of claim 12, wherein the tool storage device comprises one of a pegboard, a holster, a tool box, a kit box, a battery charger, a radio, and a tool storage box.

17. The tool system of claim 16, wherein the tool storage device comprises a cavity configured to receive the handheld tool.

18. The tool system of claim 12, wherein the handheld tool comprises one of a power driven tool and a hand driven tool.

19. The tool system of claim 12, wherein the battery is configured to power at least one of a light, an alarm, a speaker, a signaling device, and a torque sensor.

20. A tool system comprising:
a tool storage device configured to receive a handheld tool with an inductive receiving unit, a battery, and a controller configured to control charging of the battery, the tool storage device including an inductive transmitting unit configured to receive a source of electrical power,
wherein the tool storage device is configured to receive the handheld tool such that electrical power delivered to the inductive transmitting unit is configured to induce generation of electrical power by the inductive receiving unit to charge the battery, wherein the controller is configured to control generation of electrical power by the inductive receiving unit based on a position or alignment of the inductive receiving unit relative to the inductive transmitting unit.

* * * * *